(12) United States Patent
Ohzuku et al.

(10) Patent No.: US 8,137,847 B2
(45) Date of Patent: Mar. 20, 2012

(54) ACTIVE MATERIAL FOR NON-AQUEOUS ELECTROLYTE SECONDARY BATTERY AND MANUFACTURING METHOD THEREFORE

(75) Inventors: Tsutomu Ohzuku, Nara (JP); Hiroshi Yoshizawa, Osaka (JP); Kensuke Nakura, Osaka (JP)

(73) Assignees: Panasonic Corporation, Osaka (JP); Public University Corporation Osaka City University, Osaka (JP)

( * ) Notice: Subject to any disclaimer, the term of this patent is extended or adjusted under 35 U.S.C. 154(b) by 1027 days.

(21) Appl. No.: 12/058,430

(22) Filed: Mar. 28, 2008

(65) Prior Publication Data

US 2008/0268347 A1 Oct. 30, 2008

Related U.S. Application Data

(60) Provisional application No. 60/907,379, filed on Mar. 30, 2007.

(51) Int. Cl.
*H01M 10/0562* (2010.01)
*H01M 6/16* (2006.01)

(52) U.S. Cl. .......... 429/322; 429/231.95; 429/231.9

(58) Field of Classification Search .............. None
See application file for complete search history.

(56) References Cited

U.S. PATENT DOCUMENTS

| 2,770,523 | A | * | 11/1956 | Toole | 423/594.1 |
| 5,506,077 | A | * | 4/1996 | Koksbang | 429/224 |
| 6,156,459 | A | * | 12/2000 | Negoro et al. | 429/322 |
| 6,551,744 | B1 | | 4/2003 | Ohzuku et al. | |
| 6,998,069 | B1 | * | 2/2006 | Coluccia et al. | 252/518.1 |
| 7,374,841 | B2 | * | 5/2008 | Hosoya et al. | 429/231.1 |
| 2004/0126660 | A1 | * | 7/2004 | Ohzuku et al. | 429/223 |
| 2004/0234857 | A1 | * | 11/2004 | Shiozaki et al. | 429/231.3 |
| 2005/0152831 | A1 | * | 7/2005 | Tasaki et al. | 423/599 |
| 2006/0177739 | A1 | * | 8/2006 | Endo et al. | 429/231.95 |

FOREIGN PATENT DOCUMENTS

| CN | 1412121 A | 4/2003 |
| JP | 2002-042813 | 2/2002 |
| JP | 2004-002141 | 1/2004 |

(Continued)

OTHER PUBLICATIONS

Chinese Office Action issued in Chinese Patent Application No. 200880000769.6, dated Nov. 24, 2010.

(Continued)

*Primary Examiner* — Melvin Mayes
*Assistant Examiner* — Sheng H Davis
(74) *Attorney, Agent, or Firm* — McDermott Will & Emery LLP

(57) ABSTRACT

An active material for a non-aqueous electrolyte secondary battery including a lithium-containing transition metal oxide containing nickel and manganese and having a closest-packed structure of oxygen, wherein an atomic ratio $M_{Li}/M_T$ between the number of moles of lithium $M_{Li}$ and the number of moles of transition metal $M_T$ contained in the lithium-containing transition metal oxide is greater than 1.0; the lithium-containing transition metal oxide has a crystal structure attributed to a hexagonal system, and the X-ray diffraction image of the crystal structure has a peak $P_{003}$ attributed to the (003) plane and a peak $P_{104}$ attributed to the (104) plane; an integrated intensity ratio $I_{003}/I_{104}$ between the peak $P_{003}$ and the peak $P_{104}$ varies reversibly within a range from 0.7 to 1.5 in association with absorption and desorption of lithium by the lithium-containing transition metal oxide; and the integrated intensity ratio varies linearly and continuously.

14 Claims, 36 Drawing Sheets

FOREIGN PATENT DOCUMENTS

JP    2007-012629    1/2007
WO    WO 02/078105 A1    10/2002

OTHER PUBLICATIONS

Ohzuku, T., et al., "Layered Lithium Insertion Material of $LiNi_{1/2}Mn_{1/2}O_2$: A Possible Alternative to $LiCoO_2$ for Advanced Lithium-Ion Batteries", Chemistry Letters, 2001, pp. 744-745, The Chemical Society of Japan.

Breger, J., et al., "Effect of High Voltage on the Structure and Electrochemistry of $LiNi_{0.5}Mn_{0.5}O_2$: A Joint Experimental and Theoretical Study", Chem. Mater, 2006, pp. 4768-4781, vol. 18, American Chemical Society.

Lu, Z., et al., "Synthesis, Structure, and Electrochemical Behavior of $Li[Ni_xLi_{1/3-2x/3}Mn_{2/3-x/3}]O_2$", Journal of The Electrochemical Society, 2002, pp. A778-A791, vol. 149 (6), The Electrochemical Society, Inc.

Thackeray, M.M., et al., "Advances in manganese-oxide 'composite' electrodes for lithium-ion batteries", Journal of Materials Chemistry, 2005, pp. 2257-2267, vol. 15, The Royal Society of Chemistry 2005.

Thackeray, M.M., et al., "Comments on the structural complexity of lithium-rich $Li_{1+x}M_{1-x}O_2$ electrodes (M = Mn, Ni, Co) for lithium batteries", Electrochemistry Communications, 2006, pp. 1531-1538, vol. 8, Elsevier, doi10.1016/j.elecom.2006.06.030.

International Search Report issued in Patent Application No. PCT/JP2008/000781 dated Apr. 22, 2008.

\* cited by examiner

Fig. 21  2.5V~5.0V 2.5-4.6 V range 2.5-5.0 V range

ACTIVE MATERIAL FOR NON-AQUEOUS ELECTROLYTE SECONDARY BATTERY AND MANUFACTURING METHOD THEREFORE

RELATED APPLICATIONS

This application claims the priority U.S. Provisional Application No. 60/907,379, filed on Mar. 30, 2007, which is incorporated by reference herein.

FIELD OF THE INVENTION

The present invention relates to an active material for a non-aqueous electrolyte secondary battery and specifically relates to an active material including a lithium-containing transition metal oxide containing nickel and manganese and having an oxygen closest-packed structure.

BACKGROUND OF THE INVENTION

Non-aqueous electrolyte secondary batteries, in particular, lithium ion secondary batteries have been widely used in mobile phones and notebook personal computers. The non-aqueous electrolyte secondary batteries are now indispensable for the present ubiquitous network society, for which further improvement in capacity is eagerly desired. Furthermore, the non-aqueous electrolyte secondary batteries have been employed as power sources for power tools, and are now greatly expected as future power sources for hybrid automobiles.

During these 10 years since the mass production of lithium ion secondary batteries started in 1991, improvement in battery structure has advanced and the technique of high-density filling has reached close to the limit of improvement. As a result, the battery energy density has been doubled from 280 Wh/L to 580 Wh/L. However, there has been no change in the basic configuration that uses $LiCoO_2$ for a positive electrode active material and graphite for a negative electrode active material. As such, the expectation is placed on the development of new materials satisfying the requirements for high capacity, high performance, and high safety.

Under these circumstances, studies have been actively conducted on lithium-containing transition metal oxides containing nickel and manganese represented by $Li_xNi_{0.5}Mn_{0.5}O_2$ ($1 \leq x$) (hereinafter referred to as nickel-manganese based oxides) as promising materials to replace $LiCoO_2$. However, because of the difficulty in synthesis thereof, it appears that various types of nickel-manganese based oxides having different electrochemical characteristics have been synthesized by various methods among researchers. As such, the precise structure of $Li_xNi_{0.5}Mn_{0.5}O_2$ has not yet been determined.

On the other hand, with respect to $LiCo_{1/3}Ni_{1/3}Mn_{1/3}O_2$ containing Co, the synthesis thereof is comparatively easy and the structure thereof has almost been finally determined. Lithium ion secondary batteries using this material have already been manufactured on a mass production basis as a cylindrical battery for notebook personal computers (size 18650), a prismatic battery for mobile phones, and a cylindrical battery for power tools (size 26650).

$Li_xNi_{0.5}Mn_{0.5}O_2$ has a high capacity equivalent to or better than that of $LiCo_{1/3}Ni_{1/3}Mn_{1/3}O_2$, the safety of which is expected to be dramatically improved. Moreover, $Li_xNi_{0.5}Mn_{0.5}O_2$ can be inexpensively produced because it does not contain expensive Co. However, a $Li_xNi_{0.5}Mn_{0.5}O_2$ that is more excellent than $LiCo_{1/3}Ni_{1/3}Mn_{1/3}O_2$ has not yet been achieved because of the disadvantage of the difficulty in synthesis. In view of the above, in order to achieve both a high level of safety and a high capacity, the following proposals have been suggested.

Nickel and cobalt have analogous chemical characteristics. Accordingly, $LiCoO_2$ and $LiNiO_2$ are capable of readily forming a solid solution represented by $LiNi_{1-x}Co_xO_2$ ($0<x<1$) in the whole domain of x. However, nickel and manganese have chemical characteristics different from each other. For this reason, it has been difficult to form a lithium-containing transition metal oxide in which nickel and manganese are dispersed in the atomic level by the conventional method, namely, by baking to allow solid phase dispersion to occur.

In order to solve this problem, one proposal suggests a method for preparing an active material including the steps of synthesizing $Ni_{0.5}Mn_{0.5}(OH)_2$ by coprecipitating the same number of moles of nickel and manganese, mixing the resultant hydroxide with $LiOH \cdot H_2O$, and baking the mixture in air at a high temperature of 1000° C. (see Non-patent Document 1). By doing this, the Ni ions and the Mn ions, which are normally present as ions with a valence of $3^+$ in $LiNi_{0.5}Mn_{0.5}O_2$, are allowed to be present as $Ni^{2+}$ and $Mn^{4+}$, making it possible for the both ions to be dispersed without being isolated from each other. As a result, an active material having a high capacity of approximately 150 mAh/g can be obtained. This active material provides a charge-discharge curve showing a high electric potential approximate to that of $LiCoO_2$. In other words, an active material different from the conventional nickel-based material represented by $LiNi_{1-x}Co_xO_2$ ($0<x<1$) that provides an S-shaped charge-discharge curve showing a low electric potential can be obtained.

Non-patent Document 2 gives a detailed examination with regard to the mechanism of electrochemical reaction of $Li_xNi_{0.5}Mn_{0.5}O_2$ (x=1) using methods of Neutron Diffraction, $Li^6$ MAS NMR (Magic-Angle Spinning Nuclear Magnetic Resonance) spectroscopy, the first-principle simulation, and the like. This document reports that Ni ions migrate from one site to another in the solid matrix in association with charge and discharge (oxidation and reduction). This documents further reports that in association with the migration of Ni ions, Li sites are decreased during discharge, resulting in a large irreversible capacity in the initial charge.

Non-patent Document 3 suggests a material represented by $Li[Ni_xLi_{1/3-2x/3}Mn_{2/3-x/3}]O_2$ ($0<x \leq 1/2$). This is a material in which transition metal sites are partially substituted with Li. It is attempted to achieve an improvement in capacity by extracting lithium and oxygen from the skeleton of the material containing lithium in excess in the first charge. In the case of the active materials of Non-patent Documents 1 and 2, the ratio between the total number of moles of transition metal elements and the number of moles of lithium element is 1:1. In the case of the active material of Non-patent Document 3, the number of moles of lithium element is greater than the total number of moles of transition metal elements, that is, lithium is contained in excess.

Non-patent Documents 4 and 5 suggest a material represented by $xLi_2MnO_3 \cdot (1-x)LiMO_2$ (M=Ni, Mn). This material, as in the case of Non-patent Document 3, contains lithium in excess. In the crystal of this material, $Li_2MnO_3$ domain and $LiMO_2$ (M=Ni, Mn) domain are present in a complex state. In Non-patent Documents 4 and 5 also, as in Non-patent Document 3, lithium and oxygen are extracted from the skeleton of the material in the first charge.

The disclosure in Patent Document 1 is similar to those in Non-patent Documents 3 to 5. FIG. 9 in Patent Document 1 shows charge-discharge curves, in which the initial charge-discharge curve is significantly different from the second and subsequent charge-discharge curves. In the case of Non-patent Documents 3 to 5 and Patent Document 1, a flat portion appears around from 4.5 V to 4.6 V in the first charge. It is considered that extraction of lithium and oxygen occurs in this flat portion. In such a material containing lithium in excess, since lithium and oxygen are extracted from the skeleton in the first charge, a large irreversible capacity is generated.

Non-patent Document 4 suggests an acid treatment for suppressing the increase in the irreversible capacity. That is, extracting lithium and oxygen beforehand from the skeleton of the material by the acid treatment can prevent the generation of irreversible capacity in the first charge after the fabrication of a battery.

Non-patent Document 1: T. Ohzuku, and Y. Makimura, Chem. Lett., 744 (2001)

Non-patent Document 2: J. Breger, Y. S. Meng, Y. Hinuma, S. Kang, Y. Shao-Horn, G. Ceder, and C. P. Grey, Chem. Mater., 18. 4768(2006)

Non-patent Document 3: Zhonghua Lu, L. Y. Beaulieu, R. A. Donaberger, C. L. Thomas, and J. R. Dahn, J. Electrochrem. Soc., 149(6). 778(2002)

Non-patent Document 4: M. M. Thackeray, C. S. Jonson, J. T. Vaughey, N. Li, and S. A. Hackney., J. Mater. Chem., 15. 2257(2005)

Non-patent Document 5: M. M. Thackeray, S.-H. Kang, C. S. Jonson, J. T. Vaughey, N. Li, and S. A. Hackney., Electrocem. Commun. 8. 1531(2006)

Patent Document 1: WO 2002/078105

BRIEF SUMMARY OF THE INVENTION

In the case where a material containing lithium in excess is synthesized as suggested in Non-patent Documents 3 to 5 in order to further improve the capacity of the materials suggested in Non-patent Documents 1 and 2, lithium and oxygen are extracted from the skeleton in the first charge, resulting in a large irreversible capacity. This reduces the electron conductivity and the lithium diffusing ability of the material. As such, it is possible to obtain an active material with high capacity, but this active material reduces the battery characteristics such as load characteristics and cycle life. In addition, if oxygen gas remains inside the battery, the battery internal pressure is raised. Therefore, it becomes necessary to purge the oxygen gas to the outside of the battery by some method in order to prevent the deformation of the battery.

In the case where the acid treatment is performed as suggested in Non-patent Document 4, it is possible to reduce the irreversible capacity in the first charge. However, as in the case above, the electron conductivity and the lithium diffusing ability of the material are reduced, resulting in reduced battery characteristics such as reduced load characteristics and reduced cycle life. Moreover, the acid treatment disadvantageously requires complicated steps.

The present invention intends to provide a high capacity non-aqueous electrolyte secondary battery capable of achieving a high level of safety and excellent in battery characteristics such as load characteristics and cycle life.

The present in invention relates to an active material for a non-aqueous electrolyte secondary battery including a lithium-containing transition metal oxide containing nickel and manganese and having a closest-packed structure of oxygen, wherein an atomic ratio $M_{Li}/M_T$ between the number of moles of lithium $M_{Li}$ and the number of moles of transition metal $M_T$ contained in the lithium-containing transition metal oxide is 1.0 or more; the lithium-containing transition metal oxide has a crystal structure attributed to a hexagonal system, and an X-ray diffraction image of the crystal structure has a peak $P_{003}$ attributed to the (003) plane and a peak $P_{104}$ attributed to the (104) plane; an integrated intensity ratio $I_{003}/I_{104}$ between the peak $P_{003}$ and the peak $P_{104}$ varies reversibly within a range from 0.7 to 1.5 in association with absorption and desorption of lithium by the lithium-containing transition metal oxide; and the integrated intensity ratio varies linearly and continuously. The use of this active material makes it possible to provide high charge and discharge capacities and a favorable cycle life.

The present invention further relates to an active material for a non-aqueous electrolyte secondary battery including a lithium-containing transition metal oxide containing nickel and manganese and having a closest-packed structure of oxygen, wherein an atomic ratio $M_{Li}/M_T$ between the number of moles of lithium $M_{Li}$ and the number of moles of transition metal $M_T$ contained in the lithium-containing transition metal oxide is 1.0 or more; the lithium-containing transition metal oxide has a crystal structure attributed to a hexagonal system, and the X-ray diffraction image of the crystal structure has a peak $P_{003}$ attributed to the (003) plane and a peak $P_{104}$ attributed to the (104) plane; an integrated intensity ratio $I_{003}/I_{104}$ between the peak $P_{003}$ and the peak $P_{104}$ varies reversibly within a range from 0.7 to 1.5 in association with absorption and desorption of lithium by the lithium-containing transition metal oxide; and when the lithium-containing transition metal oxide desorbs lithium until its potential versus lithium metal reaches 5 V, the oxygen array in the crystal structure undergoes substantially no change. In this active material, separation (extraction) of oxygen from the crystal skeleton is unlikely to occur, which can suppress the generation of a large irreversible capacity.

The present invention furthermore relates to a production method for a lithium-containing transition metal oxide containing nickel and manganese and having a closest-packed structure of oxygen, the method comprising the steps of: pre-baking a starting material containing nickel and manganese at a temperature of 500° C. to 700° C. to give a precursor oxide containing nickel and manganese; and mixing the precursor oxide with a lithium source and main-baking a resultant mixture to give a lithium-containing transition metal oxide.

Here, it is preferable that the pre-baking is performed in an oxygen atmosphere.

It is preferable that the precursor oxide includes an oxide represented by R32 type $NiMnO_3$.

It is preferable that the main-baking is performed at a temperature of 800° C. or higher, and it is more preferable that the main-baking is performed at a temperature of 900° C. to 1100° C.

It is preferable that the production method of the present invention further includes the step of washing the lithium-containing transition metal oxide with water after the main-baking.

It is preferable that the production method of the present invention further includes the step of drying the lithium-containing transition metal oxide at a temperature of 300° C. or higher after the washing with water.

It is preferable that the starting material containing nickel and manganese is at least one selected from the group consisting of a composite hydroxide containing nickel and manganese and a composite oxide containing nickel and manganese. Further, it is preferable that lithium source is at least one selected from the group consisting of lithium hydroxide and lithium carbonate.

It is preferable that an atomic ratio $m_{Li}/m_T$ between the number of moles of lithium $m_{Li}$ and the number of moles of transition metal $m_T$ contained in the mixture of the precursor oxide and the lithium source is 1.0 or more, and it is more preferable that the atomic ratio $m_{Li}/m_T$ is greater than 1.2.

The present invention still further relates to an active material for a non-aqueous electrolyte secondary battery including the lithium-containing transition metal oxide obtained by the foregoing production method, wherein the lithium-containing transition metal oxide has a crystal structure attributed to a hexagonal system, and the X-ray diffraction image of the crystal structure has a peak $P_{003}$ attributed to the (003) plane and a peak $P_{104}$ attributed to the (104) plane, and an integrated intensity ratio $I_{003}/I_{104}$ between the peak $P_{003}$ and the peak $P_{104}$ is 1.02 or more.

When the atomic ratio $m_{Li}/m_T$ is greater than 1.2, an active material in which the integrated intensity ratio $I_{003}/I_{104}$ is 1.02 or more is readily obtained.

When the atomic ratio $m_{Li}/m_T$ is greater than 1.3, an active material in which the integrated intensity ratio $I_{003}/I_{104}$ is 1.1 or more is readily obtained.

The present invention yet further relates to an active material for a non-aqueous electrolyte secondary battery including the lithium-containing transition metal oxide obtained by the foregoing production method, wherein an atomic ratio $M_{Li}/M_t$ between the number of moles of lithium $M_{Li}$ and the number of moles of transition metal $M_T$ contained in the lithium-containing transition metal oxide is 1.1 to 1.25.

The present invention relates not only to an active material being incorporated into a battery but also to an active material powder before incorporated into a battery. The active material powder before incorporated into a battery is an assembly of particles constituting the active material, the active material powder not including a resin binder and the like.

The present invention yet further relates to a non-aqueous electrolyte secondary battery including a positive electrode including any one of the foregoing active materials, a negative electrode, a separator interposed between the positive electrode and the negative electrode, and a non-aqueous electrolyte.

In the active material of the present invention, it is preferable that in its crystal structure, a lattice constant a representing a length of a axis and a lattice constant c representing a length of c axis satisfy $4.945 < c/a$, and $c < 14.30$ Å.

It is preferable that the lithium-containing transition metal oxide is derived from an oxide containing nickel and manganese, the oxide serving as a precursor oxide. It is preferable that the precursor oxide includes an oxide represented by R32 type $NiMnO_3$.

When the potential of said lithium-containing transition metal oxide varies from 2.5 V to 4.6 V versus lithium metal, the obtained capacity is, for example, 160 mAh/g or more.

It is preferable that the primary particles constituting the lithium-containing transition metal oxide have a mean particle size of 1 µm or less, and at least a part of the primary particles have a triangular or hexagonal face on their surfaces. Further, it is preferable that the shape of the primary particles is columnar. It is preferable that the primary particles are welded or sintered to one another at part of their surfaces, thereby to form secondary particles.

It is preferable that at least one heteroelement selected from the group consisting of cobalt, iron, zinc, aluminum, magnesium, strontium, yttrium, and ytterbium is doped in the inside or on the surface of the primary particles or secondary particles constituting the lithium-containing transition metal oxide.

It is preferable that the number of moles of nickel $M_{Ni}$ and the number of moles of manganese $M_{Mn}$ contained in the lithium-containing transition metal oxide are substantially equal to each other, and a molar ratio $M_0$ represented by $(M_{Ni}+M_{Mn})/2$ satisfies $0 \leq |M_{Ni}-M_0|/M_0 \leq 0.1$, and $0 \leq |M_{Mn}-M_0|/M_0 \leq 0.1$.

It is preferable that in the process of desorption of lithium until the potential of the lithium-containing transition metal oxide reaches 5 V versus lithium metal, substantially no irreversible capacity involving $Li_2O$ production is generated.

It is preferable that the potential of the lithium-containing transition metal oxide versus lithium metal varies continuously, that is, has no flat portion, within a range from 4.5 V to 4.6 V.

It is preferable that the atomic ratio $M_{Li}/M_T$ is 1.1 to 1.4.

It is preferable that the X-ray diffraction image of the crystal structure of the lithium-containing transition metal oxide has a peak $P_{110}$ attributed to the (110) plane, and the profile of the peak $P_{110}$ becomes broader as the atomic ratio $M_{Li}/M_T$ is increased.

According to the present invention, it is possible to sufficiently utilize a high level of safety of a lithium-containing transition metal oxide containing nickel and manganese (nickel-manganese based oxide) exemplified by $Li_xNi_{0.5}Mn_{0.5}O_2$ ($1 \leq x$). The use of the active material of the present invention can therefore provide a non-aqueous electrolyte secondary battery having a high level of safety and a high capacity and being excellent in battery characteristics such as load characteristics and cycle life. In addition, according to the production method of the present invention, it is possible to synthesize an active material having a high level of safety and a high capacity and being capable of exerting excellent electrochemical characteristics.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 28B shows the relationship between the molar ratio of an active material $M_{Li}/M_T$ and the lattice constant ratio c/a.

DETAILED DESCRIPTION OF THE INVENTION

Figure 1:
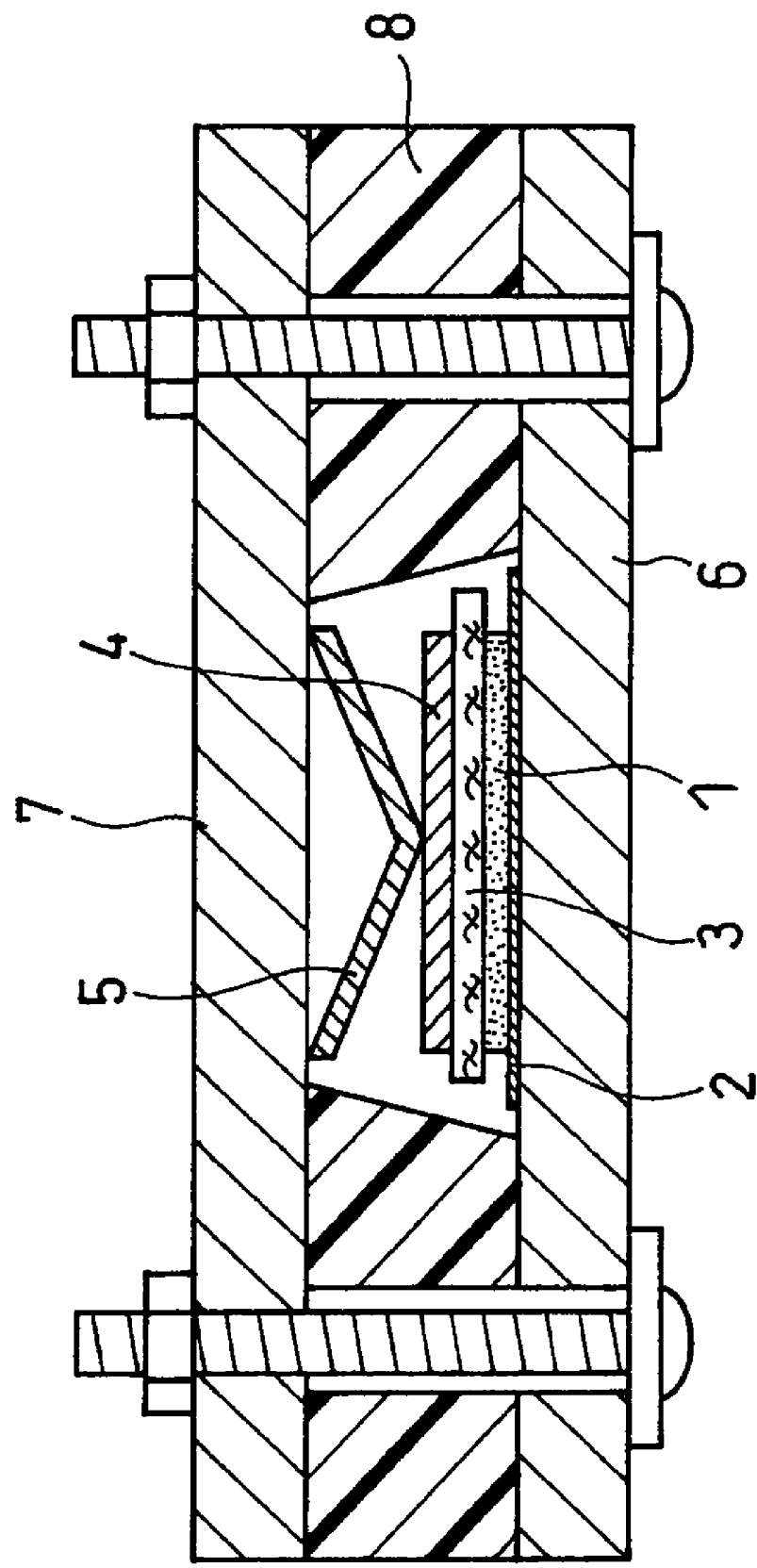
FIG. 1 shows a schematic longitudinal sectional view of a test cell for evaluating the electrochemical characteristics of an active material.

Many researchers have attempted the synthesis of a lithium-containing transition metal oxide containing nickel and manganese and having a closest-packed structure of oxygen. It appears, however, the characteristics of the synthesized active material differ among the researchers. This means that if the ratios of the component elements of active materials to be synthesized are the same, the synthesized active materials are substantially different depending on the production method or the production conditions. Therefore, in order to ensure the reproducibility of the characteristics, particular attention should be paid in the synthesis of an active material.

For example, an active material containing only Ni and Mn as the transition metal in which the number of moles of Ni is equal to that of Mn can be simply represented by the chemical formula $Li_{1+x}(Ni_{0.5}Mn_{0.5})_{1-x}O_2$ (0<x). However, this chemical formula is determined by the calculation from the loaded composition of starting materials. Since the crystal structure of the active material has not yet determined in detail, the molar ratio between lithium and the transition metal and the content of oxygen may be inconsistent with the foregoing chemical composition.

It should be noted that if the active materials are substantially different from one another, the details about the crystal structure of each of the active materials are unclear. It is necessary, therefore, to distinguish one active material from another according to the difference in the characteristics and the production method of each active material. Herein, the description of the characteristics and the production method of the active material of the present invention is given as specifically as possible to clearly distinguish the active material of the present invention from a conventional active material.

The active material of the present invention includes a lithium-containing transition metal oxide containing nickel and manganese and having a closest-packed structure of oxygen. In view of achieving a high level of safety, the main components of the active material are nickel and manganese. Preferably, in the metal elements other than lithium contained in the lithium-containing transition metal oxide, nickel and manganese are 70 mol % to 100 mol % or, alternatively, 85 mol % to 100 mol %.

The active material of the present invention may contain at least one heteroelement selected from the group consisting of cobalt, iron, zinc, aluminum, magnesium, strontium, yttrium, and ytterbium. However, the amount of the heteroelement is preferably as small as being doped in the inside or on the surface of the primary particles or secondary particles constituting the lithium-containing transition metal oxide.

The active material of the present invention has a high capacity. When the potential of the lithium-containing transition metal oxide varies from 2.5 V to 4.6 V versus lithium metal, the obtained capacity is, for example, 160 mAh/g or more, and further 170 mAh/g or more.

The atomic ratio $M_{Li}/M_T$ between the number of moles of lithium $M_{Li}$ and the number of moles of transition metal $M_T$ contained in the lithium-containing transition metal oxide needs to be 1.0 or more, desirably greater than 1.0, and further desirably 1.1 to 1.4. If the atomic ratio $M_{Li}/M_T$ is less than 1.0, phases having electrochemically different properties are produced in the active material, resulting in a low capacity.

The lithium-containing transition metal oxide has a crystal structure attributed to a hexagonal system. The X-ray diffraction image of the crystal structure attributed to a hexagonal system has a peak $P_{003}$ attributed to the (003) plane and a peak $P_{104}$ attributed to the (104) plane. In the case of the active material of the present invention, the integrated intensity ratio $I_{003}/I_{104}$ between the peak $P_{003}$ and the peak $P_{104}$ varies reversibly within the range from 0.7 to 1.5 in association with absorption and desorption of lithium by the lithium-containing transition metal oxide (i.e., charge and discharge). In the case of an active material having the conventional layer structure (e.g., $LiNiO_2$), such a large variation is not observed in the integrated intensity ratio. Such a behavior is specific to the active material of the present invention.

It should be noted that the X-ray diffraction image of the crystal structure attributed to a hexagonal system further has a peak $P_{110}$ attributed to the (110) plane. The profile of the peak $P_{110}$ tends to become broader as the atomic ratio $M_{Li}/M_T$ is increased. Such a tendency is specific to the active material of the present invention.

In one embodiment of the present invention, the integrated intensity ratio $I_{003}/I_{104}$ in the lithium-containing transition metal oxide varies linearly and continuously from 0.7 to 1.5. This makes it possible to provide a high capacity active material.

It is not necessary for the integrated intensity ratio $I_{003}/I_{104}$ to vary linearly and continuously throughout from 0.7 to 1.5. It suffices, for example, if the ratio varies linearly and continuously from 1.0 to 1.25.

It should be noted that the linier variation of the integrated intensity ratio $I_{003}/I_{104}$ may be a linier variation on average. The continuous variation of the integrated intensity ratio $I_{003}/I_{104}$ means that the integrated intensity ratio tends to always increase or decrease. In a preferred embodiment, the ratio of increase or decrease of the integrated intensity ratio is almost constant. For example, when the relation between the integrated intensity ratio $I_{003}/I_{104}$ and the charge capacity per weigh of the active material (mAh/g) is shown by plotting, and the plots are approximated by a straight line, the reliability index is preferably 0.9 or more and further preferably 0.95 or more.

In another embodiment of the present invention, when the lithium-containing transition metal oxide desorbs lithium until its potential versus lithium metal reaches 5 V (i.e., it is charged), the oxygen array in the crystal structure of the lithium-containing transition metal oxide undergoes substantially no change. This means that in this region, separation (extraction) of oxygen from the crystal skeleton in association with desorption of lithium is unlikely to occur, that is, substantially no irreversible capacity is generated in association with the production of $Li_2O$.

Whether the oxygen array has undergone a change or not can be examined by comparing the XRD pattern of the lithium-containing transition metal oxide in a charged state with that of the lithium-containing transition metal oxide before charge. If the oxygen array has changed, the peak attributed to the array of oxygen atoms becomes boarder in association with the change. Alternatively, since oxygen gas is generated if the oxygen array has changed, whether the oxygen array has undergone a change or not can be examined by analyzing the gas generated inside the battery. In the case of the present invention, even when the lithium-containing transition metal oxide desorbs lithium until its potential versus lithium metal reaches 5 V, the oxygen array in the crystal structure undergoes substantially no change. Therefore, the amount of oxygen gas generated at this time is 2 mL or less per 1 g of the active material at room temperature under atmospheric pressure.

In the case where substantially no irreversible capacity in association with the production of $Li_2O$ is generated, the potential of the lithium-containing transition metal oxide versus lithium metal varies continuously within a range from 4.5 V to 4.6 V and has no flat portion. One skilled in the art would easily judge whether the potential has a flat portion or not from the charge-discharge curve.

The active material of the present invention as described above can be synthesized by the method including the following steps (i) to (iii).

(i) The step of synthesizing a starting material containing nickel and manganese, for example, a composite hydroxide containing nickel and manganese. It is preferable to synthesize the composite hydroxide containing nickel and manganese by coprecipitation method.

(ii) The step of pre-baking the starting material containing nickel and manganese at a temperature of 500° C. to 700° C. to give a precursor oxide containing nickel and manganese.

For the starting material containing nickel and manganese, it is preferable to use a composite hydroxide containing nickel and manganese, a composite oxide containing nickel and manganese, and the like.

Preferably, the pre-baking is performed in an oxidizing atmosphere, i.e., in air or in oxygen.

In the step of pre-baking, it is preferable to synthesize an oxide represented by R32 type $NiMnO_3$ as the precursor oxide.

The pre-baking temperature is preferably 500° C. to 700° C., and the pre-baking time is preferably 2 to 8 hours.

(iii) The step of mixing the precursor oxide with the lithium source and main-baking a resultant mixture to give a lithium-containing transition metal oxide.

Preferably, the main-baking is performed in an oxydizing atmosphere, for example, in air or in oxygen.

The main-baking temperature is preferably 800° C. or higher, and more preferably 900° C. to 1100° C. or, alternatively, 900° C. to 1050° C. The main-baking time is preferably 3 to 24 hours. If the main-baking temperature is less than 800° C., the growth of the crystal structure of the lithium-containing transition metal oxide may be insufficient. On the other hand, if the main-baking temperature exceeds 1100° C., the capacity under high load of the active material tends to be reduced.

For a lithium source, it is preferable to use lithium hydroxide, lithium carbonate, and the like. Lithium hydroxide and lithium carbonate both generate $H_2O$ or $CO_2$ upon baked. The $H_2O$ and $CO_2$ are readily removed to the exterior of the system.

An atomic ratio $m_{Li}/m_T$ between the number of moles of lithium $m_{Li}$ and the number of moles of transition metal $m_T$ contained in the mixture of the precursor oxide and the lithium source is preferably 1.0 or more, further preferably greater than 1.0, and particularly preferably greater than 1.2. Moreover, the atomic ratio $m_{Li}/m_T$ is preferably 1.5 or less. If the atomic ratio $m_{Li}/m_T$ exceeds 1.5, the effective utilization rate of the lithium source may be reduced.

With an atomic ration $m_{Li}/m_T$ in the mixture of the precursor oxide and the lithium source, for example, of greater than 1.2, it is possible to readily obtain an active material in which the integrated intensity ratio $I_{003}/I_{104}$ between the peak $P_{003}$ and the peak $P_{104}$ is 1.02 or more. Moreover, with an atomic ratio $m_{Li}/m_T$ of greater than 1.3, it is possible to readily obtain an active material in which the integrated intensity ratio $I_{003}/I_{104}$ is 1.1 or more.

Preferably, the production method of the present invention further includes the step of washing the lithium-containing transition metal oxide with water after the main-baking. By washing the lithium-containing transition metal oxide with water after the main-baking, excess Li element can be removed.

The temperature of water is not particularly limited, but for example, preferably 20° C. to 95° C., and suitably approximately 60° C.±5° C. The use of the hot water in which excess lithium is readily dissolved improves the efficiency of washing with water, resulting in more stable properties of the finally obtained active material. It is preferable to use hot water in an amount of 300 mL to 1000 mL per 1 g of the active material.

Preferably, the production method of the present invention further includes the step of drying the lithium-containing transition metal oxide at a temperature of 150° C. or higher or, alternatively, at a temperature of 300° C. to 800° C., after washing with water. If the drying temperature is lower than 150° C., the degree of polarization of the active material may be increased during the first charge. Alternatively, the capacity may be reduced or the potential of the active material may become unstable at the end of charge and discharge.

By setting the atomic ratio $m_{Li}/m_T$ in the mixture of the precursor oxide and the lithium source at any value of 1.0 or more and performing the main-baking followed by the washing with water and the drying, it is possible to readily obtain an active material in which the atomic ratio $M_{Li}/M_T$ between the number of moles of lithium $M_{Li}$ and the number of moles of transition metal $M_T$ is any value ranging from 1.1 to 1.25.

In the active material of the present invention, a lattice constant a representing the length of a axis and a lattice constant c representing the length of c axis in the hexagonal crystal structure preferably satisfy 4.945<c/a, and c<14.30 Å.

In the active material of the present invention, the primary particles constituting the lithium-containing transition metal oxide preferably have a mean particle size of 1 μm or less and further preferably of 0.1 to 1 μm. The primary particles are usually fused or sintered to one another at part of their surfaces, thereby to form secondary particles.

The foregoing production method allows the crystal of the lithium-containing transition metal oxide to grow sufficiently. As a result, at least a part of the primary particles have a triangular or hexagonal face on their surfaces in many cases, and thus the shape of the primary particles tends to be columnar.

Preferably, the number of moles of nickel $M_{Ni}$ and the number of moles of manganese $M_{Mn}$ contained in the lithium-containing transition metal oxide are equal to each other. However, it is difficult to control the number of moles of nickel $M_{Ni}$ and the number of moles of manganese $M_{Mn}$ to be precisely equal to each other. Therefore, it suffices if the $M_{Ni}$ and the $M_{Mn}$ are substantially equal to each other. For example, when a molar ratio $M_0$ represented by $(M_{Ni}+M_{Mn})/2$ satisfies $0 \leqq |M_{Ni}-M_0|/M_0 \leqq 0.1$, and $0 \leqq |M_{Mn}-M_0|/M_0 \leqq 0.1$, it may be understood that the $M_{Ni}$ and the $M_{Mn}$ are substantially equal to each other. More preferably, the $M_0$ satisfies $0 \leqq |M_{Ni}-M_0|/M_0 \leqq 0.05$, and $0 \leqq |M_{Mn}-M_0|/M_0 \leqq 0.05$. Particularly preferably, the $M_0$ satisfies $0 \leqq |M_{Ni}-M_0|/M_0 \leqq 0.01$, and $0 \leqq |M_{Mn}-M_0|/M_0 \leqq 0.01$.

Characterization of Active Material (1) Evaluation Method of Electrochemical Characteristics The test cell as shown in FIG. 1 is fabricated in the following manner.

(i) Positive Electrode

A viscous slurry was prepared by mixing 88 wt % of positive electrode active material, 6 wt % of acetylene black, 6 wt % of polyvinylidene fluoride (PVdF), and an appropriate amount of N-methyl-2-pyrrolidone (NMP). The PVdF was used in the form of an NMP solution.

The prepared slurry was applied onto a surface of a positive electrode current collector made of an aluminum foil. The coating film was dried at 60° C. under vacuum. Thereafter, the coating film was dried at 150° C. under vacuum for 14 hours, to give a positive electrode material mixture layer having a thickness of approximately 100 μm. The size of the positive electrode material mixture layer was 15×20 mm$^2$.

(ii) Negative Electrode

A lithium metal foil having a thickness of approximately 200 μm was used as a negative electrode. The size of the negative electrode was 17×22 mm$^2$.

(iii) Non-Aqueous Electrolyte $LiPF_6$ was dissolved at a concentration of 1 mol/L in a mixed solvent including ethylene carbonate (EC) and dimethyl carbonate (DMC) in a volume ratio of 3:7 to prepare a non-aqueous electrolyte. Into a test cell, a predetermined amount of the non-aqueous electrolyte was injected.

(iv) Test Cell

A power generation element was formed by sandwiching a separator 3 between the positive electrode material mixture layer 1 and the negative electrode 4. For the separator 3, a polyethylene microporous film (thickness: 20 μm, Celgard 2500) was used. The positive electrode current collector (aluminum foil) 2 side of the power generation element was supported by a stainless steel plate 6. The negative electrode 4 was supported by a stainless steel plate 7 via a V-shaped spring 5 and applied with a predetermined amount of pressure by the spring 5. This improves the accuracy of evaluation. Between the stainless steel plates 6 and 7, a spacer 8 made of polytetrafluoroethylene was disposed such that it surrounded the power generation element. Around each of the screws fastening the stainless steel plates 6 and 7, a tube made of tetrafluoroethylene was disposed as an insulator.

The battery component members, such as the separator, were dried at 60° C. under vacuum for 2 hours beforehand. The test cell was assembled in an argon atmosphere.

(iv) Charge-Discharge Test

The test cell was subjected to charge and discharge in 25° C. environment at a constant current of 0.17 mA/cm$^2$ (0.5 mA/3 cm$^2$). The end-of-discharge voltage was set at 2.5 V, and the end-of-charge voltage was set at 4.3 V, 4.6 V or 5.0 V.

(2) Preparation of Active Material I

The following preparation method is a modification from the method comprising the steps of mixing a composite hydroxide including nickel and manganese obtained by coprecipitation method with a lithium source and baking the obtained mixture (see Japanese Laid-Open Patent Publication No. Hei 2002-42813). A careful synthesis under the conditions as described below will give an active material having characteristics different from the conventional ones.

First, for a precursor to be mixed with the lithium source, a composite oxide is used instead of the composite hydroxide. For example, the composite hydroxide prepared by coprecipitation is converted into a composite oxide by pre-baking. The composite oxide thus prepared is mixed with the lithium source, and the resultant mixture is subjected to main-baking.

The composite hydroxide can be synthesized with a production apparatus provided with a reaction bath, a cylindrical tube disposed in the reaction bath such that the central axis thereof is in parallel with the vertical direction, and a stirring rod disposed in the tube, the stirring rod being arranged coaxially with the tube. The both ends of the tube are open. In the synthesis of a hydroxide, predetermined starting material aqueous solutions are simultaneously fed into the reaction bath at a predetermined rate. To the starting material aqueous solutions in the tube, a downward force (a force toward the bottom of the reaction bath) is applied by the stirring rod. This force allows the microcrystals in the hydroxide to collide with each other, and thus the crystals are grown. The particles of the hydroxide produced in the tube run outside of the tube to overflow to the exterior of the reaction system, and then are collected. The shape of the particles becomes substantially spherical because of the force of collision. Here, the production apparatus for a hydroxide is not particularly limited, as long as stirring can be performed so as to cause a downward flow with respect to the aqueous solutions in the reaction bath. With such an apparatus, the microcrystals of the hydroxide repeatedly collide with each other to grown into spherical particles.

If dissolved oxygen is present in the aqueous solutions in the reaction bath, only divalent manganese ions, which are susceptible to oxidation, are oxidized and may be isolated as manganese oxyhydroxide. In order to purge the dissolved oxygen present, preferably, nitrogen gas is blown (bubbled) into the aqueous solutions in the reaction bath. By doing this, nickel hydroxide and manganese hydroxide which are closely analogous to each other in structure are coprecipitated simultaneously. As a result, a composite hydroxide in which the elements are uniformly dispersed can be prepared.

<Experiment 1>

As the composite hydroxide, $(Ni_{0.5}Mn_{0.5})(OH)_2$ was synthesized. As the starting material aqueous solutions, an aqueous nickel sulfate solution, an aqueous manganese sulfate solution, an aqueous sodium hydroxide, and an aqueous ammonia solution were used. An aqueous solution containing $NiSO_4$ and $MnSO_4$ each at a concentration of 1.2 mol/liter, an aqueous 4.8 mol/liter NaOH solution, and an aqueous $NH_3$ solution having a predetermined concentration were simultaneously fed into the reaction bath at a rate of 5 mL/min. Stirring was performed so as to cause a downward flow with respect to the aqueous solutions in the reaction bath, thereby to give a hydroxide in the form of spherical particles. The temperature of the aqueous solutions in the reaction bath was maintained at 30 to 50° C. In order to purge the dissolved oxygen present, nitrogen gas was blown (bubbled) into the aqueous solutions in the reaction bath.

It is critical that the prepared composite hydroxide be pre-baked before baked together with the lithium source at a high temperature. Pre-baking is performed by baking a composite hydroxide containing nickel and manganese at a temperature of 500° C. to 700° C. (e.g., 600° C.) for approximately 4 hours in air. As a result, a precursor oxide mainly composed of $NiMnO_3$ can be obtained. The pre-baking temperature influences the characteristics of an active material to be prepared.

To the precursor oxide, the lithium source is added so that the atomic ratio $m_{Li}/m_T$ between the number of moles of lithium $m_{Li}$ and the number of moles of transition metal $m_T$ (total number of moles of nickel and manganese) becomes 1.0. Thereafter, main-baking of the resultant mixture is performed. The main-baking is performed preferably at 800° C. or higher, and more preferably at 900° C. to 1100° C.

The precursor oxide reacts with the lithium source, whereby an active material is produced. During the reaction, lithium is preferably introduced uniformly into the interior of the precursor oxide. Lithium hydroxide melts at a low temperature as compared with lithium carbonate, allowing lithium to be readily introduced into the interior of the precursor oxide. The use of lithium hydroxide is ideal because it allows the reaction with the precursor oxide to proceed gradually from the periphery to the interior of the particles as the temperature is raised. Further, since the surface of the precursor oxide has folds, the molten lithium hydroxide may be readily introduced into the particles. The use of lithium carbonate can also provide an intended single phase; however, it is considered that the use of lithium hydroxide is more advantageous for the reasons as described above.

<Experiment 2>

The composite hydroxide $(Ni_{0.5}Mn_{0.5})(OH)_2$ in the form of spherical particles were pre-baked at 400 to 1000° C. to give a precursor oxide.

The precursor oxide and lithium hydroxide were mixed so that the atomic ratio $m_{Li}/m_T$ was 1.0, and then baked at 1000° C. for 15 hours to synthesize an active material.

Figure 2:
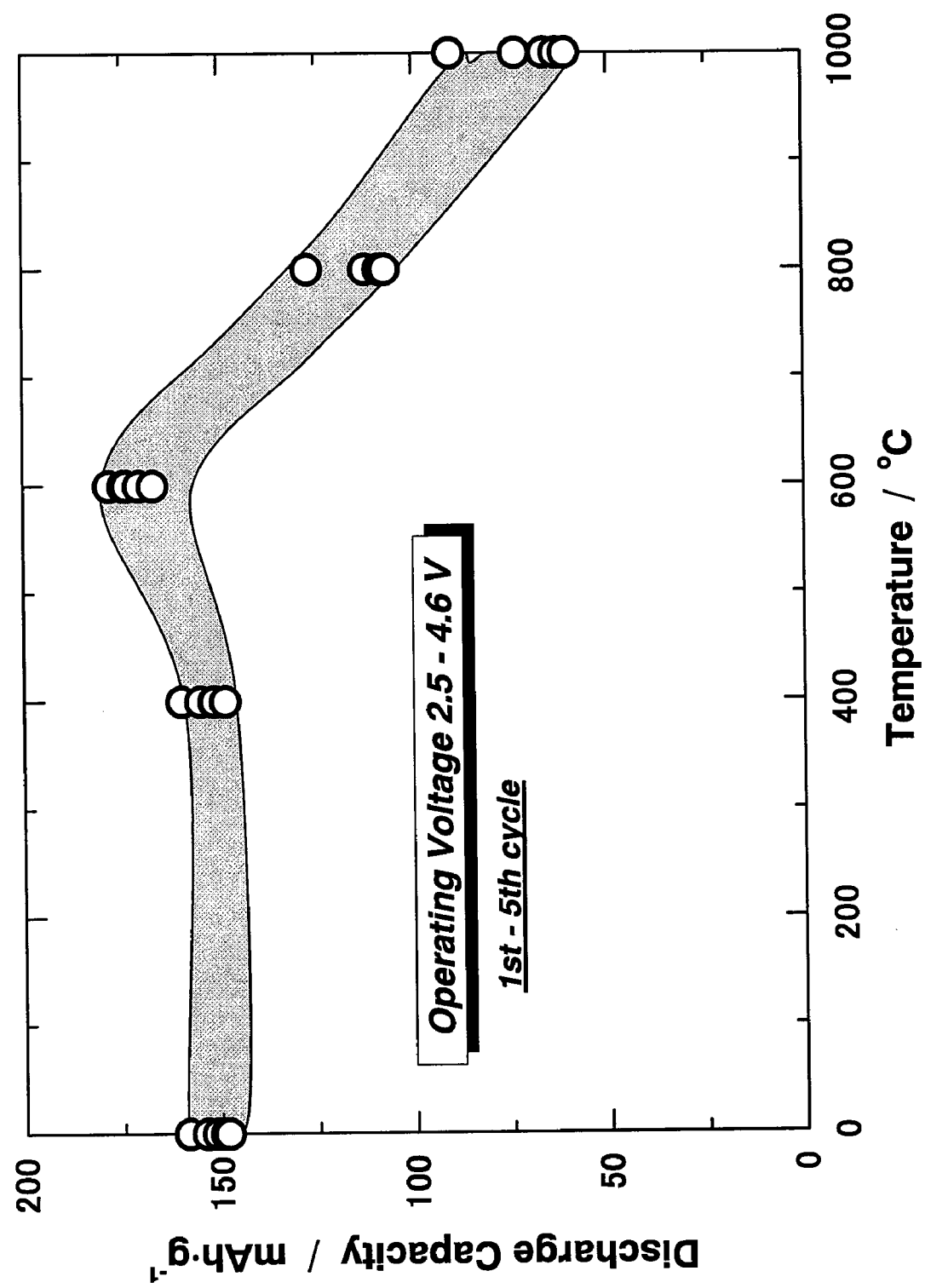
FIG. 2 shows the relationship between the pre-baking temperature in synthesizing a precursor oxide and the discharge capacity of an active material.

FIG. 2 shows the relationship between the pre-baking temperature in synthesizing a precursor oxide and the discharge capacity of an active material. The discharge capacities of the active material fabricated without pre-baking are plotted at 0° C. on the horizontal axis. The discharge capacity of the active material was evaluated in accordance with the method as described above in (1) "Evaluation Method of Electrochemical Characteristics". The end-of-charge voltage was 4.6 V.

FIG. 2 shows the discharge capacities from the 1st cycle to the 5th cycle. The capacity of the active material derived from the precursor oxide obtained by pre-baking at 600° C. is specifically high. The reason for this, although unclear in detail, is considered as follows.

Figure 3:
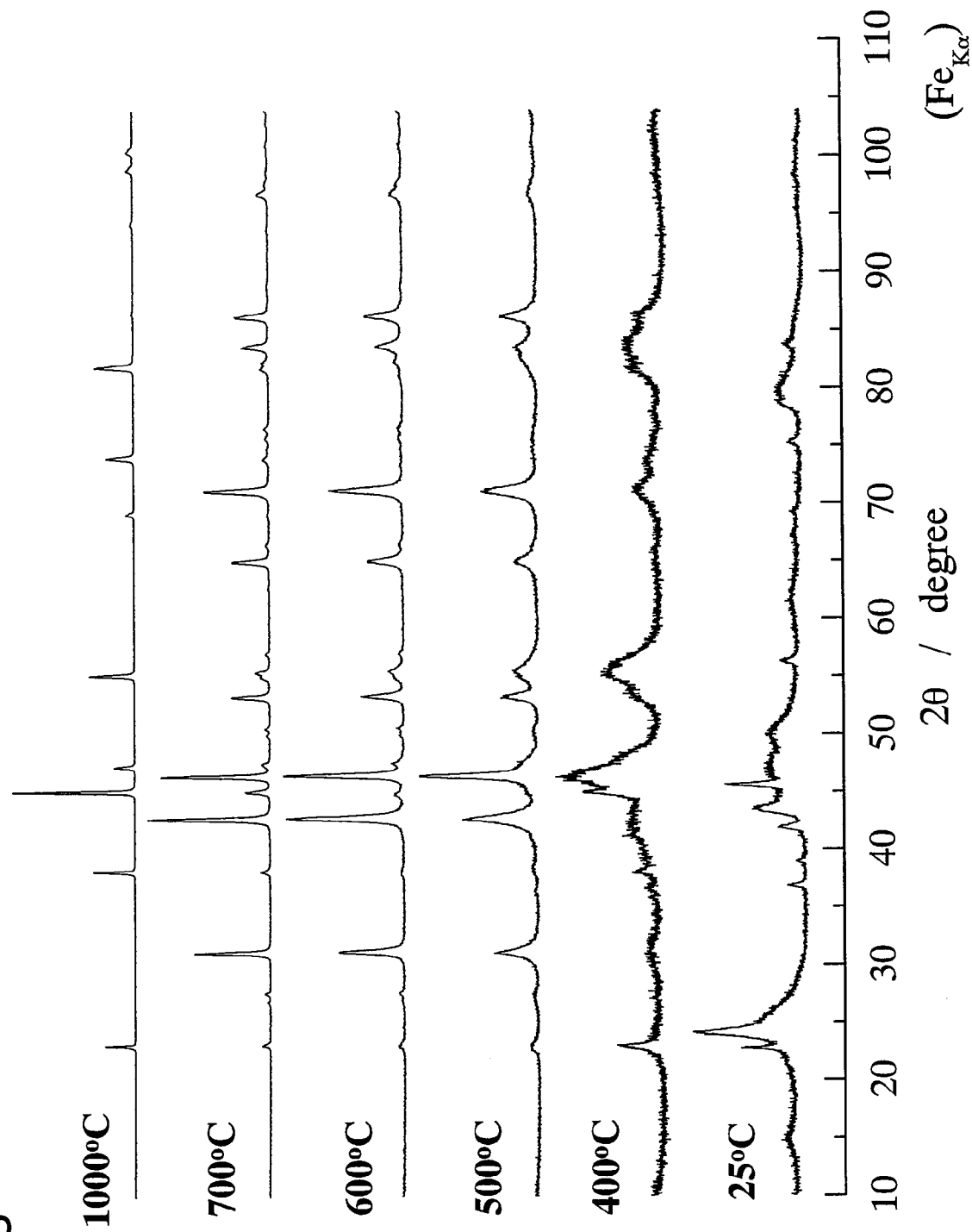
FIG. 3 shows the relationship between the pre-baking temperature in synthesizing a precursor oxide and the XRD pattern of the precursor oxide.

FIG. 3 shows the relationship between the temperature of pre-baking $(Ni_{0.5}Mn_{0.5})(OH)_2$ in the form of spherical particles obtained by coprecipitation method and the XRD pattern of the precursor oxide. In the case where the pre-baking is performed at a temperature of 500° C. to 700° C., the XRD patterns are almost the same. In the case where the pre-baking is performed at 1000° C., the XRD pattern indicates that the material has a spinel structure of Fd3-m and has a cubic closest-packed oxygen array.

Figure 4:
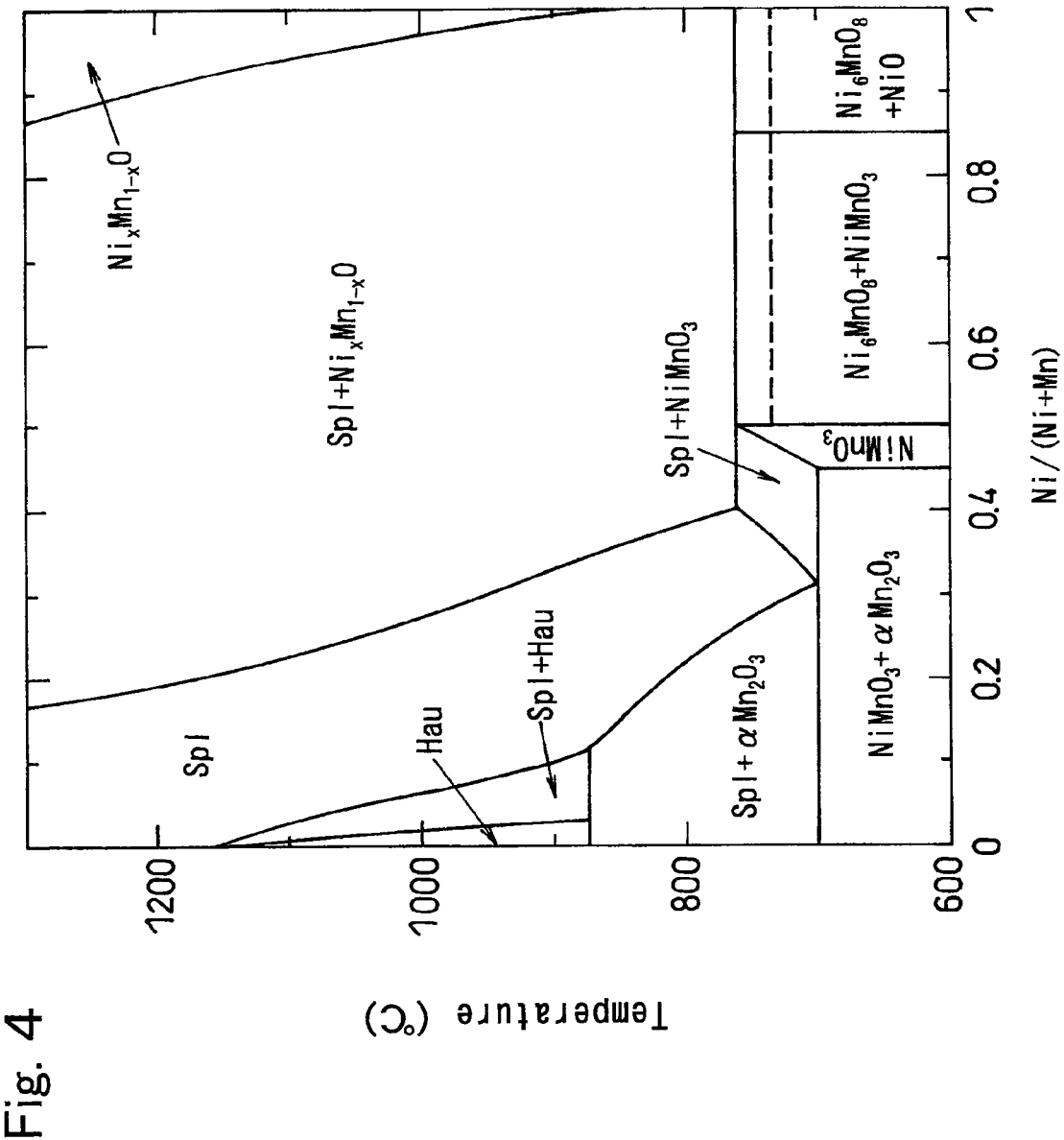
FIG. 4 shows a phase diagram composed of nickel, manganese, and oxygen.

FIG. 4 shows a phase diagram composed of nickel, manganese, and oxygen. From the phase diagram, it is considered that the main component of the precursor oxide obtained at a pre-baking temperature of 500° C. to 700° C. is $NiMnO_3$. Moreover, the phase diagram indicates a possibility that the precursor oxide additionally contains a composite oxide having a spinel structure or $Ni_6MnO_8$. In FIG. 4, "Spl" is an abbreviation of spinel and "Hau" is an abbreviation of hausmannite.

When the atomic ratio of nickel to manganese is 1:1 in the composition, in a region of approximately 600° C. to 760° C., a single phase of $NiMnO_3$ is produced. With the conditions outside this region, a single phase is not produced but a mixture is produced. In view of FIG. 2 and FIG. 4, it is preferable to use $NiMnO_3$ as the precursor oxide; and the crystal structure of the precursor oxide preferably has a hexagonal closest-packed oxygen array.

Figure 5:
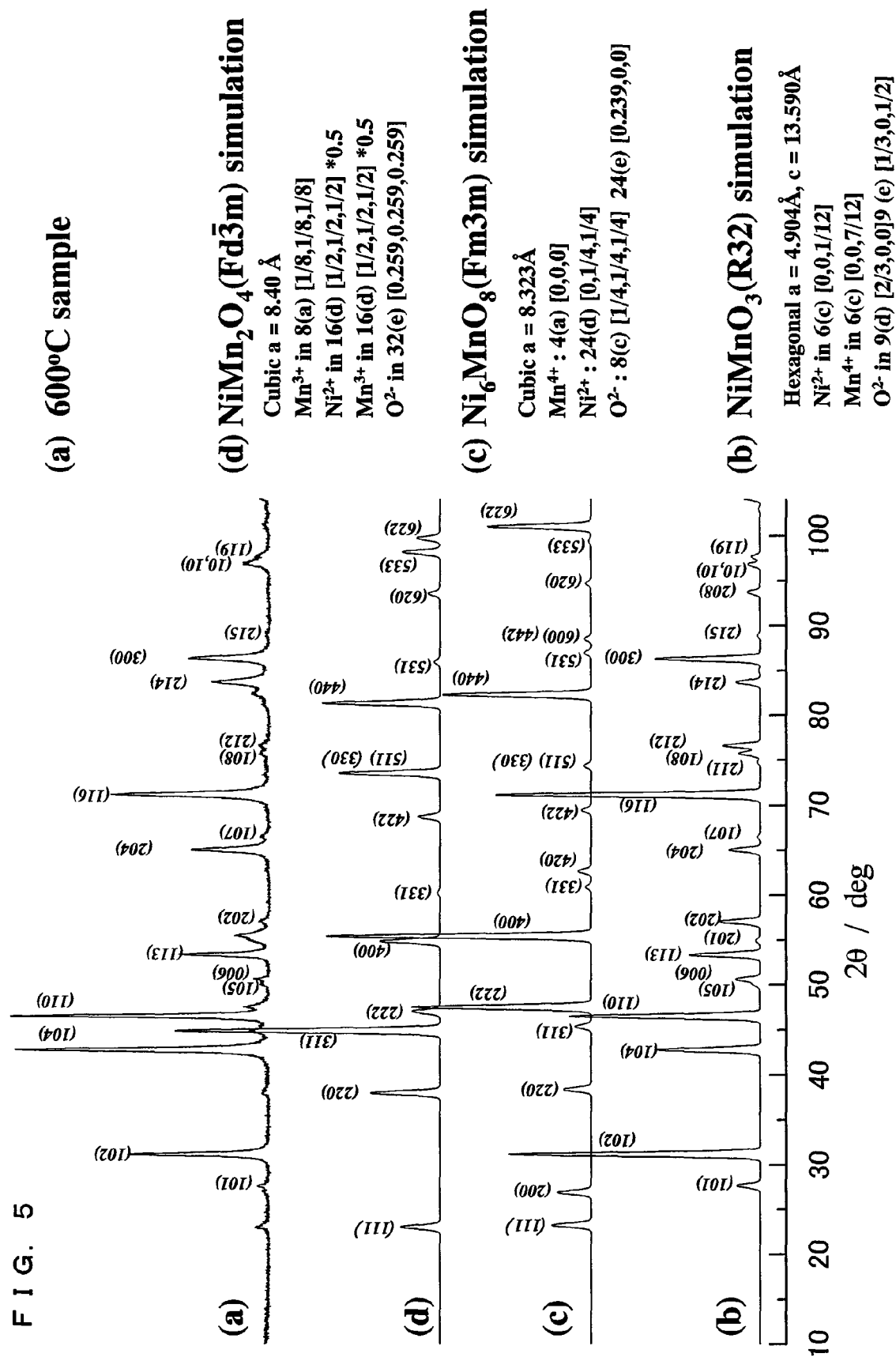
FIG. 5 shows the comparison between the XRD pattern of a precursor oxide obtained by pre-baking at 600° C. and the XRD patterns of various compounds.

FIG. 5 shows an XRD pattern of the precursor oxide obtained by pre-baking at 600° C. and XRD patterns of various compounds estimated to be produced from the phase diagram. The precursor oxide obtained by pre-baking at 600° C. is manly composed of R32 type $NiMnO_3$. As is evident from the peak behavior in the low angle side of 30° or less, both $Ni_6MnO_8$ (Fm3m) and $NiMn_2O_4$ (Fd3-m) are present as impurities in the precursor oxide. It appears that the crystal structure of $NiMnO_3$ is not of corundum crystal, iluminite crystal, or lithium niobate crystal, although one would easily think of these structures.

Figure 6:
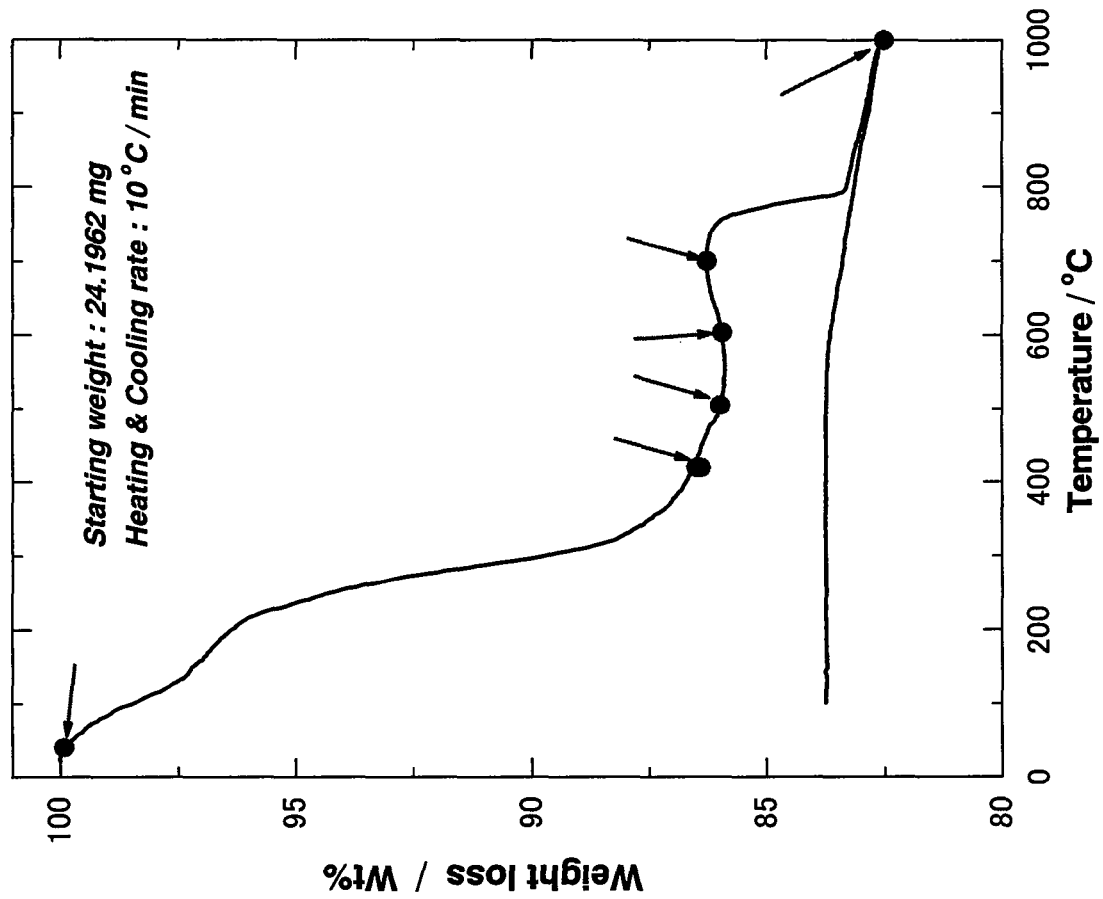
FIG. 6 shows a TG curve of a composite hydroxide containing nickel and manganese.

FIG. 6 shows a TG curve (TG: thermogravimetry) of the composite hydroxide ($Ni_{0.5}Mn_{0.5}(OH)_2$ in the form of spherical particles) obtained by coprecipitation method. The dots indicated by the arrow in the figure correspond to pre-baking temperatures used in the synthesis of compounds whose XRD patters are shown in FIG. 3. In the region of 600° C.±100° C., although slight increase or decrease in weight is observed, the weight remains almost constant, showing no great increase or decrease in weight. This indicates that a $NiMnO_3$ phase is present in this temperature region. It is considered therefore that a preferred range of pre-baking temperature presumably corresponds to the range of 600° C.±100° C. in which the TG curve has an almost flat profile. Presumably, as a result of experiencing a temperature within this range for a certain period of time, the composite hydroxide obtained by coprecipitation method is transformed, because of the absorption thereto or the desorption therefrom of oxygen, to such a state that it has a suitable crystal structure or a suitable composition for a subsequent synthesis of an active material (i.e., R32 type $NiMnO_3$ is produced).

Figure 7:
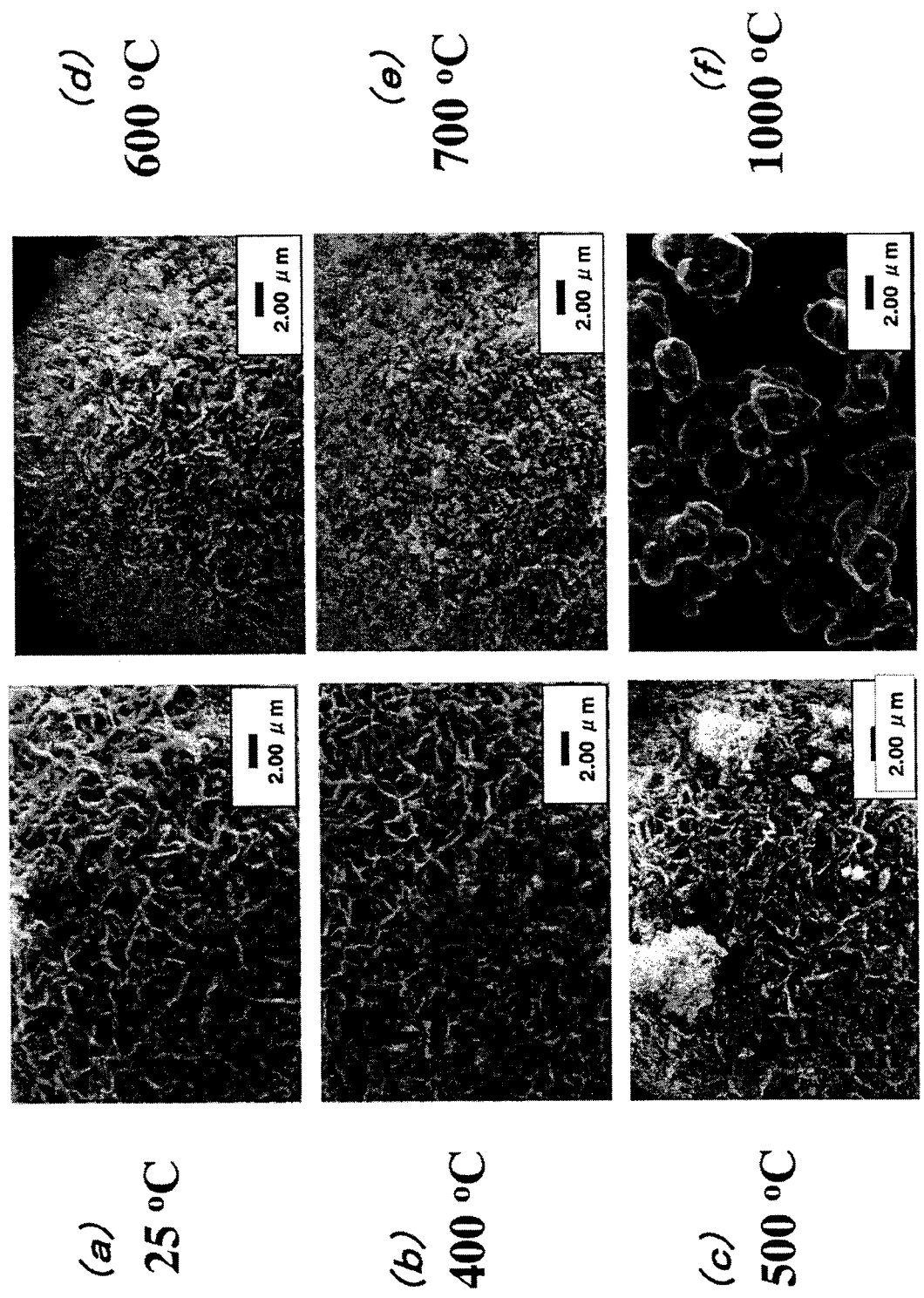
FIG. 7 shows the relationship between the pre-baking temperature in synthesizing a precursor oxide and the SEM image of the particle surface of the precursor oxide.

FIG. 7 shows SEM images (SEM: Scanning Electron Microscopy) of the surfaces of the particles of the precursor oxide obtained by pre-baking at the respective temperatures. With respect to the precursor oxides of (b), (c), (d) and (e) obtained at a pre-baking temperature of 400° C., 500° C., 600° C. and 700° C., respectively, the forms is not significantly different from the form of the spherical composite hydroxide (a) obtained by coprecipitation method. After the pre-baking, the forms of folds on the surfaces are maintained. The particle sizes of the precursor oxides are also almost the same with the size of the composite hydroxide (a) (approximately 20 to 30 μm). On the other hand, in the precursor oxide (f) prepared at a pre-baking temperature of 1000° C., small nuclei of 1 μm or less are produced. The surfaces of the nuclei are partly fused or sintered to form a necking structure. In other words, the shape of the particles of the precursor oxide (f) is no more a spherical shape of the composite hydroxide (a) and is partly collapsed.

(3) Characteristics of Active Material (3)-1 XRD Characteristics

<Experiment 3>

An active material including a lithium-containing transition metal oxide was synthesized by main-baking a mixture of the precursor oxide and the lithium source. In this experiment, the precursor oxide and lithium hydroxide were main-baked at a temperature of 800 to 1100° C. to give an active material. The atomic ratio $m_{Li}/m_T$ was 1.0.

The discharge capacity of the active material was evaluated in accordance with the method as describe above in (1) "Evaluation Method of Electrochemical Characteristics". The end-of-charge voltage was 4.3 V, and the end-of-discharge voltage was 2.5 V.

For comparison, $LiNiO_2$ was synthesized in the same manner as described above using a precursor oxide synthesized in the same manner except that Mn was not contained. The resultant $LiNiO_2$ was evaluated in the same manner except that the end-of-charge voltage was 4.2 V.

Figure 8:
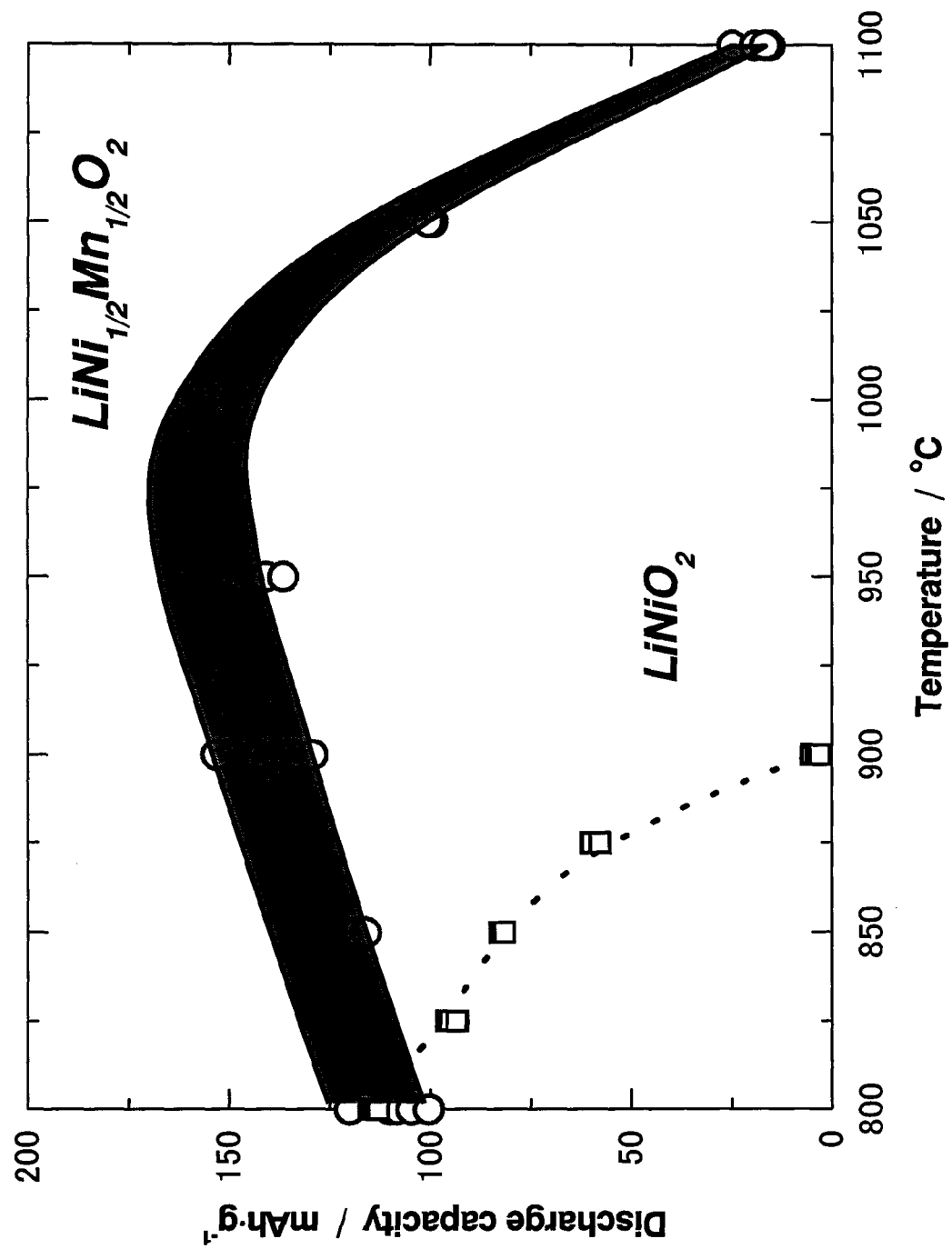
FIG. 8 shows the relationship between the main-baking temperature in synthesizing an active material and the discharge capacity of the active material.
Figure 9A:
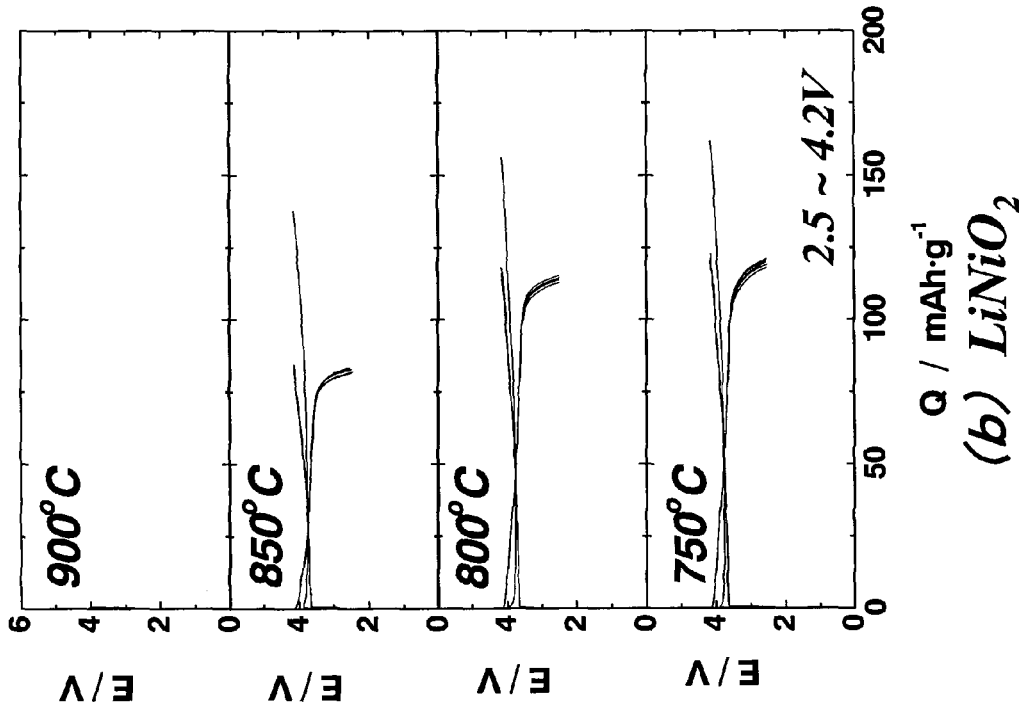
FIG. 9A shows the relationship between the main-baking temperature in synthesizing $LiNi_{1/2}Mn_{1/2}O_2$ and the discharge capacity thereof.
Figure 9B:
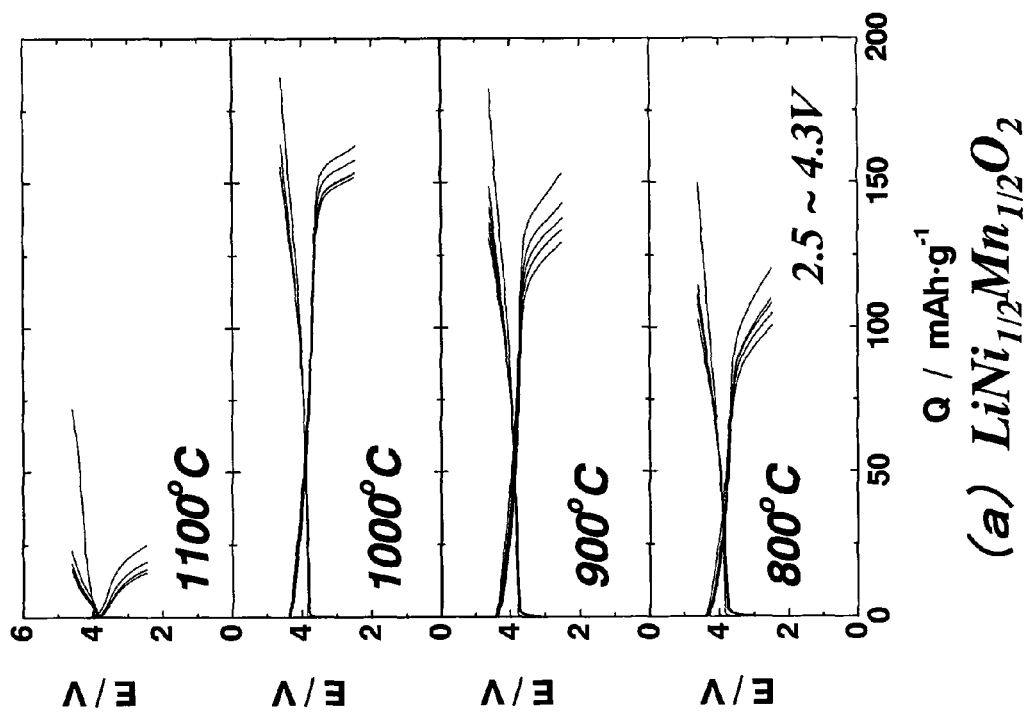
FIG. 9B shows the relationship between the main-baking temperature in synthesizing $LiNiO_2$ and the discharge capacity thereof.

FIG. 8 shows the relationship between the main-baking temperature and the discharge capacity (Q) of the active material. FIG. 9A and FIG. 9B show the charge-discharge curves of the active materials (a) $LiNi_{0.5}Mn_{0.5}O_2$ and (b) $LiNiO_2$ obtained at the foregoing various main-baking temperatures. In the case of $LiNiO_2$, when the main-baking is performed at a temperature of 800° C. or higher, the discharge capacity is sharply decreased. In contrast, in the case of $LiNi_{0.5}Mn_{0.5}O_2$, the discharge capacity increases gradually even when the main-baking temperature is raised up to 1000° C., and after the temperature exceeds 1000° C., the discharge capacity starts decreasing. This indicates that a main-baking temperature around 1000° C. is preferred. In the case of $LiNi_{0.5}Mn_{0.5}O_2$, with an increase in the main-baking temperature up to 1000° C., the crystallization proceeds gradually, causing the capacity to increases. When the temperature exceeds 1000° C., oxygen is lost and the formal valence of the transition metal is decreased, to cause a sharp decrease in the discharge capacity.

In the case of $LiNiO_2$, with an increase in the main-baking temperature, nickel element in the $NaFeO_2$ type layer structure (R3-m) enters the lithium site from the nickel site. Presumably for this reason, the inter-layer intercalation and deintercalation of lithium ions is significantly inhibited.

Figure 10:
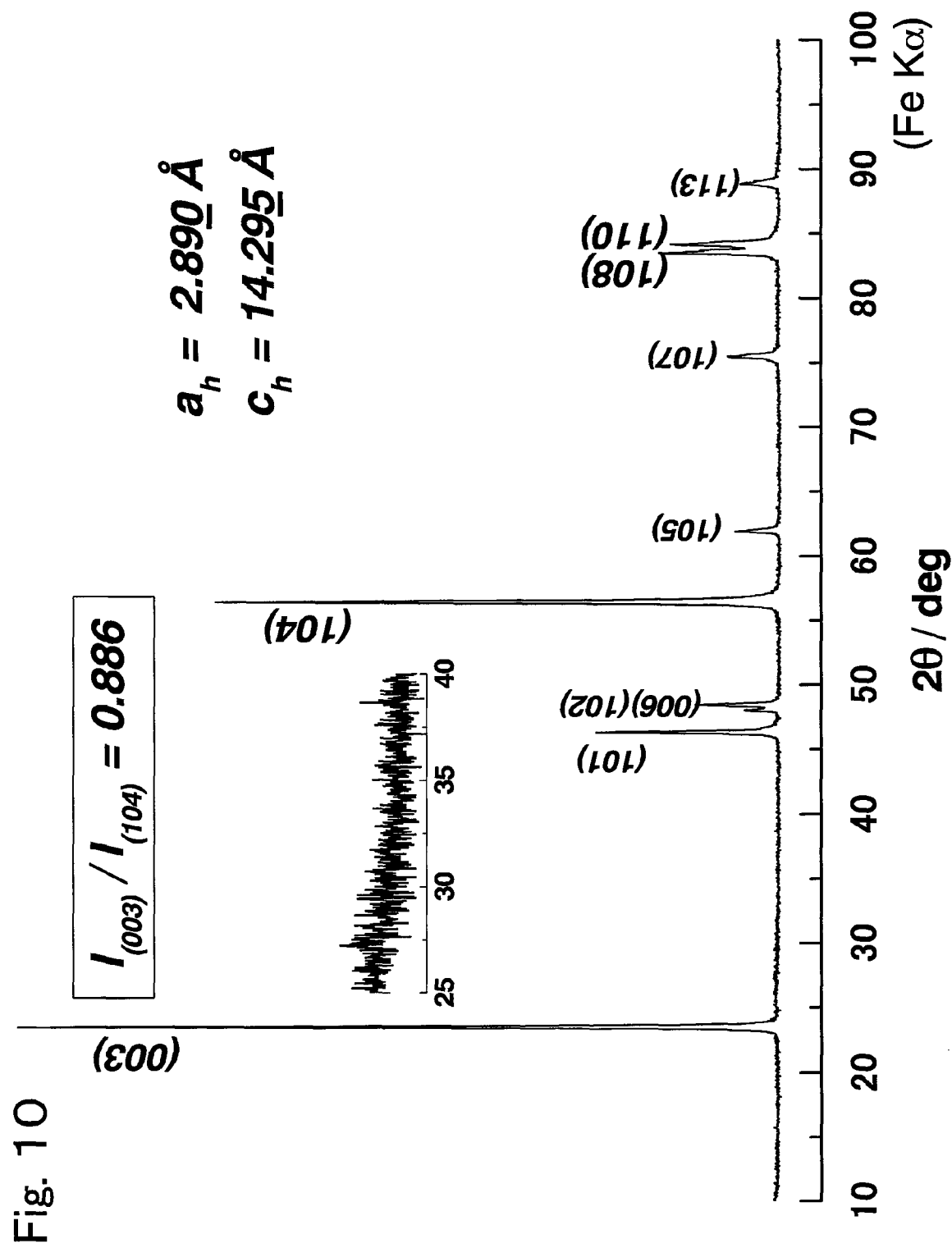
FIG. 10 shows an example of the XRD pattern of an active material.

FIG. 10 shows an XRD pattern of $LiNi_{0.5}Mn_{0.5}O_2$, i.e., the active material obtained by main-baking at 1000° C. in FIG. 9. This XRD pattern is the same as that of the active material having a layer structure belonging to R3-m, such as of $LiCoO_2$. As is evident from the enlarged graph in FIG. 10, no impurity peak attributed to $Li_2MnO_3$ is observed. The values shown in the XRD pattern are of Miller index attributed to a hexagonal crystal system. The X-ray diffraction image has a peak $P_{003}$ attributed to the (003) plane and a peak $P_{104}$ attributed to the (104) plane.

The integrated intensity ratio $I_{003}/I_{104}$ between the peak $P_{003}$ and the peak $P_{104}$ is 0.886. The lattice constant a representing the length of a axis and the lattice constant c representing the length of c axis are a=2.890 Å and c=14.295 Å. The ratio c/a is 4.946. The peaks attributed to the (108) plane and the (110) plane representing the feature of the layer structure are clearly split into two.

(3)-2 Main-Baking Temperature

The XRD pattern shown in FIG. 10 appears to be completely inconsistent with the conventional finding. For example, the main-baking of $LiNiO_2$ not containing Mn is performed at a temperature of approximately 750° C. to 800° C. In this case, the integrated intensity ratio $I_{003}/I_{104}$ of $LiNiO_2$ becomes 1.0 or more, and the peaks attributed to the (108) plane and the (110) plane are clearly split into two. However, when the main-baking temperature is 850° C. or higher, because Ni element enters the Li site, the integrated intensity ratio $I_{003}/I_{104}$ becomes 1.0 or less. Further, the two split peaks attributed to the (108) plane and the (110) plane are gradually overlapped to each other into one. It is known that as this proceeds, the electrochemical characteristics of the active material are sharply reduced.

Judging from the integrated intensity ratio $I_{003}/I_{104}$ of the XRD pattern in FIG. 10 on the basis of the conventional finding, it is predicted that the electrochemical characteristics of the active material of the present invention will be sharply reduced. Contrary to the prediction, as shown in FIG. 9, the active material of the present invention demonstrates an extremely high capacity of 150 mAh/g or more while maintaining high charge and discharge potentials. In $LiNi_{0.5}Mn_{0.5}O_2$, the characteristic XRD pattern does not significantly vary according to the main-baking temperature unlike in $LiNiO_2$, and only the crystallinity varies.

Figure 11:
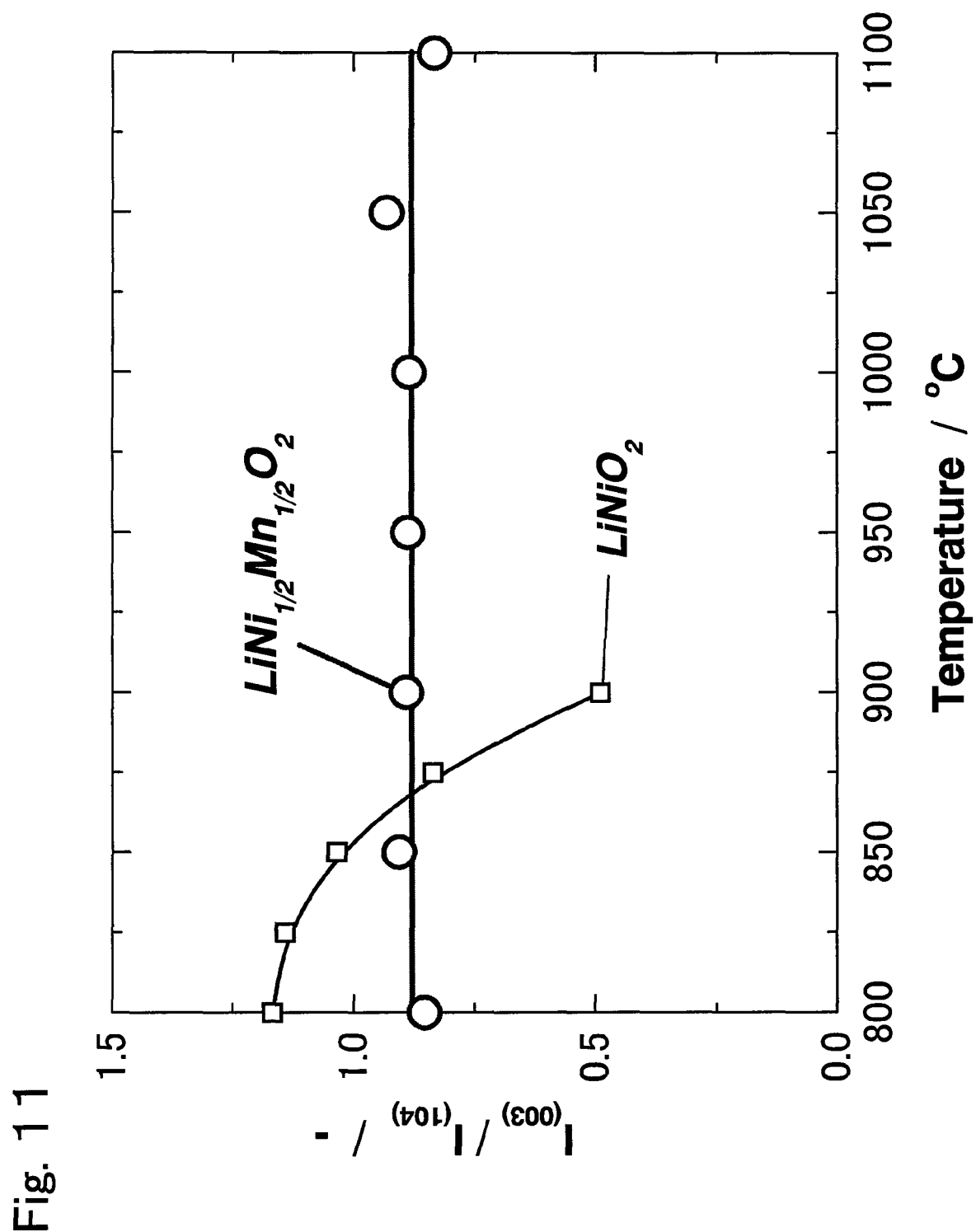
FIG. 11 shows the relationship between the main-baking temperature in synthesizing $LiNi_{1/2}Mn_{1/2}O_2$ and $LiNiO_2$ and the integrated intensity ratio $I_{003}/I_{104}$.

FIG. 11 shows the relationship between the main-baking temperature in synthesizing $LiNi_{0.5}Mn_{0.5}O_2$ and the integrated intensity ratio $I_{003}/I_{104}$. For comparison, the relationship between the main-baking temperature in synthesizing $LiNiO_2$ and the integrated intensity ratio $I_{003}/I_{104}$ is shown on the same graph. In the case of $LiNi_{0.5}Mn_{0.5}O_2$, the integrated intensity ratio is almost constant when the main-baking temperature is within the range from 800° C. to 1100° C. In the case of $LiNiO_2$, when synthesized at a higher main-baking temperature, the integrated intensity ratio is significantly varied and reduced as Ni element enters the Li site. As is shown in FIG. 9, this also results in a significant reduction in the electrochemical characteristics of the active material.

Further, in the XRD patterns of $LiNi_{0.5}Mn_{0.5}O_2$ synthesized by baking for 12 hours at a main-baking temperature of 800° C. to 1100° C., the peaks attributed to the (108) plane and the (110) plane are clearly split into two. The peaks attributed to the (108) plane and the (110) plane are slightly obscure because of the low crystallinity when the main-baking temperature is 800° C. It can be confirmed, however, that these peaks are clearly split into two. In contrast, in the case of $LiNiO_2$, when the main-baking temperature is 850° C. or higher, it becomes impossible to observe that the peaks attributed to the (108) plane and the (110) plane are clearly split into two.

(3)-3 Structural Change in Association with Oxidation and Reduction Reaction

Next, the variation in the XRD pattern in association with charge and discharge is described. It is known that Ni and Mn in $LiNi_{0.5}Mn_{0.5}O_2$ are present in the form of $Ni^{2+}$ and $Mn^{4+}$. As the charge and discharge proceed, the oxidation and reduction reaction of $Ni^{2+} \leftrightarrows Ni^{3+} \leftrightarrows Ni^{4+}$ occurs. $Mn^{4+}$ does not change.

Figure 12:
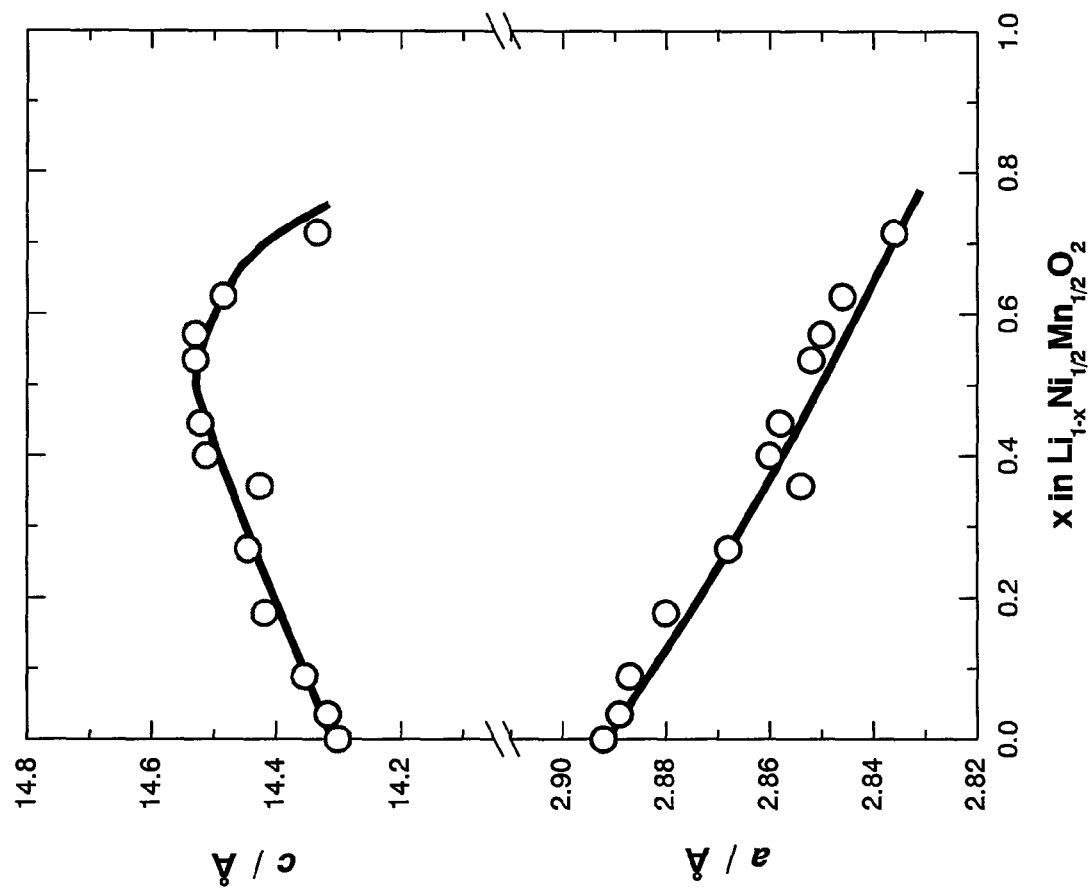
FIG. 12 shows variations in the lattice constant in association with charge and discharge.

FIG. 12 shows variations in the length of a axis and the length of c axis in association with charge and discharge. These lattice constants are values obtained assuming that the active material has a hexagonal crystal structure. The behavior of the length of c axis is the same as that of the normal layer structure, in which the value increases up to 14.5 Å and then drops sharply. In contrast, the length of a axis reflecting the bond distance of Me-O (Me is a transition metal element) decreases monotonously as the oxidation proceeds.

Figure 13:
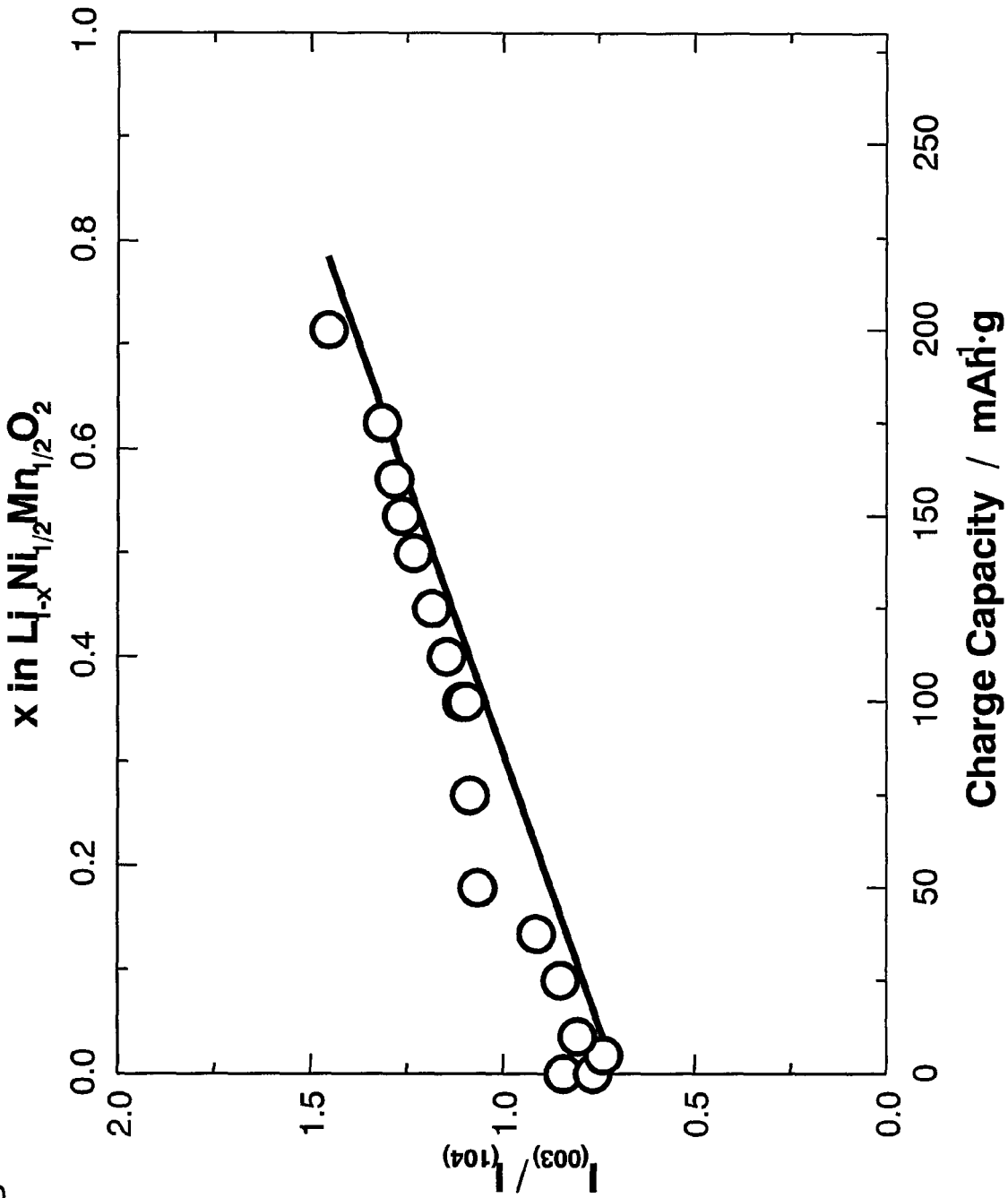
FIG. 13 shows the variation in the integrated intensity ratio $I_{003}/I_{104}$ in association with charge and discharge of an active material.

The specificity is in the variation in the integrated intensity ratio $I_{003}/I_{104}$ in association with oxidation and reduction as shown in FIG. 13. The integrated intensity ratio varies significantly from 0.77 to 1.45 as the desorption of lithium in $LiNi_{0.5}Mn_{0.5}O_2$ proceeds. The $I_{003}/I_{104}$ varies reversibly, and as a whole, varies linearly and continuously as the oxidation and reduction proceed. In the case of an active material having the conventional layer structure, no significant variation is observed in the integrated intensity ratio. Such a significant variation in the integrated intensity ratio is extremely exceptional.

Figure 14:
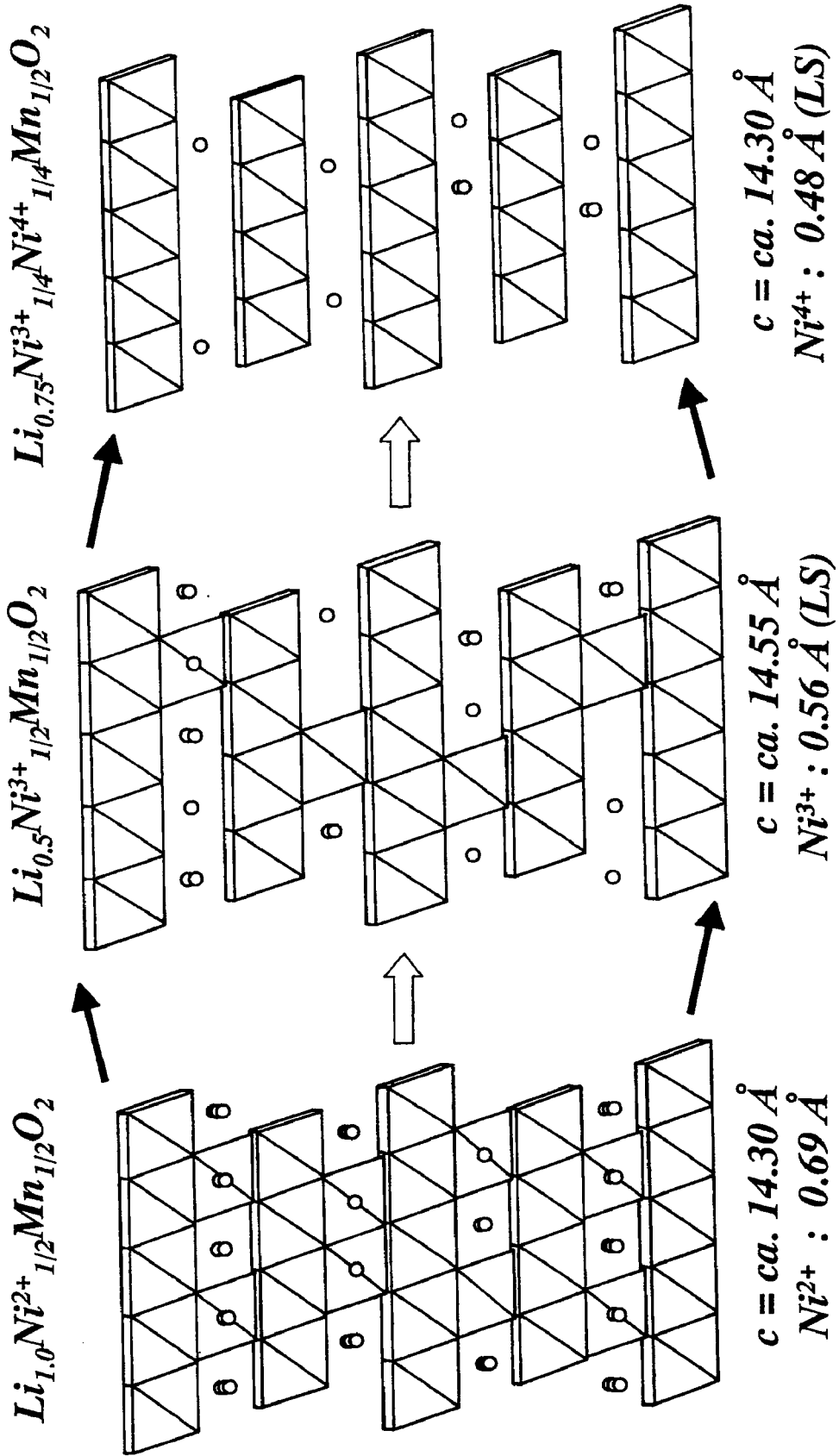
FIG. 14 shows a set of schematic diagrams illustrating assumed migration of nickel element present between layers, in association with charge and discharge.

The explanation of such a variation in the XRD pattern on the assumption that the active material has a layer structure would require an assumed reaction mechanism as shown in FIG. 14. As shown in the figure on the left in FIG. 14, Ni element enters the Li site in the active material immediately after synthesis. This Ni element migrates into the transition metal layers as is normally present, as the oxidation of the active material proceeds. When such a migration of Ni element is assumed to occur, the variation in the integrated intensity ratio can be explained. However, in view of the fact that in the layer composed of transition metal sites is more positively charged as the reaction $Ni^{2+} \rightarrow Ni^{3+}$ occurs, it is extremely difficult to think that the migration of positively charged Ni ions can occur.

As described above, the structural analysis of $LiNi_{0.5}Mn_{0.5}O_2$ of the present invention has not been completed yet, and some points remain unclear. However, it is certain that the structure is not as simple as can be explained that nickel ions are intercalated between the layers in the conventional layer structure.

The behavior of the active material of the present invention is significantly different from that of the conventional active material having a composition similar to that of the active material of the present invention. The active material of the present invention behaves distinctively especially when it contains lithium in excess. As disclosed in Non-Patent Documents 3, 4 and 5, in the case where the conventional active material contains excess lithium, the potential of the active material has a flat portion in the range from 4.5 V to 4.6 V versus lithium metal. In this region, separation of lithium and oxygen from the active material (extraction from the skeleton) occurs, resulting in a large irreversible capacity. In the case of the conventional active material, the irreversible capacity increases in proportion to the increase in the amount of excess lithium used in the synthesis of the active material.

In contrast, in the active material of the present invention, such a phenomenon as observed in the conventional material in which the irreversible capacity increases in proportion to the increase in the amount of excess lithium is not observed. The distinctive behavior demonstrated by the active material of the present invention is described later in detail with reference to Examples, although the detailed mechanism thereof has not been clarified yet.

(4) Preparation of Active Material II

The production method for an active material using a lithium source in excess in the main-baking is described below in more detail. In this method, the atomic ratio $m_{Li}/m_T$ between the number of moles of lithium $m_{Li}$ and the number of moles of transition metal $m_T$ contained in the mixture of the precursor oxide and the lithium source is adjusted to a higher ratio. The production method including the steps of washing with water and drying the active material after main-baking is also specifically described below.

Figure 15:
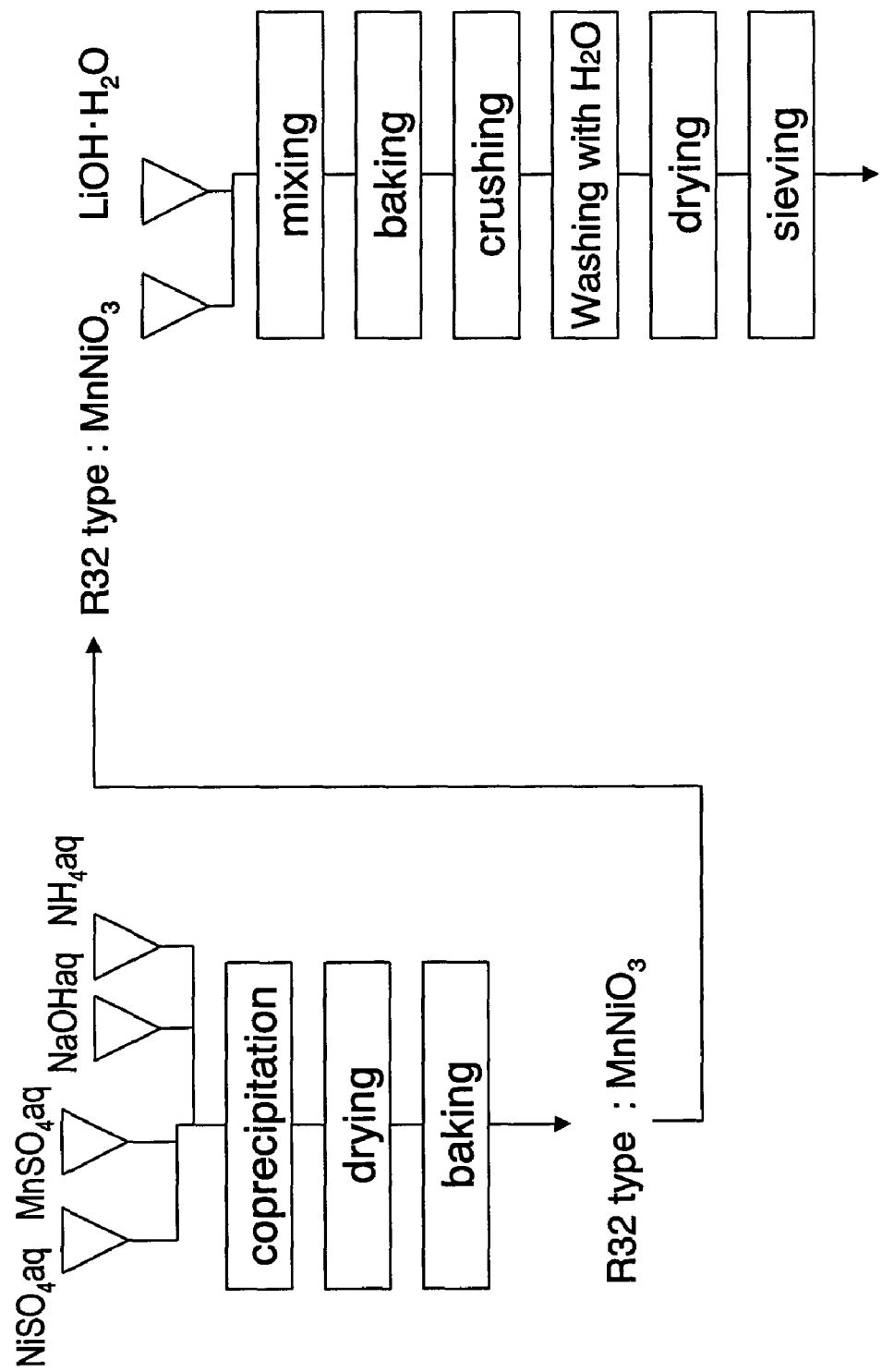
FIG. 15 shows a flow chart illustrating a production method of an active material.

FIG. 15 shows a flow chart illustrating a production method of an active material. The synthesis of a composite hydroxide, the synthesis of a precursor oxide by pre-baking, and the synthesis of a lithium-containing transition metal oxide by main-baking are performed in the same manner as described above in (2) "Preparation of Active Material I".

<Experiment 4>

As the composite hydroxide, $(Ni_{0.5}Mn_{0.5})(OH)_2$ was synthesized by coprecipitation method. The conditions for synthesizing a hydroxide are the same as those described above in (2) "Preparation of Active Material I", unless otherwise described. As the starting material aqueous solutions, an aqueous nickel sulfate solution, an aqueous manganese sulfate solution, an aqueous sodium hydroxide solution, and an aqueous ammonia solution were used. The concentration ratios of the starting material aqueous solutions are shown below.

$NiSO_4/MnSO_4=1.0$ (molar ratio)

$NaOH/(NiSO_4+MnSO_4)=2.3$ (molar ratio)

$NH_3/(NiSO_4+MnSO_4)=2.0$ (molar ratio)

The starting material aqueous solutions were simultaneously fed into the reaction bath such that the transition metals were supplied at a rate of $2.4 \times 10^{-3}$ mol/min. Stirring was performed so as to cause a downward flow with respect to the aqueous solutions in the reaction bath, thereby to give a hydroxide in the form of spherical particles. The temperature of the aqueous solutions in the reaction bath was maintained at 50° C. The circulation rate of the aqueous solutions in the reaction bath was 100 mL/min. In order to purge the dissolved oxygen present, nitrogen gas was blown into the reaction bath. The resultant composite hydroxide was subjected to filter-pressing to be dehydrated, and then dried at 80° C. for 1 hour. The resultant composite hydroxide powder had a mean particle size of 10 to 15 μm and a tap density of approximately 2 g/cm$^3$.

Next, as the precursor oxide, R32 type $NiMnO_3$ was synthesized by baking the composite hydroxide at 600° C. for 4 hours in air atmosphere. The baking was performed at a temperature-increasing rate of 5° C./min, and the baked matter was permitted to cool naturally. The crystal structure of the precursor oxide was identified by XRD analysis and Rietveld analysis.

Figure 16:
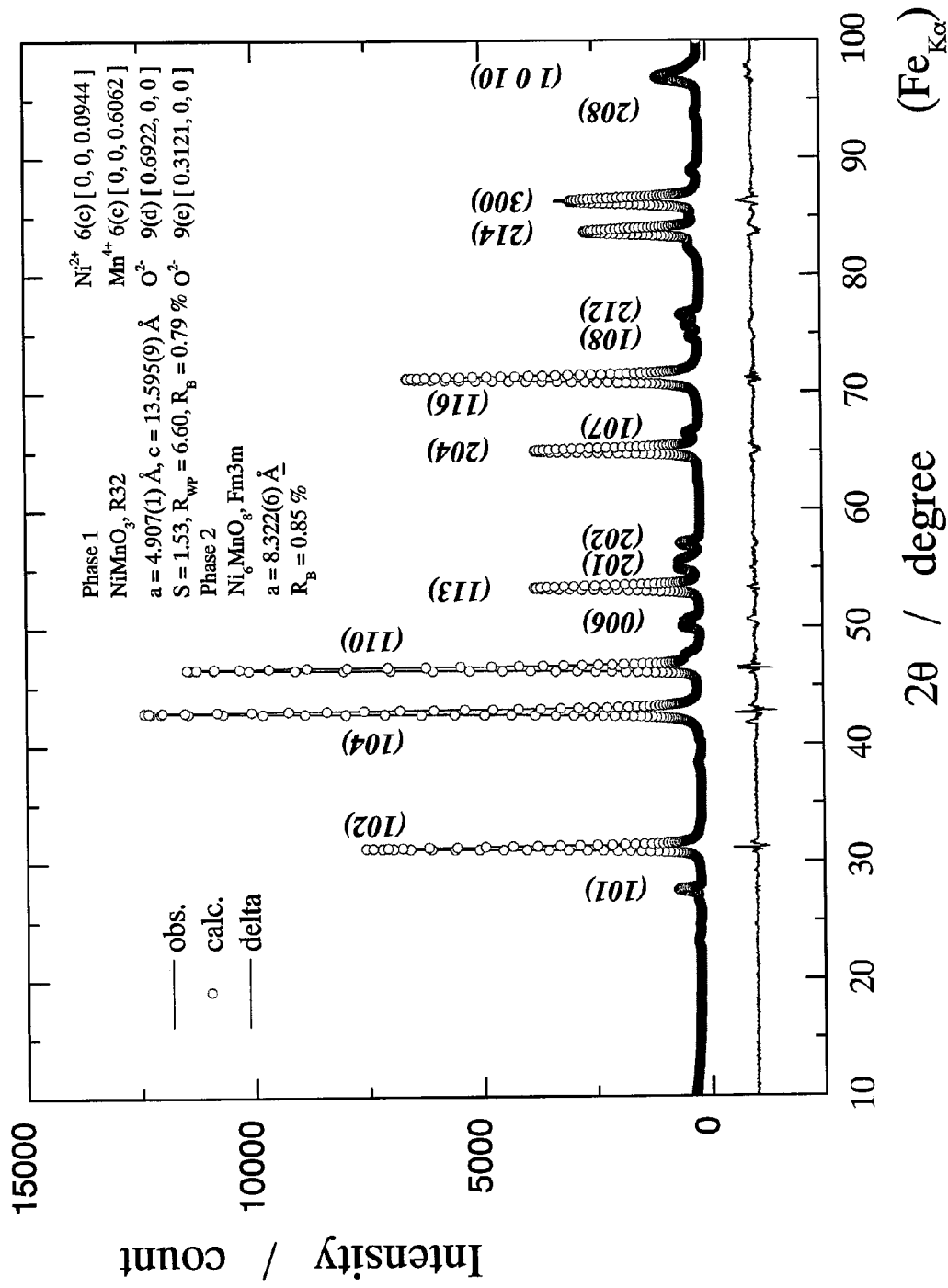
FIG. 16 shows an XRD pattern obtained as a result of structure analysis of a precursor oxide ($LiMnO_3$).

FIG. 16 shows the result of structural analysis of $NiMnO_3$. The result indicates that the majority of the crystals are of R32 type $NiMnO_3$ (Phase 1) and a small amount of $Ni_6MnO_8$ (Phase 2) is included. In the case where the atomic ratio between nickel and manganese is precisely 1:1, it is unlikely that a phase other than $NiMnO_3$ appears. However, if the atomic ratio between nickel and manganese is slightly rich in nickel, $Ni_6MnO_8$ appears as a phase other than $NiMnO_3$. Conversely, if the atomic ratio between nickel and manganese is rich in manganese, cubic-system nickel-manganese spinel appears as a phase other than $NiMnO_3$. When the composite hydroxide is synthesized by coprecipitation method, the different elements are dispersed at the nanolevel, providing uniformity to the composite hydroxide. However, it is difficult to precisely control the element ratio, and one of the elements may be richer than the other.

<Experiment 5>

A lithium-containing transition metal oxide was synthesized by mixing the R32 type $NiMnO_3$ obtained in Experiment 4 with lithium hydroxide in various atomic ratios $m_{Li}/m_T$, and main-baking the resultant mixture. The main-baking was performed at 1000° C. for 12 hours in air atmosphere.

Figure 17:
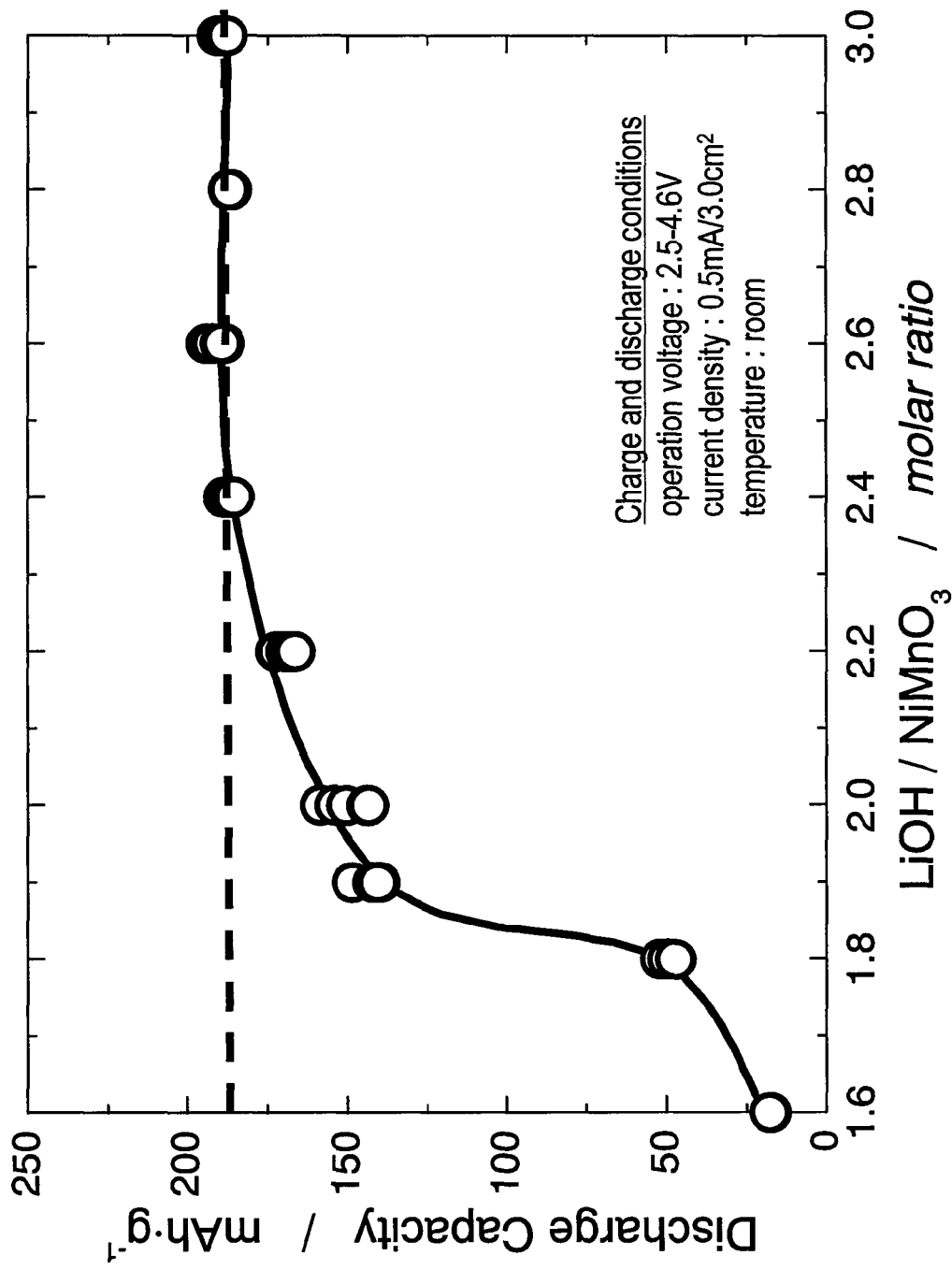
FIG. 17 shows the relationship between the loaded molar ratio of $LiOH/NiMnO_3$ (($m_{Li}/m_T$)×2) and the discharge capacity of the active material.

FIG. 17 shows the relationship between the loaded molar ratio of $LiOH/NiMnO_3$ (i.e., $(m_{Li}/m_T) \times 2$) and the discharge capacity of an active material. The discharge capacity was determined in accordance with the method as describe above in (1) "Evaluation Method of Electrochemical Characteristics of Active Material".

When the molar ratio of $LiOH/NiMnO_3$ exceeds 2.0, the capacity increases sharply and exceeds 150 mAh/g. The capacity increases gradually until the molar ratio of $LiOH/NiMnO_3$ is increased up to 2.4. When the molar ratio of $LiOH/NiMnO_3$ is 2.4 or more, the capacity becomes almost constant. For this reason, the atomic ratio $m_{Li}/m_T$ between the number of moles of lithium $m_{Li}$ and the number of moles of transition metal $m_T$ contained in the mixture of the precursor oxide and the lithium source is preferably greater than 1.0 and more preferably greater than 1.2.

Figure 18:
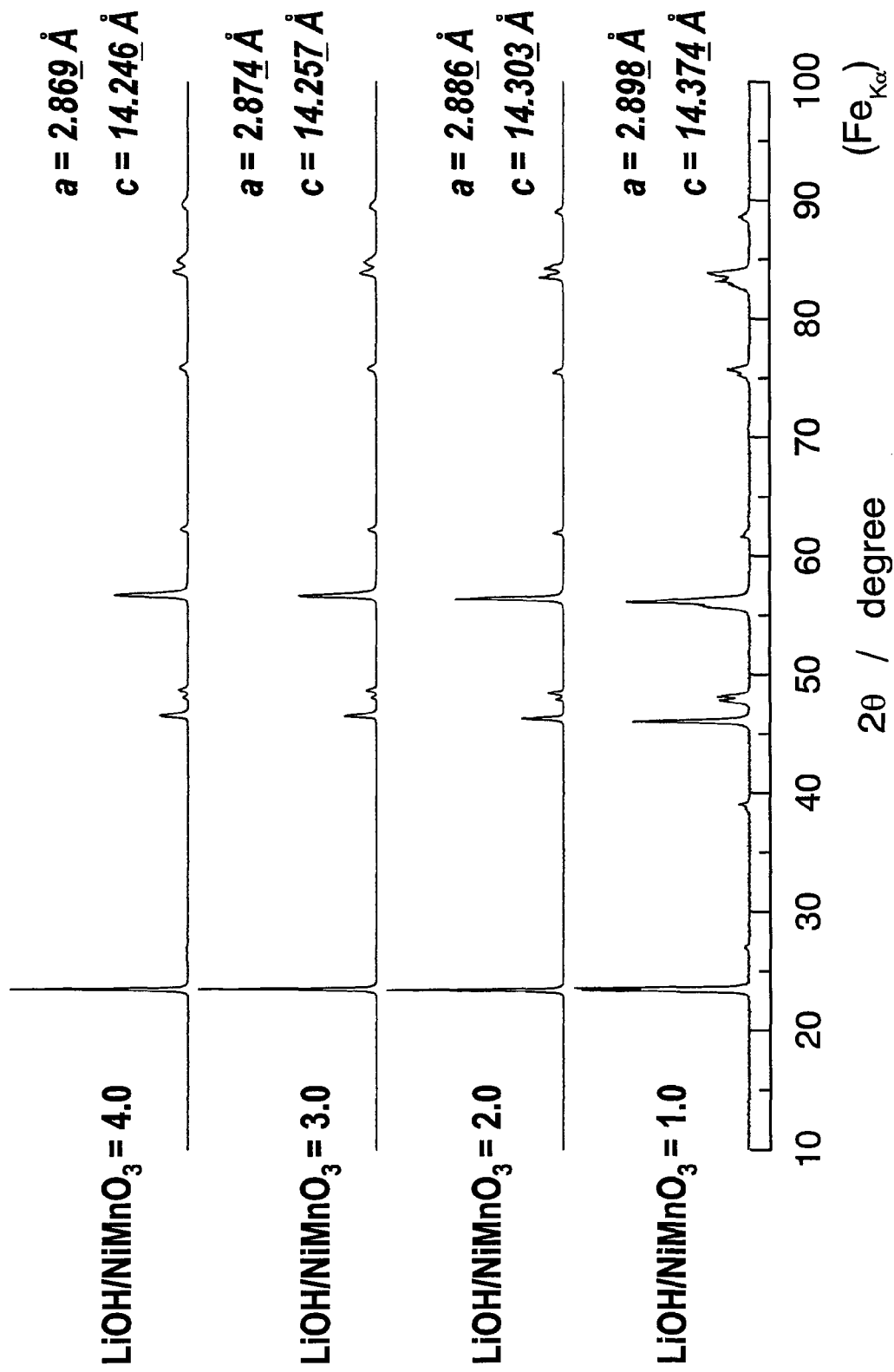
FIG. 18 shows the relationship between the loaded molar ratio of $LiOH/NiMnO_3$ (($m_{Li}/m_T$)×2) and the XRD pattern of the active material.

FIG. 18 shows the relationship between the loaded molar ratio of $LiOH/NiMnO_3$ and the XRD pattern of an active material. When the molar ratio of $LiOH/NiMnO_3$ is 2.0 or more, a single phase attributed to a hexagonal crystal system is formed. Moreover, both the length of a axis and the length of c axis are reduced, and the absolute specific gravity calculated from the lattice constants is increased.

Figure 19B:
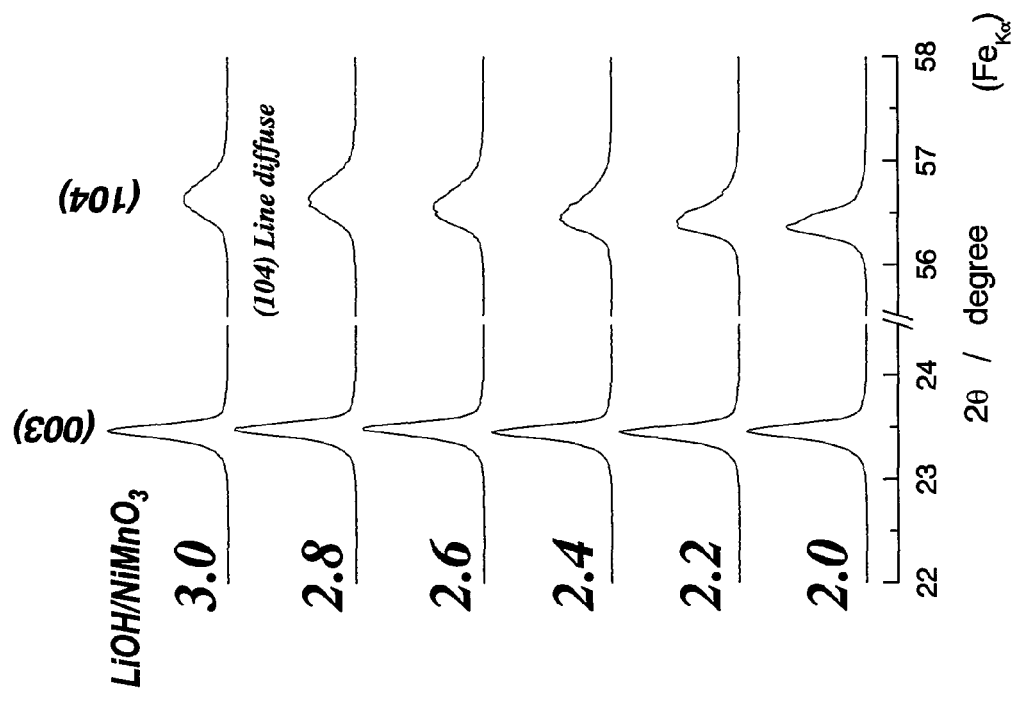
FIG. 19B shows the relationship between the loaded molar ratio of $LiOH/NiMnO_3$ (($m_{Li}/m_T$)×2) and the integrated intensity ratio $I_{003}/I_{104}$.
Figure 19A:
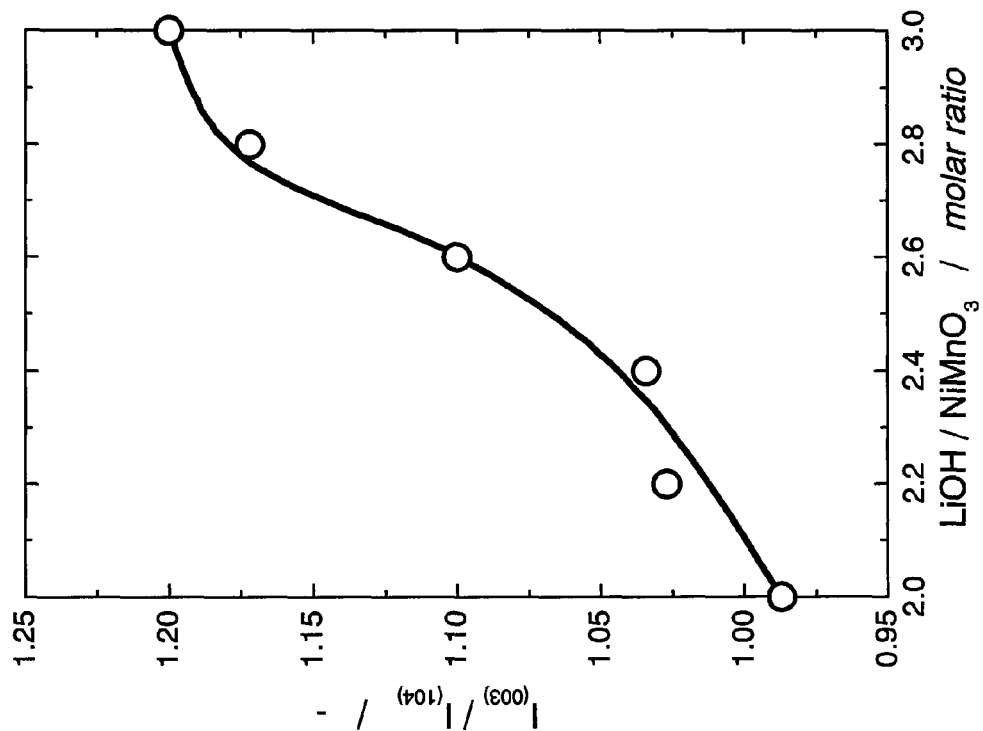
FIG. 19A shows the relationship between the loaded molar ratio of $LiOH/NiMnO_3$ (($m_{Li}/m_T$)×2) and the peaks $P_{003}$ and $P_{104}$.

FIG. 19A shows the relationship between the loaded molar ratio of $LiOH/NiMnO_3$, and the peaks $P_{003}$ attributed to the (003) plane and the peak $P_{104}$ attributed to the (104) plane. As the molar ratio of $LiOH/NiMnO_3$ is increased, only the (104) peak becomes broader.

FIG. 19B shows the relationship between the loaded molar ratio of $LiOH/NiMnO_3$ and the integrated intensity ratio $I_{003}/I_{104}$ of the peak $P_{003}$ to the peak$_{104}$. According to FIG. 17, in view of the capacity, a preferred molar ratio of $LiOH/NiMnO_3$ is 2.4 or more. According to FIG. 19B, when the molar ratio of $LiOH/NiMnO_3$ is 2.4 or more, the integrated intensity ratio $I_{003}/I_{104}$ of the peak $P_{003}$ to the peak$_{104}$ is 1.02 or more. Based on the foregoing, the integrated intensity ratio $I_{003}/I_{104}$ is preferably 1.02 or more. It should be noted that in FIG. 17, when the molar ratio of $LiOH/NiMnO_3$ is 2.6, the capacity is increased to the maximum, although the increase is slight. When the molar ratio of $LiOH/NiMnO_3$ is 2.6, the integrated intensity ratio $I_{003}/I_{104}$ is 1.10.

Figure 20:
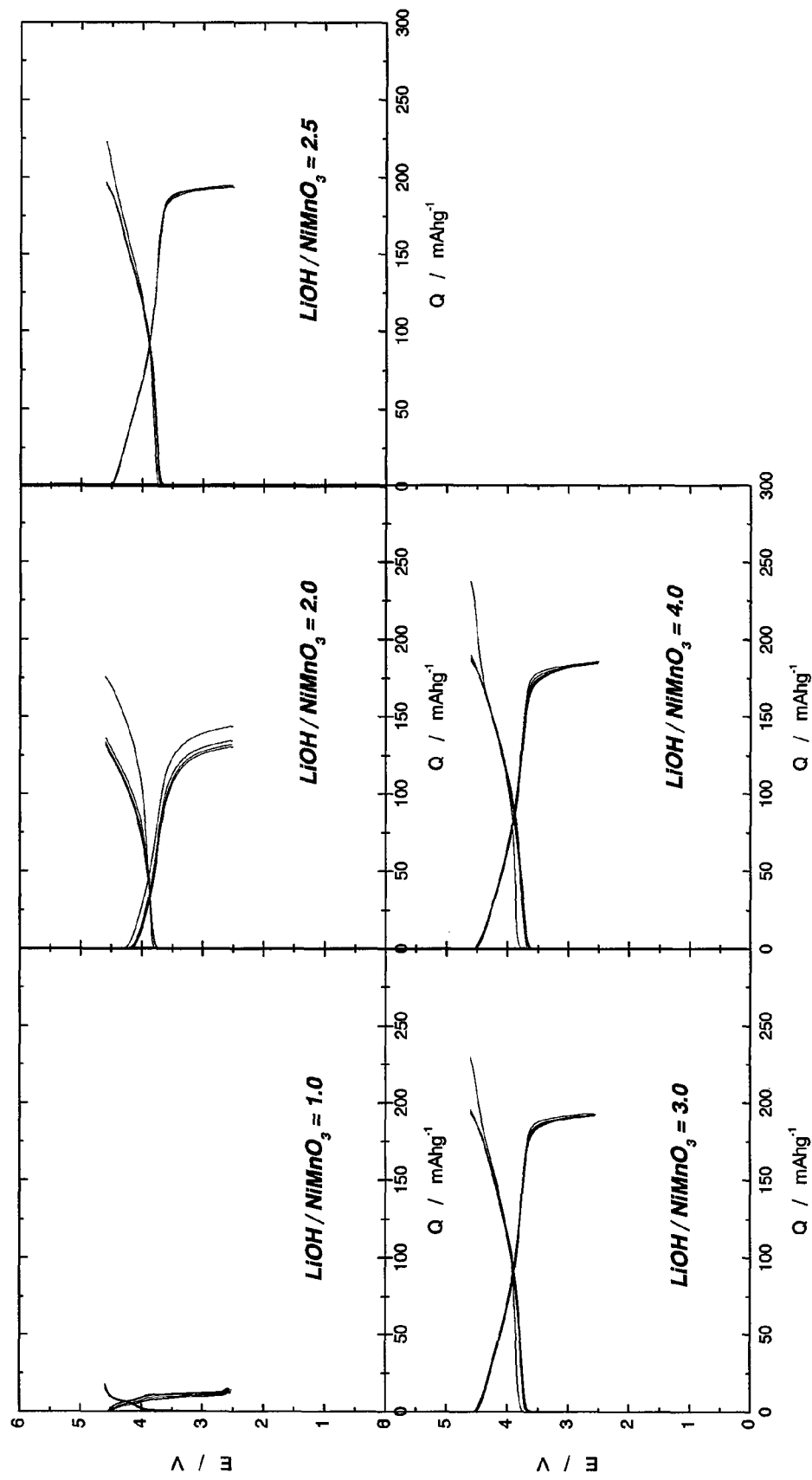
FIG. 20 shows the relationship between the loaded molar ratio of $LiOH/NiMnO_3$ (($m_{Li}/m_T$)×2) and the charge-discharge curve (2.5 V to 4.6 V).

FIG. 20 shows the relationship between the loaded molar ratio of $LiOH/NiMnO_3$ and the charge-discharge curves of an active material (5 cycles). The charge-discharge curves shown in this figure are obtained by setting the operation voltage from 2.5 V to 4.6 V. From FIG. 20, when the molar ratios of $LiOH/NiMnO_3$ are 2.5 and 3.0, the charge-discharge capacities are large, and the profiles of the charge-discharge curves are not varied as the cycling proceeds.

Figure 21:
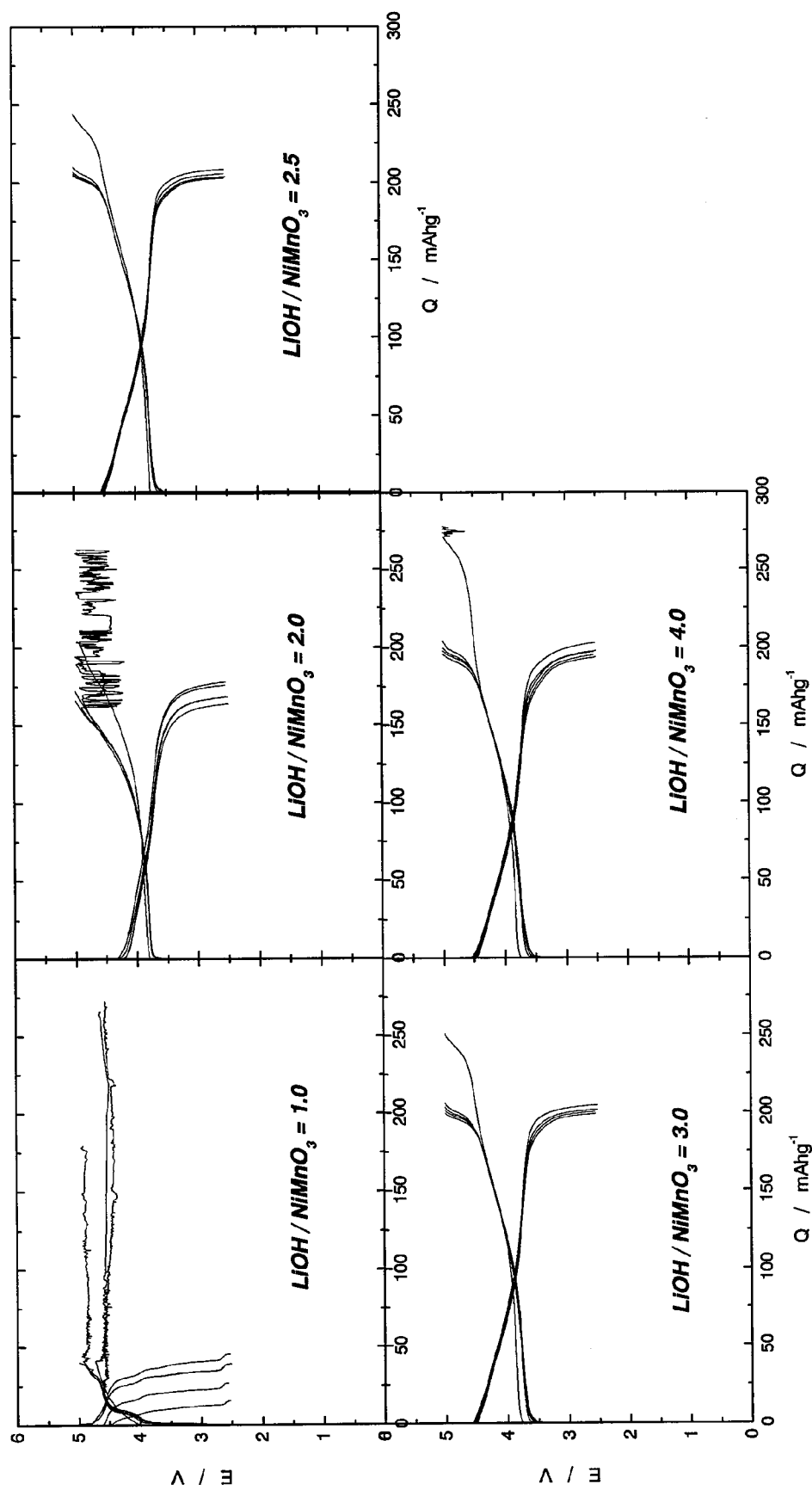
FIG. 21 shows the relationship between the loaded molar ratio of $LiOH/NiMnO_3$ (($m_{Li}/m_T$)×2) and the charge-discharge curve (2.5 V to 5.0 V).

FIG. 21 shows the relationship between the loaded molar ratio of $LiOH/NiMnO_3$ and the charge-discharge curves of an active material (5 cycles). The charge-discharge curves shown in this figure are obtained by setting the operation voltage from 2.5 V to 5.0 V. From FIG. 21, also in light of the stability in potential in the charge up to a high voltage of 5.0 V, when the molar ratios of $LiOH/NiMnO_3$ are 2.5 and 3.0, favorable results are obtained.

Based on the foregoing, a preferred molar ratio of $LiOH/NiMnO_3$ is greater than 2.4 and 3.0 or less. In other words, a preferred atomic ratio $m_{Li}/m_T$ between the number of moles of lithium $m_{Li}$ and the number of moles of transition metal $m_T$ contained in the mixture of the precursor oxide and the lithium source is greater than 1.2 and 1.5 or less. A more preferred atomic ratio $m_{Li}/m_T$ is 1.3 or more.

It should be noted that when the molar ratio of $LiOH/NiMnO_3$ is greater than 2.4, it is considered that LiOH acts as Li flux in the synthesis of the active material, and therefore all of the LiOH is not allowed to be contained in the active material. Excess Li should be preferably removed because it does not contribute to the charge and discharge capacities. By removing the excess Li that does not contribute to the charge and discharge capacities, the charge and discharge capacities per weight of the active material is increased. The excess Li can be removed by washing with water the active material obtained by main-baking. Prior to washing with water, the active material obtained by main-baking should be preferably crushed with the use of a jet mill. The mean particle size of the active material before washing with water is preferably approximately 5 to 20 μm.

For washing with water, although room temperature water may be used, hot water is preferably used. Excess lithium is easily dissolved in hot water. The use of hot water, therefore, allows the efficiency of washing with water to improve, and the variation of characteristics in the active materials to be reduced. The temperature of hot water is not particularly limited, but preferably is, for example, approximately 60° C. It is preferable to use hot water in an amount of 300 mL to 1000 mL per 1 g of the active material. The active material after washing with water is dehydrated and then dried.

(5) Configuration of Non-Aqueous Electrolyte Secondary Battery

The active material of the present invention is suitable for a positive electrode active material for a non-aqueous electrolyte secondary battery. The components of the non-aqueous electrolyte secondary battery other than the positive electrode active material are not particularly limited. Typical component materials of the non-aqueous electrolyte secondary battery are described below.

A positive electrode usually comprises a positive electrode current corrector and a positive electrode material mixture carried thereon. The positive electrode material mixture may include a binder, a conductive agent, and the like in addition to the positive electrode active material. The positive electrode is obtained, for example, by mixing a positive electrode material mixture composed of the positive electrode active material and an optional component with a liquid component to prepare a positive electrode material mixture slurry, applying the resultant slurry onto the positive electrode current collector, and then drying.

A negative electrode also usually comprises a negative electrode current corrector and a negative electrode material mixture carried thereon. The negative electrode material mixture may include a binder, a conductive agent, and the like in addition to the negative electrode active material. The negative electrode is obtained, for example, by mixing the negative electrode material mixture composed of the negative electrode active material and an optional component with a liquid component to prepare a negative electrode material mixture slurry, applying the resultant slurry onto the negative electrode current collector, and then drying.

For the negative electrode active material, it is possible to use, for example, metal, a metal fiber, a carbon material, an oxide, a nitride, a tin compound, a silicon compound, various alloy materials, and the like. Examples of the carbon material include, for example, various natural graphites, coke, partially-graphitized carbon, a carbon fiber, a spherical carbon, various artificial graphites, an amorphous carbon, and the like. Moreover, silicon simple substance, a silicon alloy, a silicon compound, a silicon solid solution, tin simple substance, a tin alloy, a tin compound, a tin solid solution, and the like are preferred because of their high capacity density. The Si and Sn may be partially substituted with another element. Examples of the another element include B, Mg, Ni, Ti, Mo, Co, Ca, Cr, Cu, Fe, Mn, Nb, Ta, V, W, Zn, C, N and Sn. As the silicon compound, $SiO_x$ ($0.05<x<1.95$) is preferred; and as the tin compound, $Ni_2Sn_4$, $Mg_2Sn$, $SnO_x$ ($0<x<2$), $SnO_2$, $SnSiO_3$, and the like are preferred. The negative electrode active material may be used alone or in combination of two or more.

For the binder for the positive electrode and the negative electrode, it is possible to use, for example, polyvinylidene fluoride (PVDF), polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, carboxymethyl cellulose, and the like. Further, a copolymer of two or more monomers selected from tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene may be used. The binder may be used alone or in combination of two or more.

For the conductive agent to be included in the electrode, it is possible to use, for example, graphites, such as natural graphite and artificial graphite; carbon blacks, such as acetylene black, Ketjen black, channel black, furnace black, lamp black, and thermal black; conductive fibers, such as a carbon fiber and a metal fiber; carbon fluoride; metal powders, such as aluminum; conductive whiskers, such as zinc oxide and potassium titanate; a conductive metal oxide, such as titanium oxide; an organic conductive material, such as a phenylene derivative; and the like.

Desirably, the positive electrode active material, the conductive agent, and the binder are included in the positive electrode material mixture within the range from 80 to 97 wt % for the positive electrode active material, 1 to 20 wt % for the conductive agent, and 1 to 10 wt % for the binder. Desirably, the negative electrode active material and the binder are included in the negative electrode material mixture within the range from 93 to 99 wt % for the negative electrode active material and 1 to 10 wt % for the binder.

For the current collector, a continuous length of porous conductive substrate and a nonporous conductive substrate may be used. For the positive electrode current collector, for example, stainless steel, aluminum, titanium, and the like are used. For the negative electrode current collector, for example, stainless steel, nickel, copper, and the like are used. The thickness of these current collectors is preferably 1 to 500 μm, and more preferably 5 to 20 μm, although not limited thereto. By selecting a thickness of the current collectors within the range above, the electrode plates can be made lighter in weight, while the strength thereof is maintained.

For the separator interposed between the positive electrode and the negative electrode, a microporous thin film, a woven fabric, a non-woven fabric, and the like that are excellent in ion permeability and have a predetermined mechanical strength as well as an insulating property may be used. Examples of the material for the separator include, for example, a polyolefin such as polypropylene and polyethylene. The polyolefin is preferred in light of the safety of the non-aqueous electrolyte secondary battery because it is excellent in durability and has a shut down function. The thickness of the separator is generally 10 to 300 μm, desirably 40 μm or less, preferably 15 to 30 μm, and more preferably 10 to 25 μm. The microporous thin film may be a single layer film made of one material, or a composite film or a multi-layered film made of one material or two or more materials. The porosity of the separator is preferably from 30 to 70%. The porosity as used herein refers to the ratio of a volume of the pore portion to a volume of the separator. A more preferred range of the porosity of the separator is from 35 to 60%.

For the non-aqueous electrolyte, a material in the form of liquid, gel, or solid may be used. A liquid non-aqueous electrolyte (non-aqueous electrolyte solution) is obtained by dissolving a solute (e.g., a lithium salt) in a non-aqueous solvent. A gel electrolyte includes the non-aqueous electrolyte and a polymer material retaining the non-aqueous electrolyte. For the polymer material, for example, polyvinylidene fluoride, polyacrylonitrile, polyethyleneoxide, polyvinyl chloride, polyacrylate, polyvinylidene fluoride-hexafluoropropylene copolymer, and the like are suitably applicable.

There is no particular limitation on the type of the non-aqueous solvent in which the solute is dissolved. It is possible to use, for example, cyclic carbonic acid ester, chain carbonic acid ester, cyclic carboxylic acid ester, and the like. The cyclic carbonic acid ester is exemplified by propylene carbonate (PC), ethylene carbonate (EC), and the like. The chain carbonic acid ester is exemplified by diethyl carbonate (DEC), ethyl methyl carbonate (EMC), dimethyl carbonate (DMC), and the like. The cyclic carboxylic acid ester is exemplified by γ-butyrolactone (GBL), γ-valerolactone (GVL), and the like. The non-aqueous solvent may be used alone or in combination of two or more.

For the solute to be dissolved in the non-aqueous solvent, it is possible to use, for example, $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, chloroborane lithium, borates, imides, and the like. Examples of the borates include lithium bis(1,2-benzendioleate(2-)-O,O')borate, lithium bis(2,3-naphthalenedioleate (2-)-O,O')borate, lithium bis(2,2'-biphenyldioleate(2-)-O,O') borate, lithium bis(5-fluoro-2-oleate-1-benzenesulfonate-O, O')borate, and the like. Examples of the imides include lithium bis(trifluoromethanesulfonyl)imide(($CF_3SO_2)_2NLi$), lithium trifluoromethanesulfonyl nonafluorobutanesulfonyl imide ($LiN(CF_3SO_2)(C_4F_9SO_2)$), and lithium bis(pentafluoroethanesulfonyl)imide (($C_2F_5SO_2)_2NLi$), and the like. The solute may be used alone or in combination of two or more. Desirably, the dissolving amount of the solute in the non-aqueous solvent is within a range from 0.5 to 2 mol/L.

The non-aqueous electrolyte may include a material serving as an additive that will decompose on the negative electrode and form a coating film with high lithium ion conductivity and thus can improve the charge-discharge efficiency. The additive having such a function is exemplified by, for example, vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate (VEC), divinylethylene carbonate, and the like. These may be used alone or in combination of two or more. Among these, at least one selected from the group consisting of vinylene carbonate, vinyl ethylene carbonate, and divinylethylene carbonate is preferred. In the above compounds, hydrogen atoms may be partially substituted with fluorine atoms.

In the non-aqueous electrolyte, a known benzene derivative that will decompose during overcharge and form a coating film on the electrode to inactivate the battery may be contained. For the benzene derivative, the one including a phenyl group and a cyclic compound group adjacent to the phenyl group is preferred. For the cyclic compound group, a phenyl group, a cyclic ether group, a cyclic ester group, a cycloalkyl group, and a phenoxy group, and the like are preferred. Specific examples of the benzene derivative include cyclohexyl benzene, biphenyl, diphenyl ether, and the like. These may be used alone or in combination of two or more. However, the content of the benzene derivative is preferably 10 vol % or less relative to the total volume of the non-aqueous solvent.

In the following, the present invention is described with reference to Examples.

Example 1

An active material ($LiNi_{0.5}Mn_{0.5}O_2$) that behaves differently from the lithium-containing transition metal oxide having the conventionally known layer structure was synthesized in the manner as described below. The active material was synthesized by the method as described above in (2) "Preparation Method of Active Material I".

(i) Starting Material Containing Nickel and Manganese

As the starting material containing nickel and manganese, spherical $(Ni_{0.5}Mn_{0.5})(OH)_2$ was prepared by coprecipitation method.

(ii) Precursor Oxide

The spherical $(Ni_{0.5}Mn_{0.5})(OH)_2$ was pre-baked at 600° C. for 4 hours in air to prepare the precursor oxide.

(iii) Lithium-Containing Transition Metal Oxide

The precursor oxide and lithium hydroxide serving as the lithium source were mixed, and the resultant mixture was main-baked at 1000° C. for 15 hours in air, whereby $LiNi_{0.5}Mn_{0.5}O_2$ was obtained.

The atomic ratio $m_{Li}/m_T$ between the number of moles of lithium $m_{Li}$ and the total number of moles of Ni and Mn being the transition metal $m_T$ contained in the mixture of the precursor oxide and the lithium source was 1.0.

Comparative Example 1

(i) Starting Material Containing Nickel

Spherical $Ni(OH)_2$ was prepared in the same manner as in Example 1 except that Mn was not used.

(ii) Lithium-Containing Transition Metal Oxide

The spherical $Ni(OH)_2$ and lithium hydroxide were mixed, and the resultant mixture was baked at 875° C. for 14 hours in air, whereby $LiNiO_2$ was prepared. The atomic ratio $m_{Li}/m_T$ between the number of moles of lithium $m_{Li}$ and the number of moles of Ni $m_T$ contained in the mixture was 1.0.

The X-ray diffraction images of the active materials of Example 1 and Comparative Example 1 each had a peak $P_{003}$ attributed to Miller index (003) and a peak $P_{104}$ attributed to Miller index (104). In Example 1 and Comparative Example 1, the baking temperature was selected so that the integrated intensity ratio $I_{003}/I_{104}$ of the peak $P_{003}$ to the peak$_{104}$ was 1.0 or less.

<X-Ray Diffraction Image>

Figure 22:
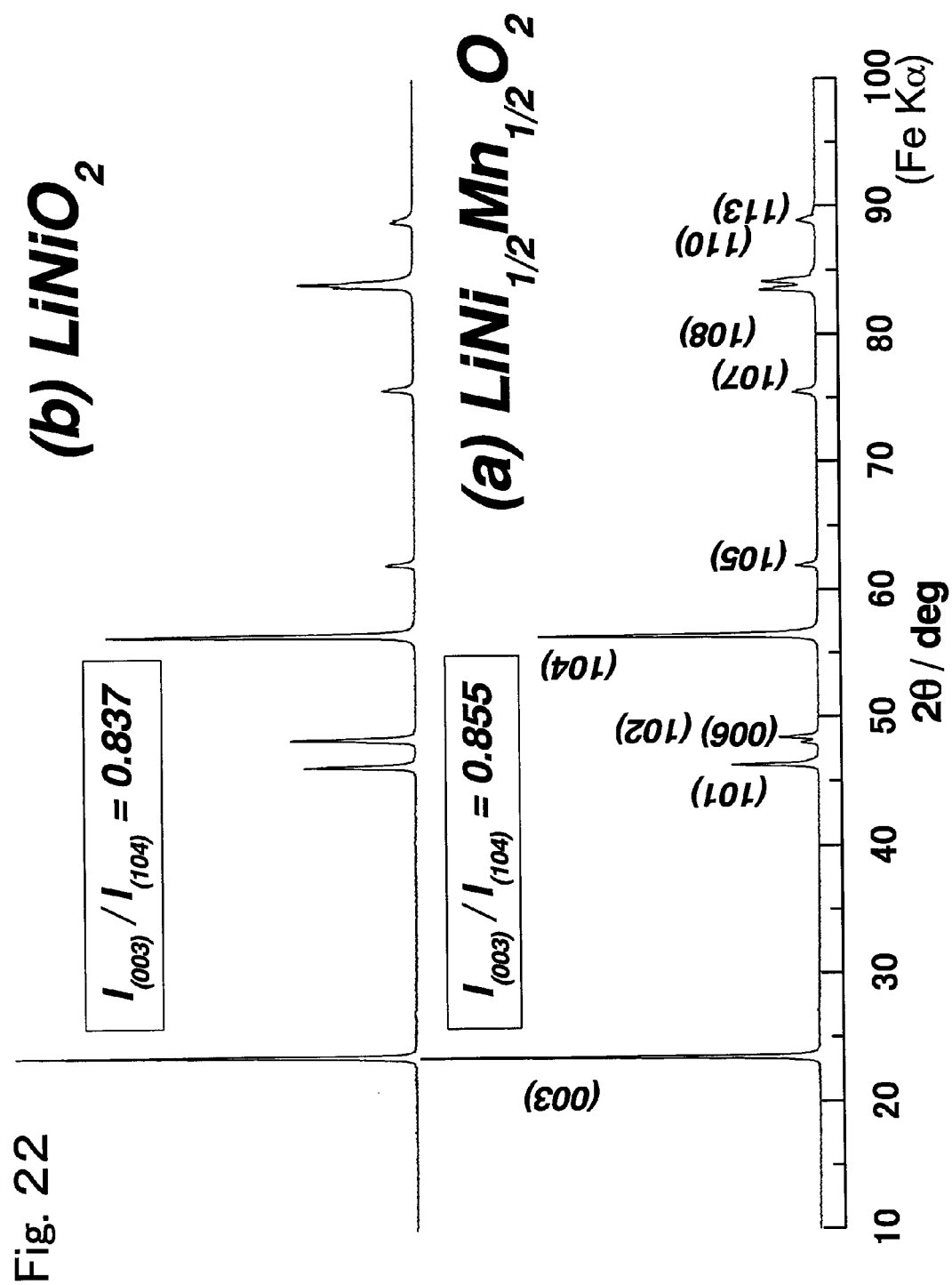
FIG. 22 shows XRD patterns of active materials synthesized in Example 1 and Comparative Example 1.

FIG. 22 shows XRD patterns of the active materials of Example 1 and Comparative Example 1.

The integrated intensity ratios $I_{003}/I_{104}$ in the active material (a) of Example 1 and in the active material (b) of Comparative Example 1 are 0.855 and 0.837, respectively, which are almost the same. However, with respect to the peaks attributed to the (108) plane and the (110) plane, the peaks are clearly split into two in the active material (a), whereas in the active material (b), the split is extremely obscure.

<Electrochemical Characteristics>

Test cells were fabricated and evaluated in accordance with the method as described above in (1) "Evaluation Method of Electrochemical Characteristics of Active Material".

Figure 23:
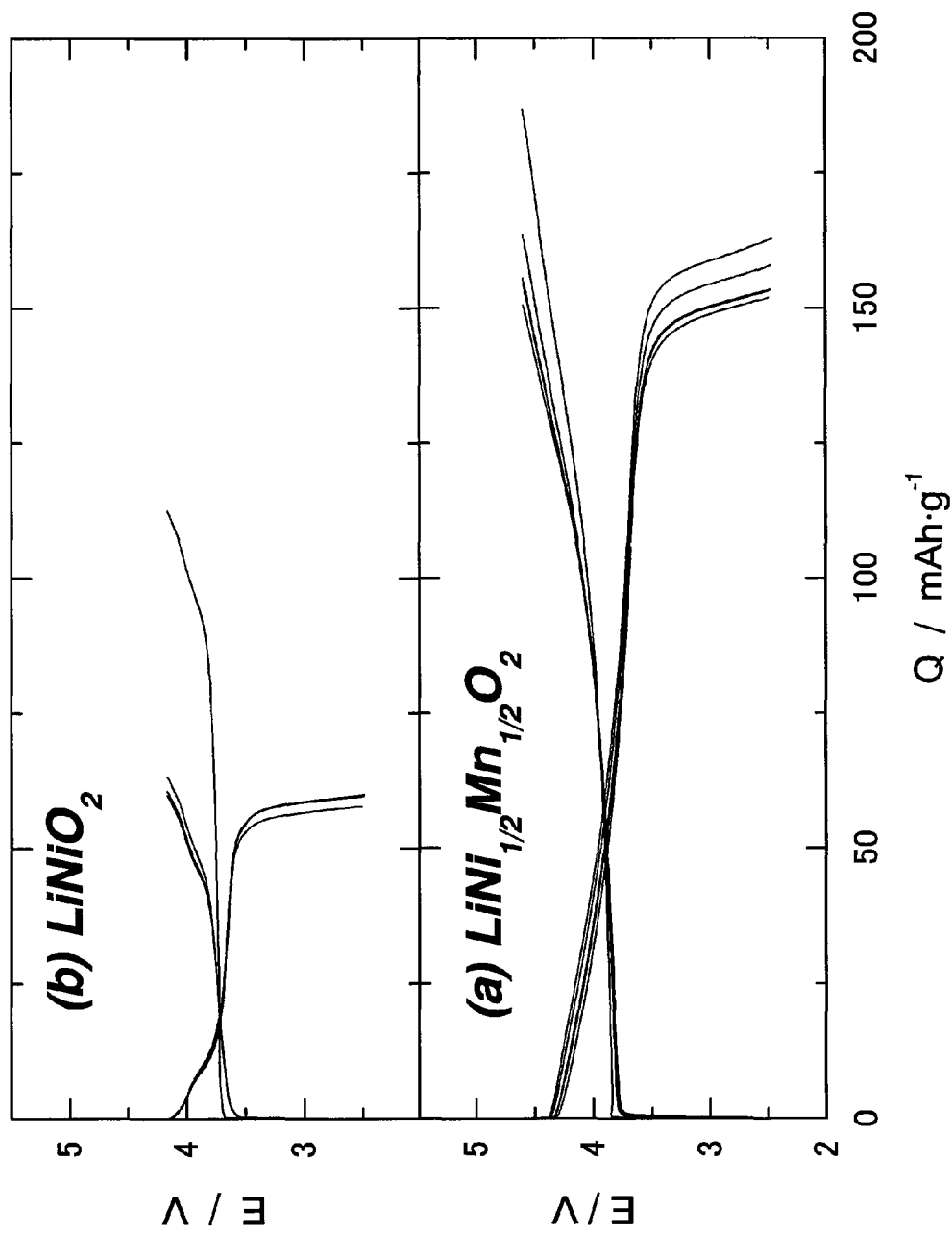
FIG. 23 shows charge-discharge curves of the active materials synthesized in Example 1 and Comparative Example 1.

The charge-discharge test was performed with the operating potential region from 4.6 V to 2.5 V in the case of the active material (a) and with the operating potential region from 4.2 V to 2.5 V in the case of the active material (b). The results are shown in FIG. 23.

The active material (a) demonstrates charge and discharge capacities of 150 mAh/g of more, whereas the active material (b) demonstrates charge and discharge capacities of approximately 60 mAh/g. This indicates that in the active material having the conventionally known layer structure, when the integrated intensity ratio $I_{003}/I_{104}$ is 1.0 or less, Ni ion enters the Li site, resulting in a sharp reduction in the electrochemical characteristics of the active material. In contrast, the active material of the present invention exhibits favorable charge-discharge characteristics, indicating that the structure of the active material of the present invention is significantly different from the lithium-containing transition metal oxide having the conventional layer structure.

Example 2

A preferred main-baking temperature for ensuring the crystallinity of the active material was examined.

Active materials were synthesized in the same manner as in Example 1 except that the main-baking time was changed. The main-baking time was changed to 0 hours, 1 hour, 7 hours, 12 hours, and 24 hours. The baking time is the period of time that has passed after 1000° C. was reached. For example, in the case of 0 hours, the mixture of the precursor oxide and the lithium source was permitted to cool immediately after the temperature was raised to 1000° C.

Figure 24:
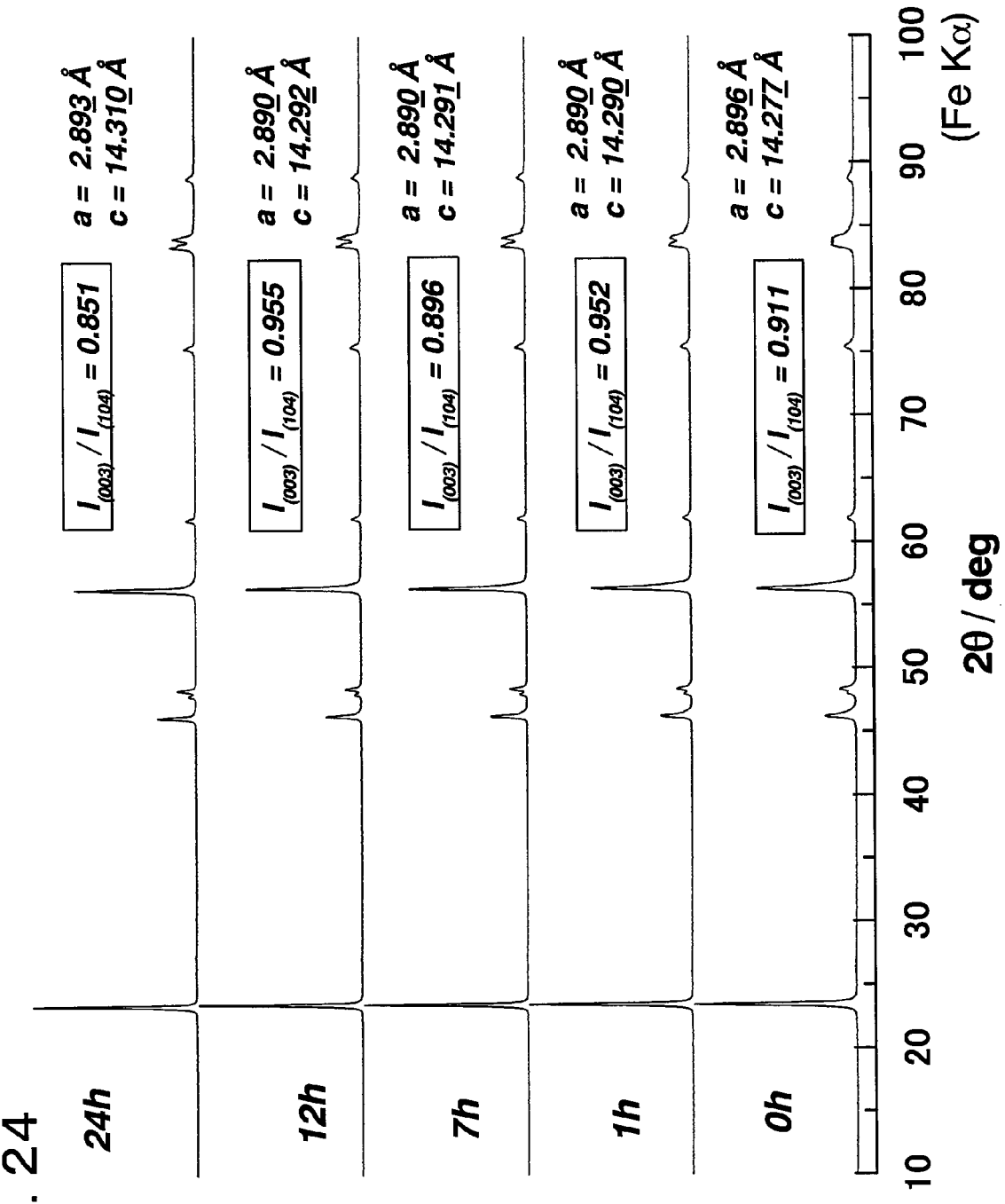
FIG. 24 shows the variations of the main-baking time in synthesizing an active material and the XRD pattern.

FIG. 24 shows the XRD patterns of the respective active materials thus obtained. The integrated intensity ratios $I_{003}/I_{104}$ at the respective baking time are almost constant, showing almost no variation. On the other hand, with respect to the peaks attributed to the (108) plane and the (110) plane, when the main-baking time is 0 hours and 1 hour, the peaks are slightly obscure. When the main-baking time is 7 hours or longer, the peaks attributed to the (108) plane and the (110) plane are clearly split into two, indicating that the crystallinity has been sufficiently improved. Taking also the stable lattice constants into consideration, a preferred main-baking time would be 7 hours to 12 hours.

Example 3

The atomic ratio $M_{Li}/M_T$ between the number of moles of lithium $M_{Li}$ and the number of moles of transition metal $M_t$ contained in the lithium-containing transition metal oxide was examined. The active material of the present invention, especially when it contains lithium in excess, exhibits a distinctive behavior different from the behavior of the conventional active material whose composition is the same as that of active material of the present invention.

Active materials were synthesized in the same manner as in Example 1 except that the atomic ratio $M_{Li}/M_T$ was changed. The atomic ratio was changed in the range from 0.8 to 1.5. Specifically, prior to the main-baking, in the process of mixing the precursor oxide and lithium hydroxide, the atomic ratio $m_{Li}/m_T$ between the number of moles of lithium $m_{Li}$ and the total number of moles of Ni and Mn being the transition metal $m_T$ contained in the mixture was adjusted to a predetermined molar ratio.

Figure 25:
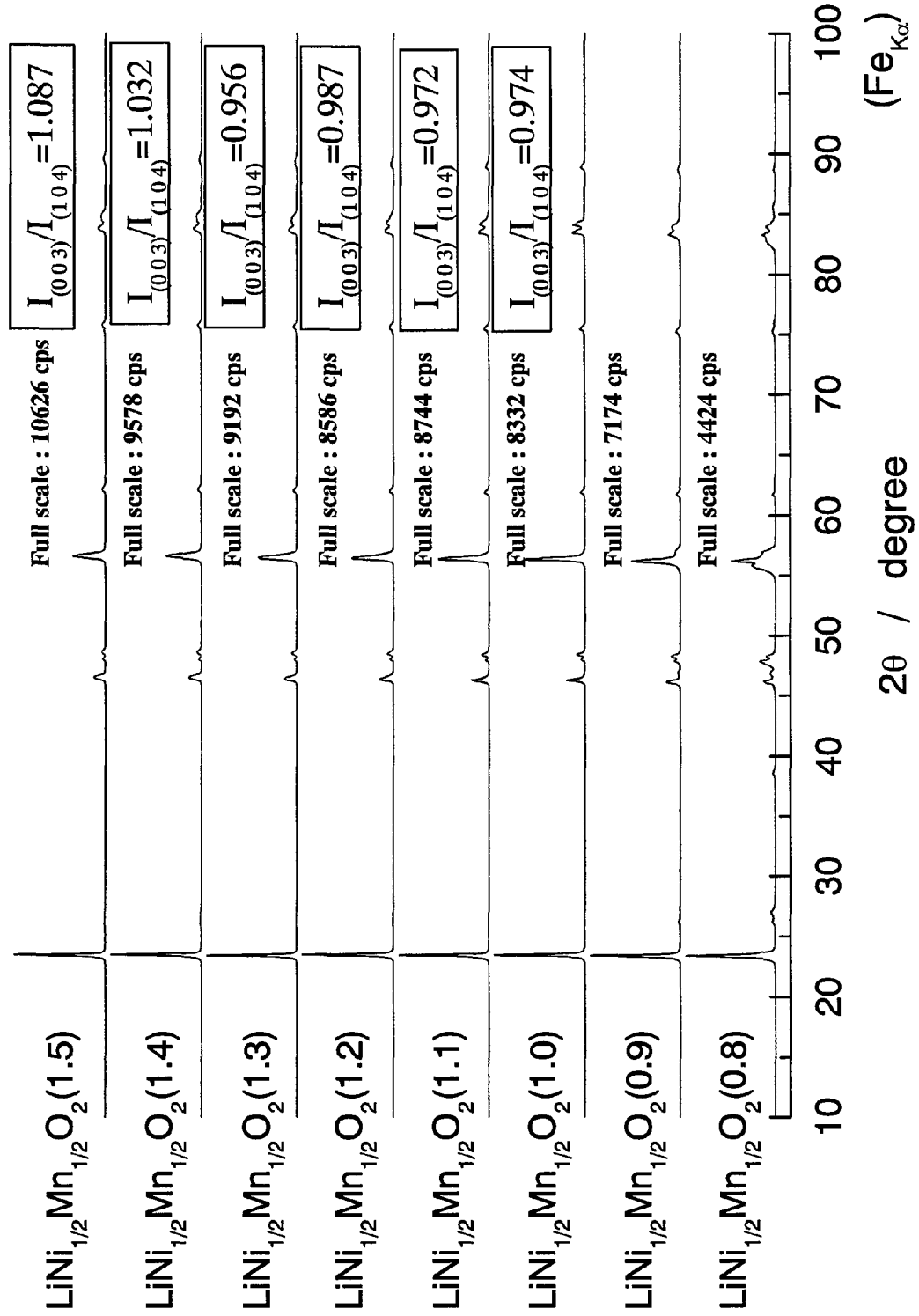
FIG. 25 shows the variations of the molar ratio of an active material $M_{Li}/M_T$ and the XRD pattern.

FIG. 25 shows the XRD patterns of the active materials thus obtained. The numerical value in parentheses following the formula of the lithium-containing transition metal oxide shows the atomic ratio $M_{Li}/M_T$.

When the atomic ratio $M_{Li}/M_T$ is 0.8, a peak attributed to $Li_2MnO_3$ presumably of impurities appears at a position of 2θ=25° to 40°.

As the atomic ratio $M_{Li}/M_T$ is increased, the integrated intensity ratio $I_{003}/I_{104}$ tends to increase.

In particular, as the atomic ratio $M_{Li}/M_T$ is increased, only the peak attributed to the (110) plane becomes distinctively broader and more obscure.

Even when lithium is loaded in excess such that the atomic ratio $M_{Li}/M_T$ is 1.5, no clear peak attributed to $Li_2MnO_3$ appears at a position of 2θ=25° to 40°. This tendency is different from that in the conventional active materials as disclosed in Non-Patent Documents 4 and 5.

Figure 26:
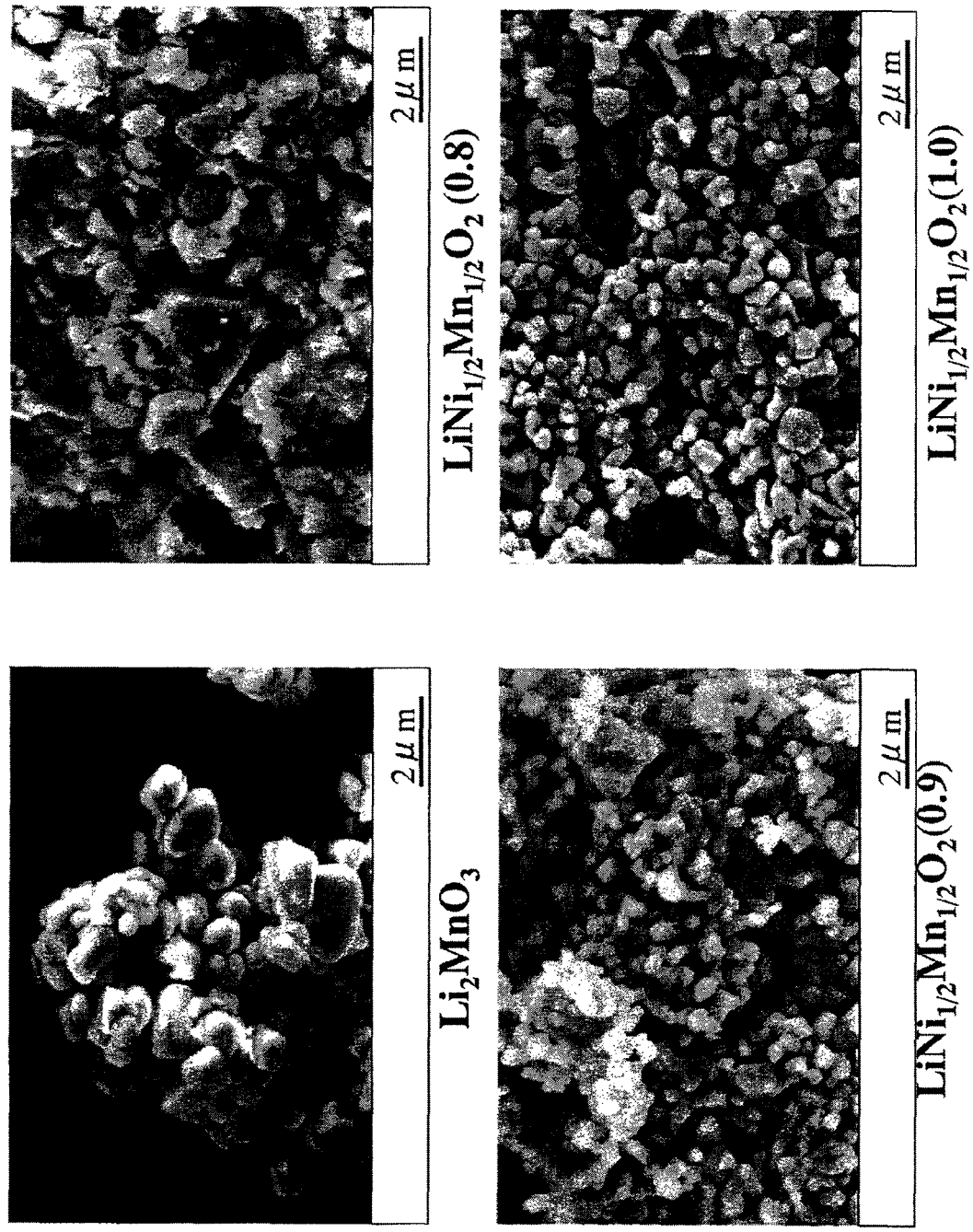
FIG. 26 shows the relationship between the molar ratio of an active material $M_{Li}/M_T$ and the SEM image of the surface of the active material.
Figure 27:
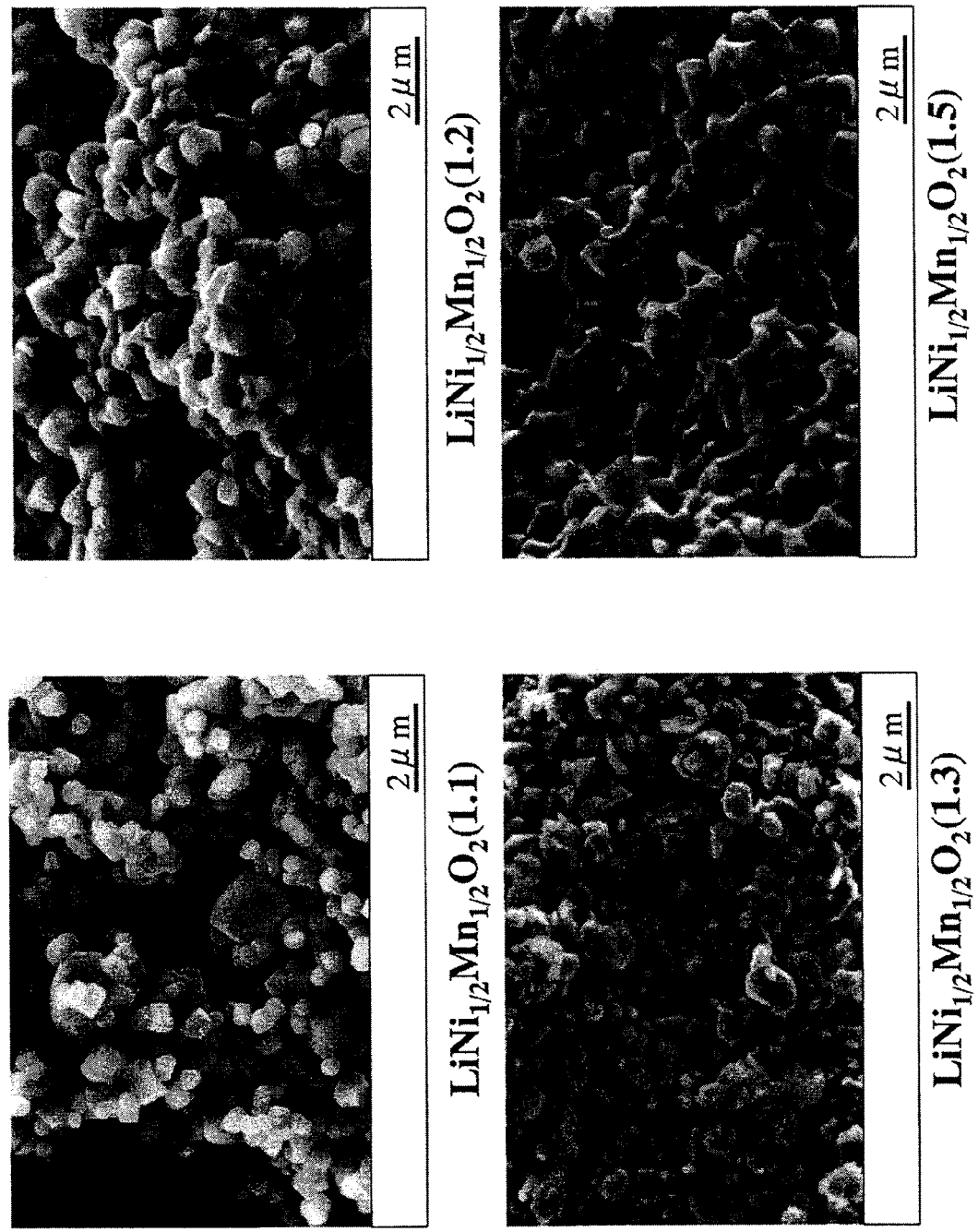
FIG. 27 further shows the relationship between the molar ratio of an active material $M_{Li}/M_T$ and the SEM image of the surface of the active material.

FIG. 26 and FIG. 27 show the SEM images of $Li_xNi_{0.5}Mn_{0.5}O_2$ having various atomic ratios $M_{Li}/M$. The numerical value in parentheses following the formula of the lithium-containing transition metal oxide shows the atomic ratio $M_{Li}/M_T$. For comparison, the SEM image of $Li_2MnO_3$ is also shown in FIG. 26.

In the SEM images obtained when the atomic ratio $M_{Li}/M_T$ is 1.1 or 1.2, the presence of primary particles of the lithium-containing transition metal oxide can be clearly observed. The primary particles have a mean particle size of 1 μm or less and have a flat face of approximate triangle or approximate hexagon. These primary particles are welded or sintered at their surfaces to one another, thereby to form secondary particles.

Figure 28B:
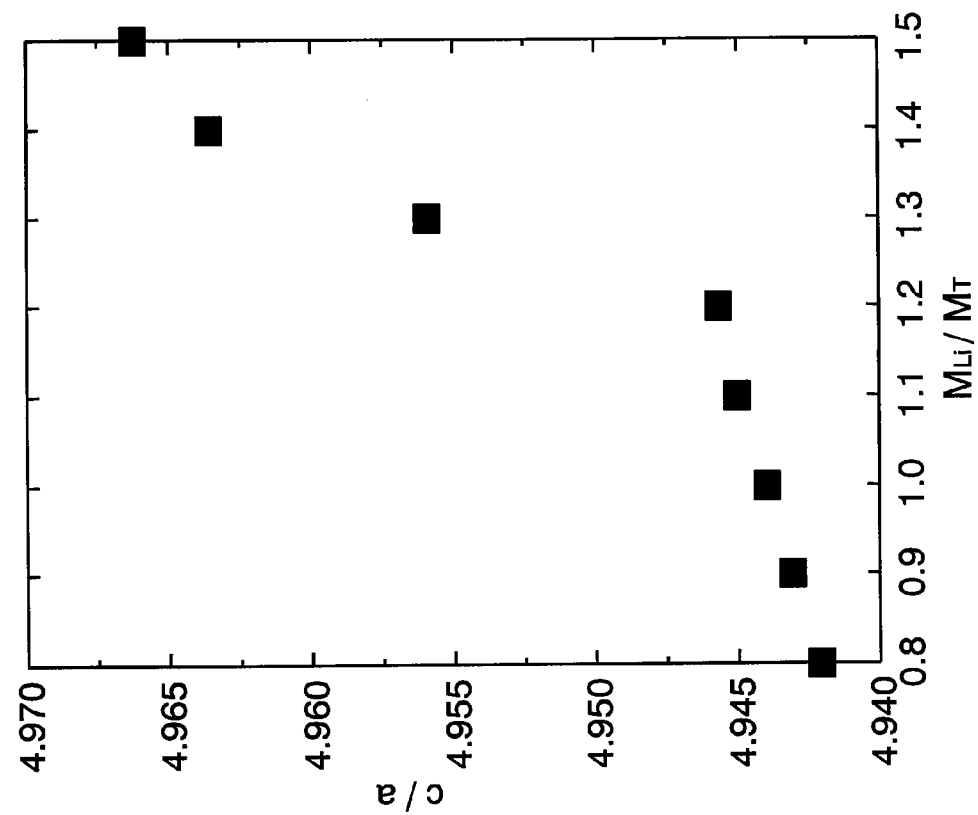
Figure 28A:
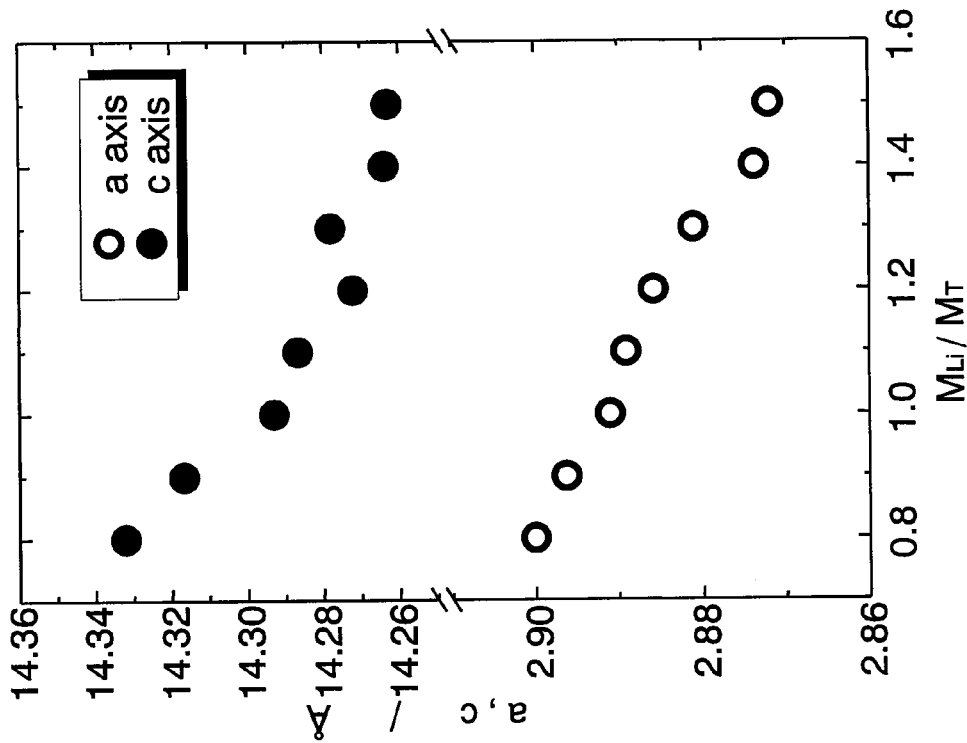
FIG. 28A shows the relationship between the molar ratio of an active material $M_{Li}/M_T$ and the lattice constants a and c.

FIG. 28A shows the relationship between the lattice constants representing the lengths of a axis and c axis and the molar ratio $M_{Li}/M_T$. FIG. 28B shows the relationship between the c/a value and the molar ratio $M_{Li}/M_T$. In this Example, the atomic ratio $M_{Li}/M_T$ was varied from 0.8 to 1.5. Distinctively, as the atomic ratio $M_{Li}/M_T$ is increased, the c/a value varies sharply after the peak of 4.945.

Figure 29:
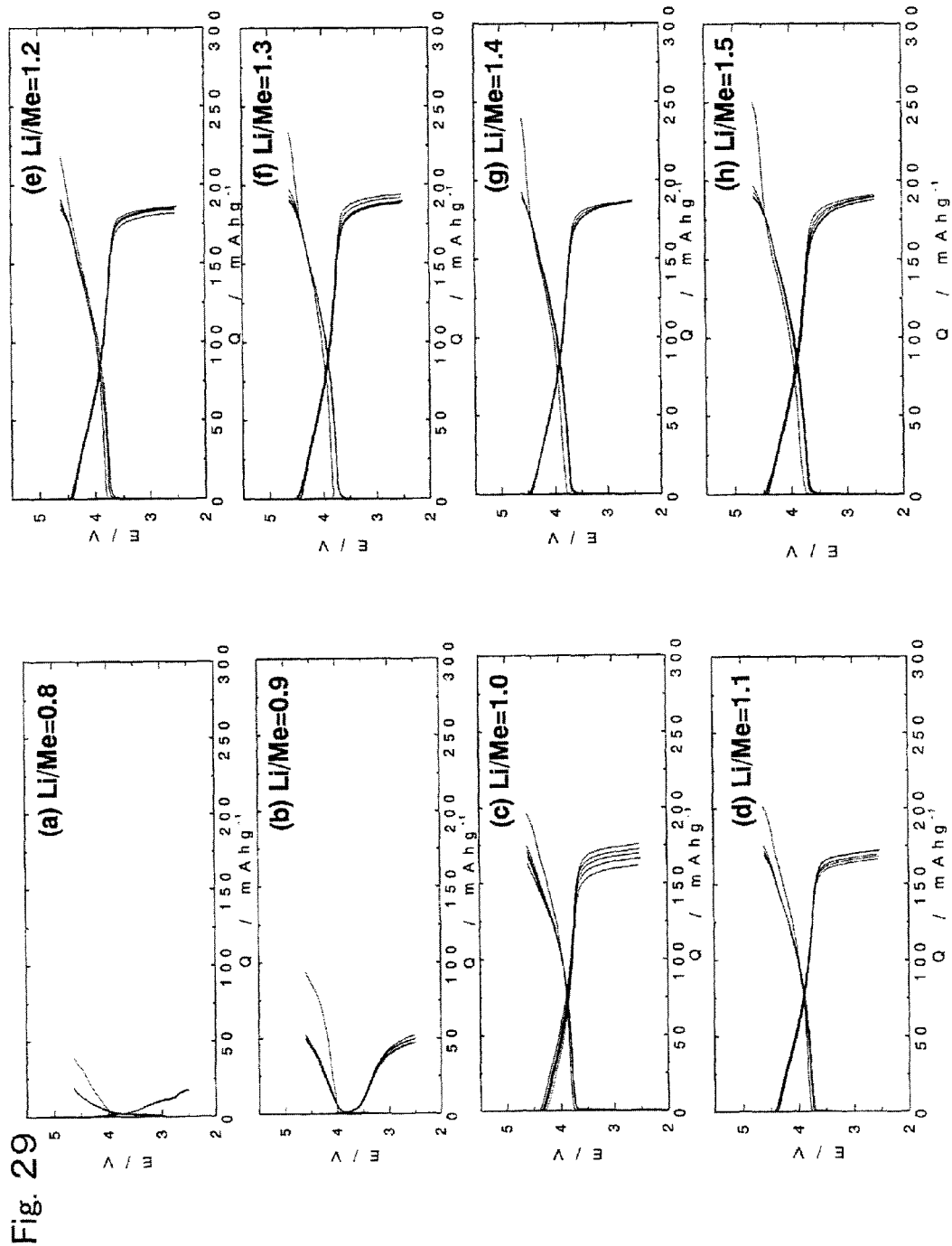
FIG. 29 shows the relationship between the molar ratio of an active material $M_{Li}/M_T$ and the charge-discharge curve (2.5 V to 4.6 V).

FIG. 29 shows charge-discharge behaviors of the active material of the present invention. In this Example, the active material after main-baking was used as it was to evaluate its electrochemical characteristics. The process for removing unreacted lithium, such as the step of washing the active material, was not performed. The results of charging and discharging the test cells with the operating potential region from 4.6 V to 2.5 V are shown.

When the atomic ratio $M_{Li}/M_T$ (Li/Me) is high, that is, lithium is contained in excess, the results of the charge and discharge capacities as well as those of the cycle characteristics are favorable. It should be noted that as for the active material in which the molar ratio is 1.5, the slope of the discharge curve at the end of charge and discharge is blunted, indicating a possibility that the application of this material may be limited.

Figure 30:
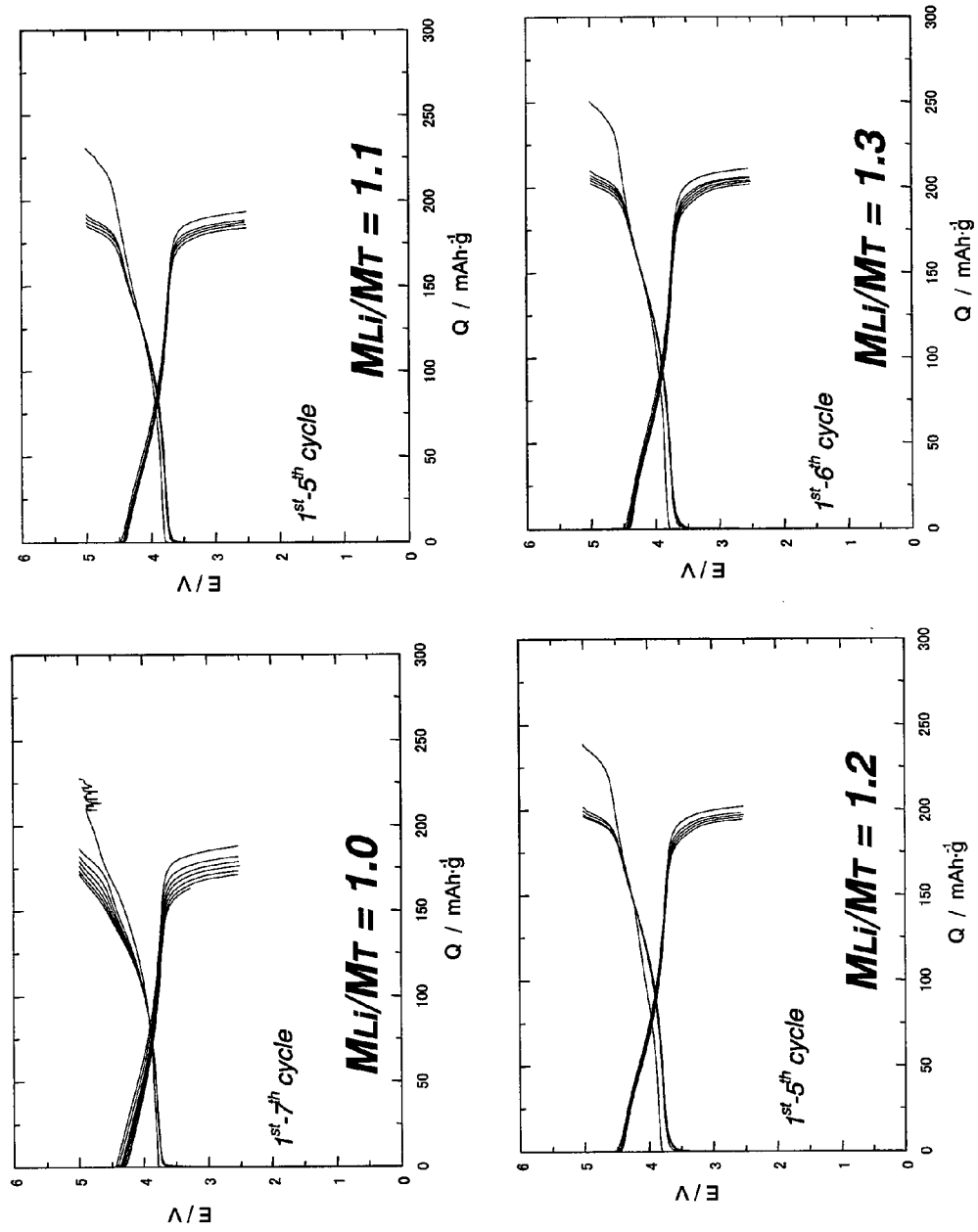
FIG. 30 shows the relationship between the molar ratio of an active material $M_{Li}/M_T$ and the charge-discharge curve (2.5 V to 5.0 V).

FIG. 30 shows the results of charging and discharging the test cells with the operating potential region from 5.0 V to 2.5 V in the cases where atomic ratios $M_{Li}/M_T$ were 1.0, 1.1, 1.2, and 1.3. The voltages of test cells vary continuously in the range from 4.5 to 4.6 V, during which no flat portion appears. Therefore, the reaction to cause lithium and oxygen to be simultaneously extracted from the skeleton of the active material (i.e., the reaction involving the production of $Li_2O$) cannot be observed.

Although an irreversible capacity generated in the initial charge and discharge was detected, the irreversible capacity was almost constant at 16.8%, 15.2%, and 14.8%, when the atomic ratio $M_{Li}/M_T$ were 1.1, 1.2, and 1.3, respectively. This indicates that the irreversible capacity is independent of the amount of excess lithium. The charge and discharge capacities are increased in proportion to the amount of lithium.

Example 4

$Li_{1.2}Ni_{0.5}Mn_{0.5}O_2$ being the lithium-containing transition metal oxide was synthesized in the same manner as in Example 1 except that the precursor oxide and lithium hydroxide were mixed so that $M_{Li}/M_T$ was 1.2. This lithium-containing transition metal oxide was identical with the active material in which $M_{Li}/M_T$ was 1.2 synthesized in Example 3.

Comparative Example 2

After spherical $(Ni_{0.5}Mn_{0.5})(OH)_2$ was obtained by coprecipitation method in the same manner as in Example 1, only drying for dehydrating the $(Ni_{0.5}Mn_{0.5})(OH)_2$ was performed without performing the pre-baking for preparing the precursor oxide. The drying was performed using hot air of 110° C. for 2 hours.

$Li_{1.2}Ni_{0.5}Mn_{0.5}O_2$ being the lithium-containing transition metal oxide was synthesized in the same manner as in Example 1 except that the dried $(Ni_{0.5}Mn_{0.5})(OH)_2$ and lithium hydroxide were mixed so that $M_{Li}/M_T$ was 1.2.

Figure 31B:
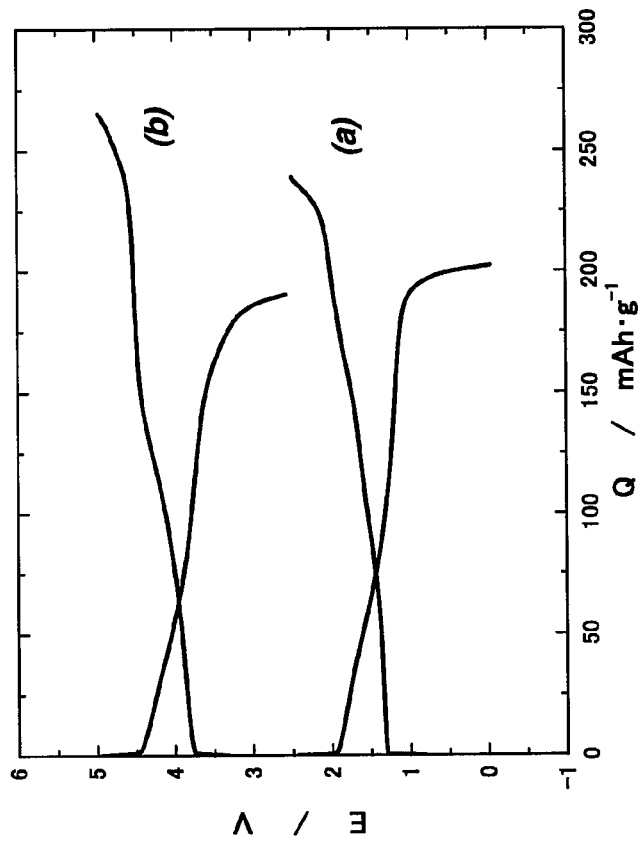
FIG. 31B shows a comparison graph of charge-discharge curves of the active materials synthesized in Example 4 and Comparative Example 2.
Figure 31A:
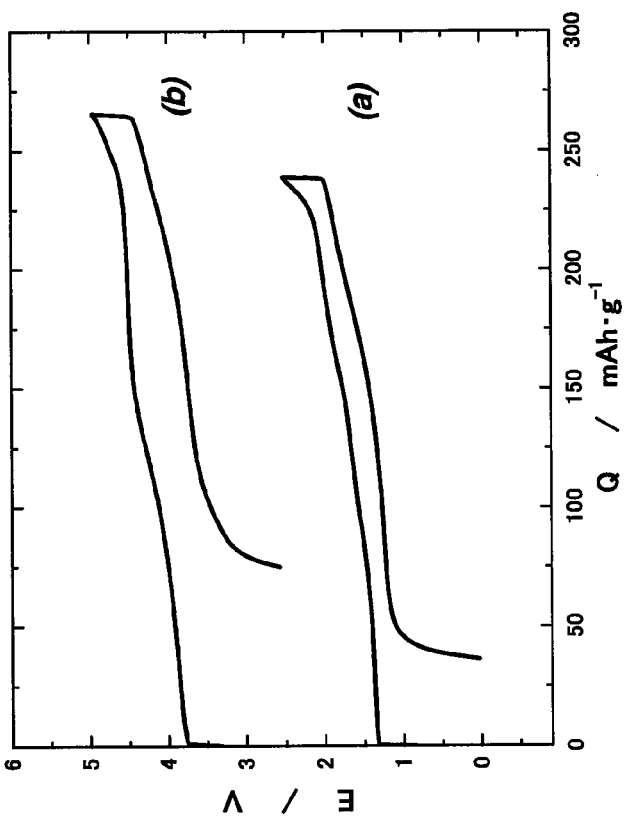
FIG. 31A shows a comparison graph of charge-discharge curves of active materials synthesized in Example 4 and Comparative Example 2.

FIG. 31A shows the charge-discharge curves of the active materials of Example 4 and Comparative Example 2. The charge-discharge region was within the range from 2.5 V to 5.0 V. The charge-discharge curves (a) correspond to the active material of Example 4, and the charge-discharge curves (b) correspond to the active material of Comparative Example 2. In order to show these curves on the same graph, the charge-discharge curves (a) were drawn by plotting the potentials 2.5 V lower than the actual potentials. Although the data in FIG. 31B are the same as those in FIG. 31A, the curve in FIG. 31B is reversed at the point where the initial charge is completed so that the state during discharge can be shown. The capacity on the horizontal axis, therefore, represents the depth of charge.

From the charge-discharge curves (b) on the right, it is observed that in the active material of Comparative Example 2, a long flat portion appears around 4.5 V. This flat portion indicates that lithium and oxygen are simultaneously extracted from the skeleton of the active material. In contrast, in the charge-discharge curves (a) of the active material of Example 4, such a flat portion is not observed.

Likewise, in the charge-discharge curves (b), because of the flat portion appearing during charge, there is a large gap between the charge curve and the discharge curve. In contrast, in the charge-discharge curves (a), the profiles of the charge curve and the discharge curve show a good conformity to each other. This indicates that in the active material of the present invention, even when it contains lithium in excess, the simultaneous extraction of lithium and oxygen does not proceed, causing no large irreversible capacity to be generated.

The reason for the occurrence of such a difference in the behavior is not clear partly because the crystal structure of the active material of the present invention has not yet been identified in detail. However, since there is a distinct difference in the electrochemical behavior as described above, it is considered that the active material carefully synthesized by the production method according to the present invention is a material completely different from the conventional one.

The electrochemical characteristics shown in FIG. 31 were obtained by measurement in 25° C. environment. When the same evaluation was performed in 45° C. environment, in the charge-discharge curves of Comparative Example 2, the increase in capacity was significant, that is, the discharge capacity at the initial discharge was 240 mAh/g, and the charge capacity at the initial charge was 285 mAh/g. As described above, the charge and discharge capacities are significantly increased or decreased depending on the environmental temperature. This is attributable, as has been previously reported, to the low electron conductivity and the poor lithium diffusing ability of the conventional material. In contrast, in the active material of the present invention, the discharge capacity in 45° C. environment was 220 mAh/g. In other words, in the discharge capacity, although a slight increase was observed, there was no remarkable increase as observed in Comparative Example 2.

Example 5 AND COMPARATIVE EXAMPLE 3

Figure 32:
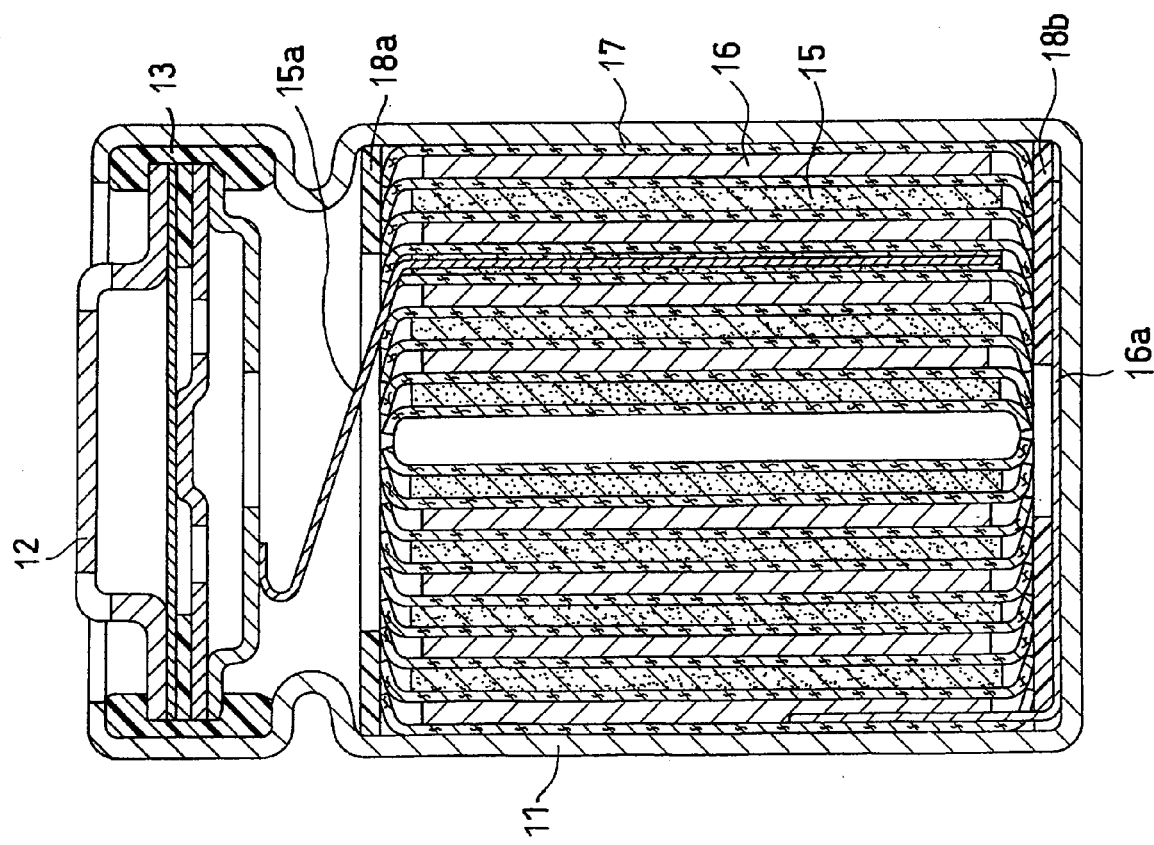
FIG. 32 shows a longitudinal sectional view of a cylindrical non-aqueous electrolyte secondary battery according to Examples of the present invention.

A cylindrical lithium secondary battery was fabricated using the active material of the present invention for the positive electrode. FIG. 32 shows a longitudinal sectional view of the battery fabricated in this Example.

The non-aqueous electrolyte secondary battery includes a battery case 11 made of stainless steel and an electrode plate assembly accommodated in the battery case 11. The electrode plate assembly comprises a positive electrode 15, a negative electrode 16, and a separator 17 made of polyethylene. The positive electrode 15 and the negative electrode 16 are wound in a coil with the separator 17 interposed therebetween. To the upper portion and the lower portion of the electrode plate assembly, an upper insulating plate 18a and a lower insulating plate 18b are arranged, respectively. The opening end of the battery case 11 is crimped onto a sealing plate 12 with a gasket 13 interposed therebetween to seal the opening. In addition, one end of a positive electrode lead 15a made by aluminum is fixed to the positive electrode 15, and the other end of the positive electrode lead 15a is connected to the sealing plate 12 serving also as a positive electrode terminal. One end of a negative electrode lead 16a made by nickel is fixed to the negative electrode 16, and the other end of the negative electrode lead 16a is connected to the battery case 11 serving also as a negative electrode terminal.

The formation methods of respective components in the battery are described below. It should be noted that the components other than the positive electrode active material were fabricated by a commonly known method.

(1) Positive Electrode Active Material

For Battery A of Example 5, the same active material as used in Example 4 was used. For Battery B of Comparative Example 3, the same active material as used in Comparative Example 2 was used.

(2) Formation of Positive Electrode Plate

A positive electrode material mixture slurry was prepared by mixing 100 parts by weight of the positive electrode active material, 4 parts by weight of acetylene black serving as a conductive agent, 5 parts by weight of polyvinylidene fluoride (PVDF) serving as a binder, and an appropriate amount of N-methyl-2-pyrrolidone (NMP). The PVDF was dissolved in NMP beforehand, so that it was used in the form of solution. This slurry was applied onto both faces of a positive electrode current collector made of a 15-μm thick aluminum foil, dried, then rolled, and cut into a predetermined size, whereby a positive electrode plate was obtained.

(3) Formation of Negative Electrode Plate

A negative electrode material mixture slurry was obtained by mixing 98 parts by weight of massive artificial graphite powder, 2 parts by weight of styrene-butadiene rubber serving a binder, and an appropriate amount of aqueous solution thickened by 1 wt % of CMC (carboxymethyl cellulose). This slurry was applied onto both faces of a negative electrode current collector made of a copper foil, dried, then rolled, and cut into a predetermined size, whereby a negative electrode plate was obtained.

(4) Preparation of Non-Aqueous Electrolyte

To a mixture solvent including ethylene carbonate and ethyl methyl carbonate in a volume ratio of 1:3, 1 wt % of vinylene carbonate was added, and $LiPF_6$ was dissolved in the resultant mixture at a concentration of 1.0 mol/L, whereby a non-aqueous electrolyte was obtained.

(5) Fabrication of Cylindrical Battery

To the current collectors of the positive electrode 15 and the negative electrode 16, the positive electrode lead 15a made of aluminum and the negative electrode lead 16a made of nickel were fixed, respectively. Thereafter, the positive electrode and the negative electrode were wound with the separator 17 interposed therebetween, to form an electrode plate assembly. The insulating plates 18a and 18b were arranged on the upper portion and the lower portion of the electrode plate assembly, respectively. The negative electrode lead 16a was welded to the battery case 11, and the positive electrode lead 15a was welded to the sealing plate 12 having an internal pressure sensitive type safety valve. The electrode plate assembly was then accommodated in the interior of the battery case 11. The non-aqueous electrolyte was injected in the interior of the battery case 11 with a pressure reduction system. Lastly, the opening end of the battery case 11 was crimped onto the sealing plate 12 with the gasket 13 interposed therebetween, whereby a battery was finished. The design capacity of the cylindrical battery thus fabricated was 2400 mAh in Example 5 and in Comparative Example 3 as well.

In the case of Comparative Example 3, a large irreversible capacity is generated during the initial charge due to the extraction of oxygen. Taking this into consideration, prior to the sealing, the battery was charged at a constant current of 0.2 C up to 5 V, and a predetermined amount of electrolyte was injected again with a pressure reduction system.

(6) Evaluation of Battery

The charge-discharge cycle characteristics of Batteries A and B were evaluated at an environmental temperature of 25° C. The charge and discharge were performed under the following two sets of conditions.

(a) 4.6 V Constant-Current/Constant-Voltage Charge

Charge is performed at a constant current of 0.5 C up to an end voltage of 4.6 V, and then charge is performed at a constant voltage of 4.6 V until the current value reaches 0.1 CmA (240 mA). After an interval of 10 minutes, discharge is performed at a constant current of 0.5 C up to an end voltage of 2.5 V.

(b) 5.0 V Constant-Current Charge-Discharge

Both charge and discharge are performed at a constant current of 0.2 C. The charge is performed up to an end voltage of 5.0 V and discharge is performed up to an end voltage of 2.5 V.

The evaluation results of the charge-discharge cycle characteristics are shown in Table 1. The values in Table 1 show a discharge capacity retention rate after the passage of 100 cycles under each of the charge-discharge conditions. The discharge capacity retention rate means a ratio (%) of the discharge capacity after the passage of 100 cycles relative to the initial discharge capacity.

TABLE 1

| Battery | Charge/discharge condition (a) | Charge/discharge condition (b) |
| --- | --- | --- |
| A (Ex. 5) | 92% | 88% |
| B (Com. Ex. 3) | 75% | 31% |

As is evident from Table 1, Battery A of Example 5, although the end-of-charge voltage thereof is as high as 4.6 V or 5.0 V, demonstrated favorable cycle characteristics. In contrast, with respect to Battery B of Comparative Example 3, in the case of the 4.6 V end-of-charge voltage, the cycle characteristic was low; and in the case of the 5.0 V end-of-charge voltage, the cycle characteristic was remarkably reduced. Presumably, in the battery of Comparative Example 3, since lithium and oxygen are extracted from the positive electrode active material during charge, the crystal structure of the active material becomes unstable. Moreover, presumably in Comparative Example 3, the reduction of the cycle characteristics is mainly attributable to the deterioration in the electronic conductivity.

In the case of a high end-of-charge voltage, presumably, the reduction of the cycle characteristics may be largely attributable to decomposition of the non-aqueous electrolyte. However, under the foregoing charge-discharge conditions, deterioration phenomena such as electrolyte depletion due to the decomposition of the non-aqueous electrolyte become remarkable only in the charge and discharge after the passage of 100 cycles. In other words, the decomposition of the non-aqueous electrolyte is not a major cause of the reduction of the cycle characteristics before the passage of 100 cycles. It should be noted that in the case of a lower end-of-charge voltage, for example, 4.4 V, similar results were obtained.

Example 6

The conditions for washing with water and drying the active material obtained by main-baking were evaluated.

The active material was fabricated in the same manner as described above in (4) "Preparation Method of Active Material II".

The molar ratio of $LiOH/NiMnO_3$ and the conditions for washing with water and drying are shown in Table 2. Among Samples S1 to S4, Sample S1 was not washed with water.

With respect to Samples S1, S2 and S4, the loaded molar ratio of $LiOH/NiMnO_3$ in the main-baking was 2.5. With respect to Sample S3, the molar ratio of $LiOH/NiMnO_3$ in the main-baking was 3.0. In the washing with water of Samples S2 and S3, a 60° C. hot water was used in an amount of 300 mL/g. In the washing with water of Sample S4, a 60° C. hot water was used in an amount of 1000 mL/g. After washing with water, the active material was subjected to filter-pressing to be dehydrated. During the dehydration, fine powder having a particle size of 1 μm or less, although small in amount, was effused.

Samples S2 and S4 after washing with water were dried at 300° C. and 600° C., respectively, for 1 hour. Sample S3 after washing with water was dried at 150° C. for 1 hour, and further dried at 750° C. of 1 hour. In the active materials after drying, it was not observed that remarkable sintering of particles had occurred in the process of washing with water and drying. Thereafter, sieving was preformed to such an extent that the particles become loose.

TABLE 2

Conditions for washing and drying

| Sample | $LiOH/NiMnO_3$ | Washing with water | Drying after washing |
| --- | --- | --- | --- |
| S1 | 2.5 | Not performed | Not performed |
| S2 | 2.5 | Distilled water 60° C., 300 ml | 300° C., 1 hr |
| S3 | 3.0 | Distilled water 60° C., 300 ml | 150° C., 1 hr 750° C., 1 hr |
| S4 | 2.5 | Distilled water 60° C., 1000 ml | 600° C., 1 hr |

The analysis results of the chemical composition of the active materials thus obtained are shown in Table 3. The contents of Li, Mn and Ni elements were measured by ICP emission spectrometry. The content of O (oxygen) element was quantified by infrared absorption method (complying with JIS 2613). From the measurement values and the molecular weight of each element, the atomic ratio $M_{Li}/M_T$ (Li/Me) between the number of moles of lithium $M_{Li}$ and the number of moles of transition metal $M_t$ contained in the lithium-containing transition metal oxide was calculated. The results are shown in Table 3 on the right-end column. The atomic ratio $M_{Li}/M_T$ is approximately 1.1 to 1.25. The atomic ratios $M_{Li}/M_T$ of Samples S2 and S4 are approximately 0.05 lower than that of Sample S1. This indicates that excess lithium was removed by washing with water. With respect to Sample S3, since the molar ratio of LiOH/NiMnO$_3$ in the main-baking is as high as 3.0, the atomic ratios $M_{Li}/M_T$ is still high even after the washing with water.

TABLE 3

| | Chemical composition after washing | | | | |
|---|---|---|---|---|---|
| Sample | Li mass % | Mn mass % | Ni mass % | O mass % | Li/Me (Me:Ni + Mn) |
| S1 | 8.1 | 27.1 | 29.4 | 33.7 | 1.174 |
| S2 | 7.8 | 27.3 | 29.4 | 31.4 | 1.126 |
| S3 | 8.2 | 26.8 | 28.8 | 33.1 | 1.208 |
| S4 | 7.7 | 27.2 | 29.3 | 33.8 | 1.116 |

Figure 33B:
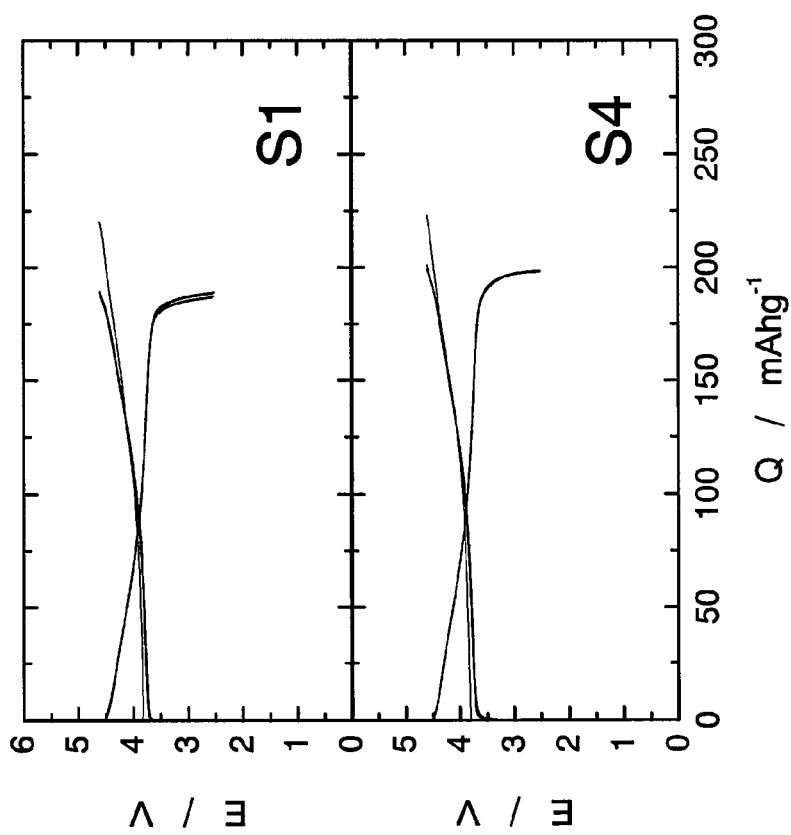
FIG. 33B shows a charge-discharge curve in an operating range from 2.5 to 4.6 V of the active material before washing with water and drying (S1) and a charge-discharge curve in the same range of the active material after washing with water and drying (S4).
Figure 33A:
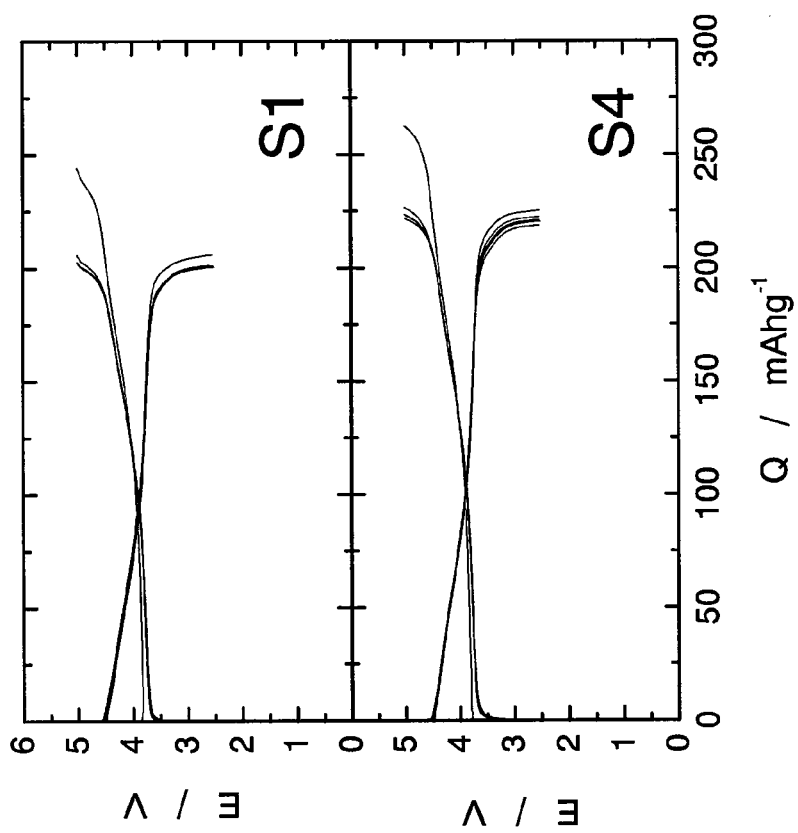
FIG. 33A shows a charge-discharge curve in an operating range from 2.5 to 5 V of an active material before washing with water and drying (S1) and a charge-discharge curve in the same range of the active material after washing with water and drying (S4).

FIG. 33A and FIG. 33B show the electrochemical characteristics of the active materials before and after washing with water. Sample S1 corresponds to the active material before washing with water, and Sample S4 corresponds to the active material after washing with water. In both the operating region from 2.5 V to 4.6 V and the operating region from 2.5 V to 5 V, it is not observed that the washing with water has brought a great variation in the charge-discharge curves. Moreover, it is found that Samples S1 and S4 are both capable of being reversibly charged or discharged as an active material up to a high voltage of 5 V.

In the case of the operating region of 2.5 V to 4.6 V, the discharge capacity of Sample S4 after washing with water is approximately 6.3% greater than that of Sample S1. In the case of the operating region of 2.5 V to 5 V, the discharge capacity of Sample S4 after washing with water is approximately 9.6% greater than that of Sample S1. Presumably, removing excess Li by washing with water allows the capacity per unit weight to increase.

Figure 34A:
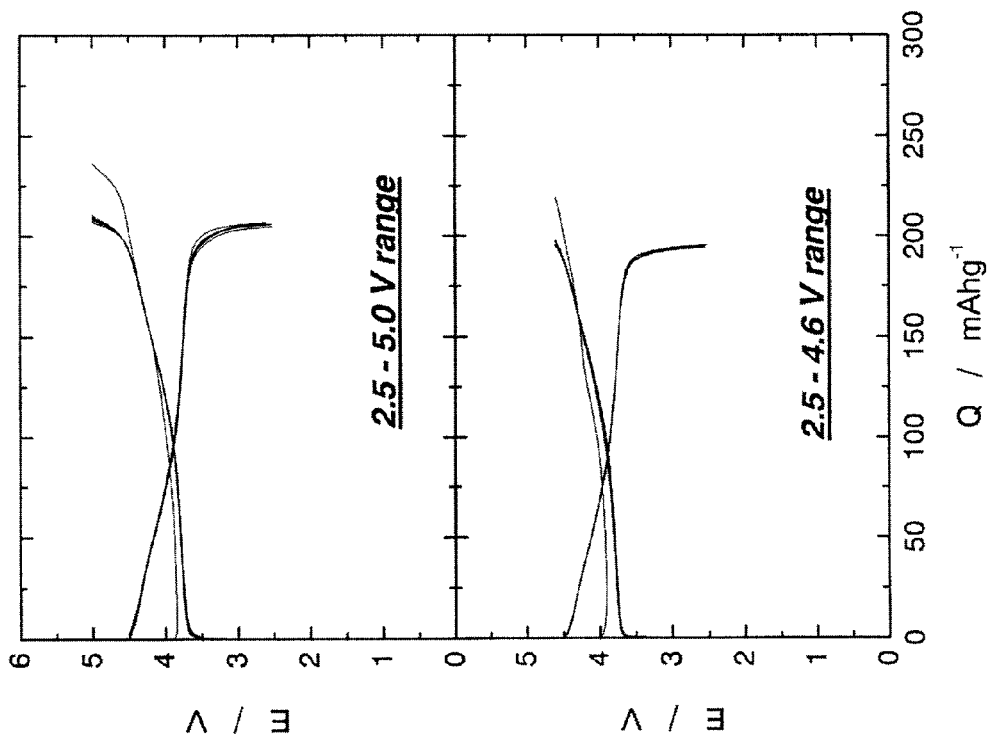
FIG. 34A shows an XRD pattern of an active material after washing with water and drying (S2).
Figure 34B:
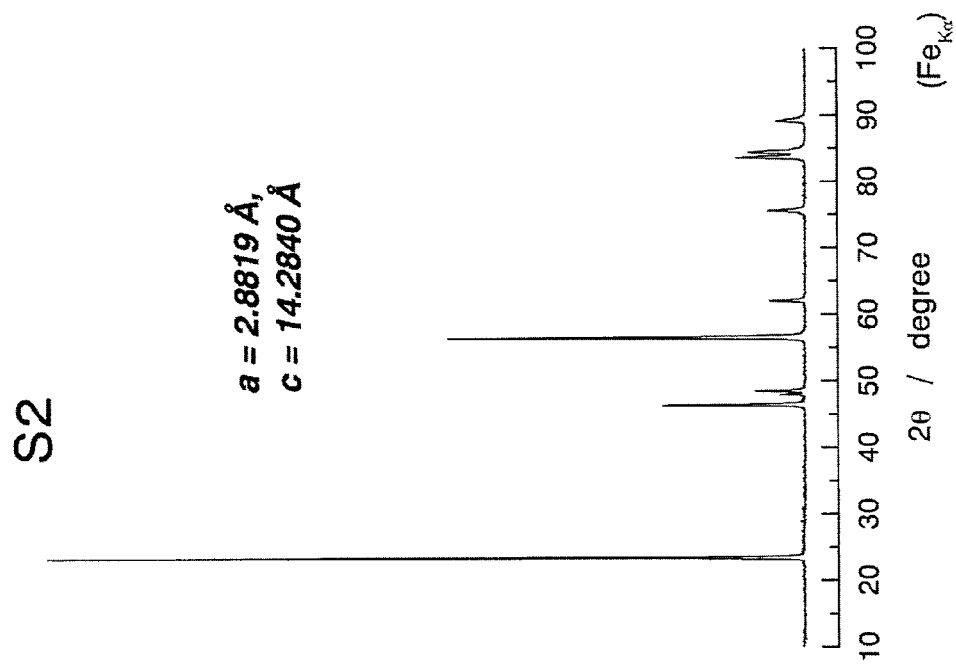
FIG. 34B shows a charge-discharge curve of the active material after washing with water and drying (S2).

FIG. 34A shows the XRD pattern of Sample S2. FIG. 34B shows the electrochemical characteristics of Sample S2. The results of the electrochemical characteristics are similar to those of Sample S4, indicating that Sample S2 is also capable of being reversibly charged or discharged up to a high voltage of 5 V. In the XRD pattern after washing with water, which is approximately equal to the XRD pattern before washing with water, no great variation in the intensity ratio of the peaks and the lattice constant is observed.

Figure 35B:
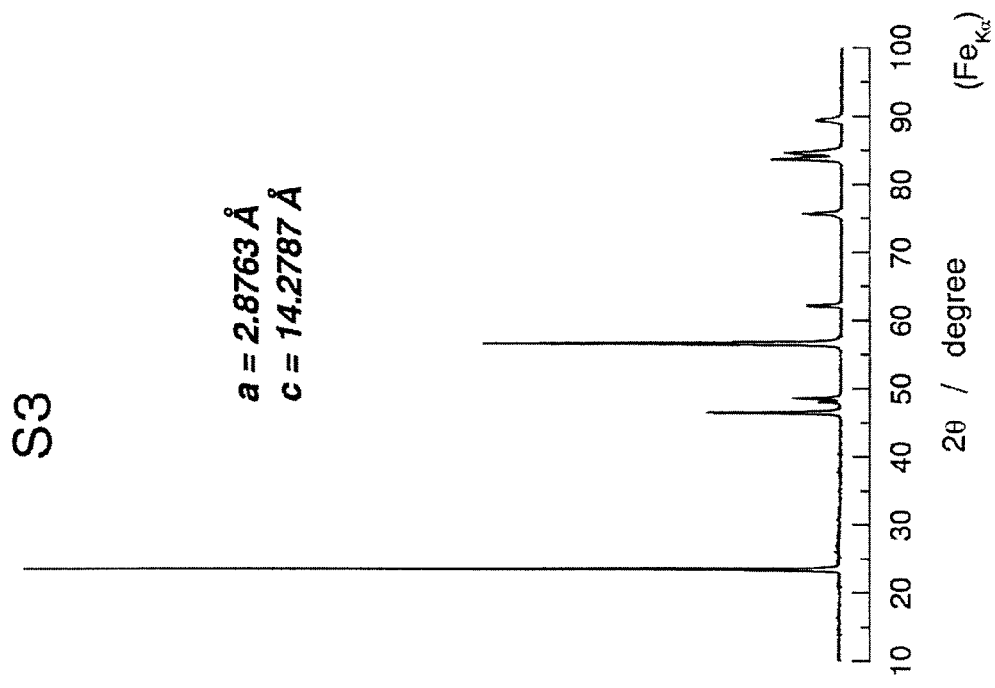
FIG. 35B shows a charge-discharge curve of the active material after washing with water and drying (S3).
Figure 35A:
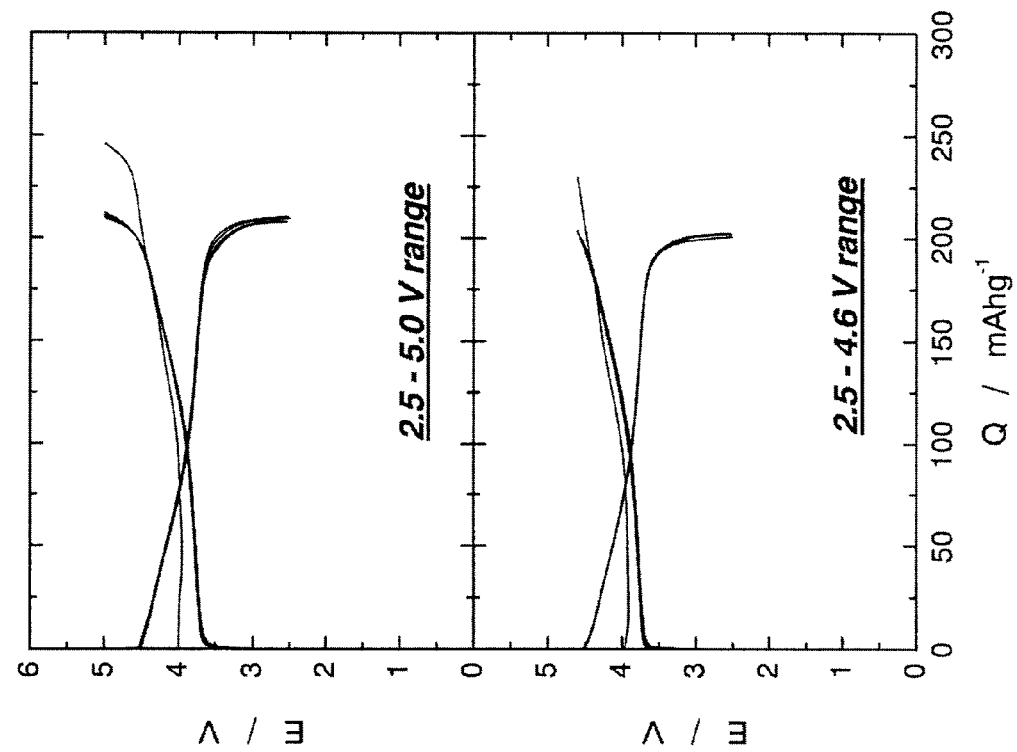
FIG. 35A shows an XRD pattern of an active material after washing with water and drying (S3).

FIG. 35A shows the XRD pattern of Sample S3. FIG. 35B shows the electrochemical characteristics of Sample S3. The results of the electrochemical characteristics are similar to those of Sample S4, indicating that Sample S3 is also capable of being reversibly charged or discharged up to a high voltage of 5V. In the XRD pattern after washing with water, which is approximately equal to the XRD pattern before washing with water, no great variation in the intensity ratio of the peaks and the lattice constant is observed.

Figure 36B:
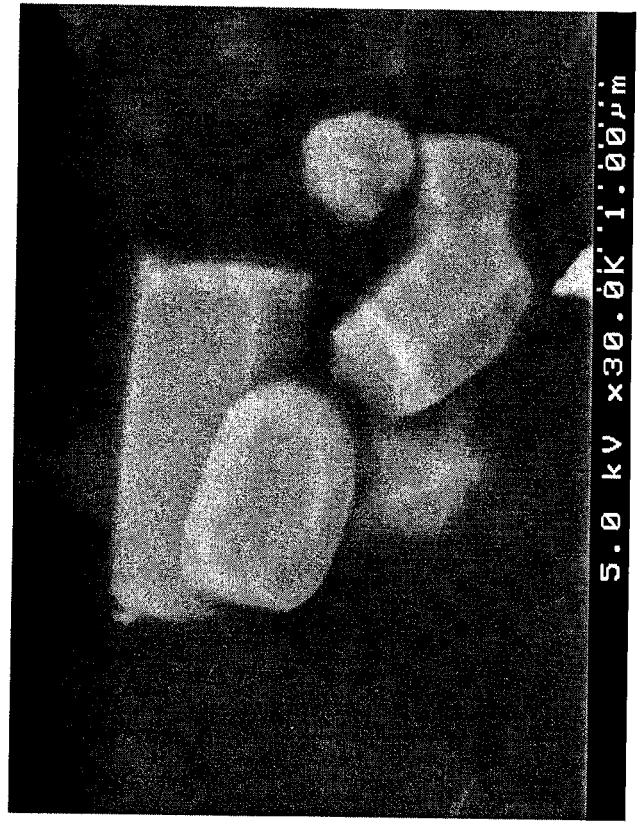
FIG. 36B shows an SEM image showing the shape of another primary particles of the active material.
Figure 36A:
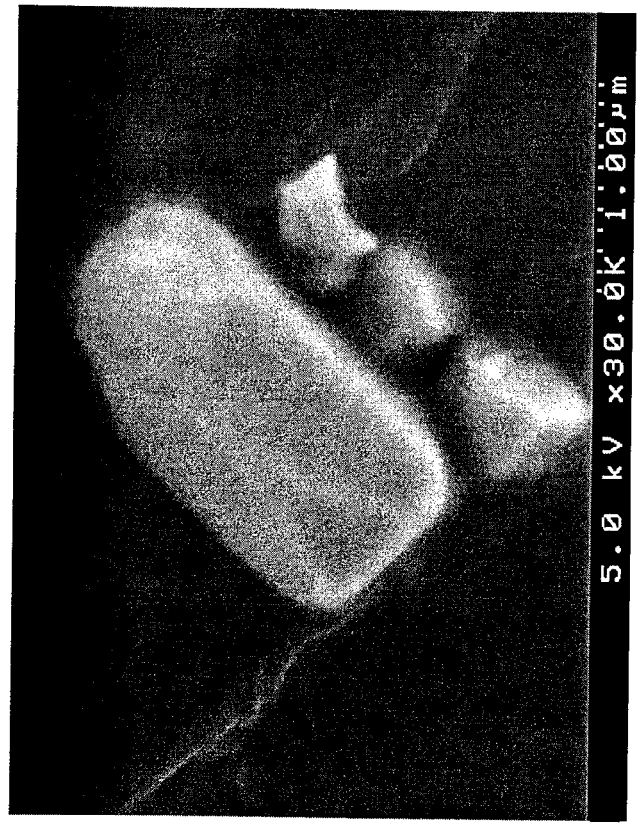
FIG. 36A shows an SEM image showing the shape of primary particles of an active material.

FIG. 36A and FIG. 36B show SEM images (magnification of 30000 times) of typical primary particles of the synthesized active material. As is evident from FIG. 36, the particles have a columnar shape, and in particular, a hexagonally columnar shape. The size of the primary particles was approximately 1 μm. Presumably, since lithium hydroxide was used in excess in the main-baking, the lithium hydroxide acted as a flux, allowing the crystals of the active material to grow. For this reason, in order to obtain columnar particles, it is preferable to use a lithium source in excess, so that the lithium source can function as a flux to promote the growth of crystals. In addition, it is preferable to remove the excess lithium by washing with water. It should be noted that in the case of using R32 type NiMnO$_3$ as the precursor oxide, excess lithium is more likely to function as a flux without being allowed to be contained in the active material.

Example 7

The same cylindrical batteries as that in Example 5 were fabricated using active materials (S2 to S4) obtained in Example 6, and evaluated in the same manner as in Example 5. As a result, the discharge capacities were 3% to 7% higher than that of Battery A of Example 5. The charge-discharge cycle characteristics were approximately equal to those of Battery A in Example 5.

In the above Examples, although a cylindrical battery was used, the use of a battery having a different shape such as a prismatic shape provides similar effects. To the active material of the present invention, a small amount of heteroelement may be added. The inclusion of a heteroelement allows the active material to exert various effects. For example, the addition of cobalt brings about an effect of improving load characteristics. The addition of iron, zinc, aluminum, yttrium, ytterbium, and the like brings about effects of inhibiting the side reaction and improving the heat resistance. The addition of magnesium brings about an effect of improving the electrical conductivity. Further, the addition of strontium brings about an effect of promoting the particle growth.

The active material for a non-aqueous electrolyte secondary battery of the present invention has a high capacity, and in particular, demonstrates excellent charge-discharge cycle characteristics when the end-of-charge voltage is set at a high voltage. The non-aqueous electrolyte secondary battery of the present invention is useful as a power source for driving electronic equipment such as notebook computers, mobile phones, and digital still cameras; a power source for power storage equipment and a power source for an electric automobile that are required to have high output.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An active material for a non-aqueous electrolyte secondary battery comprising a lithium-containing transition metal oxide containing nickel and manganese and having a closest-packed structure of oxygen, wherein:
   an atomic ratio $M_{Li}/M_T$ between the number of moles of lithium $M_{Li}$ and the number of moles of transition metal $M_T$ contained in said lithium-containing transition metal oxide is 1.1 to 1.4,
   said lithium-containing transition metal oxide has a crystal structure attributed to a hexagonal system, and the X-ray diffraction image of said crystal structure has a peak $P_{003}$ attributed to the (003) plane and a peak $P_{104}$ attributed to the (104) plane,
   an integrated intensity ratio $I_{003}/I_{104}$ between the peak $P_{003}$ and the peak $P_{104}$ varies reversibly within a range from 0.7 to 1.5 in association with absorption and desorption of lithium by said lithium-containing transition metal oxide, said integrated intensity ratio varies linearly and continuously, and in said crystal structure, a lattice constant a representing a length of a axis and a lattice constant c representing a length of c axis satisfy $4.945 < c/a$, and $c < 14.30$ Å.

2. The active material for a non-aqueous electrolyte secondary battery in accordance with claim 1, wherein said lithium-containing transition metal oxide is derived from an oxide containing nickel and manganese, the oxide serving as a precursor oxide.

3. The active material for a non-aqueous electrolyte secondary battery in accordance with claim 2, wherein said precursor oxide includes an oxide represented by R32 type $NiMnO_3$.

4. The active material for a non-aqueous electrolyte secondary battery in accordance with claim 1, wherein a capacity obtained when the potential of said lithium-containing transition metal oxide varies from 2.5 V to 4.6 V versus lithium metal is 160 mAh/g or more.

5. The active material for a non-aqueous electrolyte secondary battery in accordance with claim 1, wherein the primary particles constituting said lithium-containing transition metal oxide have a mean particle size of 1 μm or less, and at least a part of said primary particles have a triangular or hexagonal face on their surfaces.

6. The active material for a non-aqueous electrolyte secondary battery in accordance with claim 5, wherein the shape of the primary particles is columnar.

7. The active material for a non-aqueous electrolyte secondary battery in accordance with claim 5, wherein the primary particles are welded or sintered to one another at part of their surfaces, thereby to form secondary particles.

8. The active material for a non-aqueous electrolyte secondary battery in accordance with claim 1, wherein at least one heteroelement selected from the group consisting of cobalt, iron, zinc, aluminum, magnesium, strontium, yttrium, and ytterbium is doped in the inside or on the surface of the primary particles or secondary particles constituting said lithium-containing transition metal oxide.

9. The active material for a non-aqueous electrolyte secondary battery in accordance with claim 1, wherein the number of moles of nickel $M_{Ni}$ and the number of moles of manganese $M_{Mn}$ contained in said lithium-containing transition metal oxide are substantially equal to each other, and a molar ratio $M_0$ represented by $(M_{Ni}+M_{Mn})/2$ satisfies $0 \leq |M_{Ni}-M_0|/M_0 \leq 0.1$, and $0 \leq |M_{Mn}-M_0|/M_0 \leq 0.1$.

10. An active material for a non-aqueous electrolyte secondary battery comprising a lithium-containing transition metal oxide containing nickel and manganese and having a closest-packed structure of oxygen, wherein:

an atomic ratio $M_{Li}/M_T$ between the number of moles of lithium $M_{Li}$ and the number of moles of transition metal $M_T$ contained in said lithium-containing transition metal oxide is 1.1 to 1.4, said lithium-containing transition metal oxide has a crystal structure attributed to a hexagonal system, and the X-ray diffraction image of said crystal structure has a peak $P_{003}$ attributed to the (003) plane and a peak $P_{104}$ attributed to the (104) plane, an integrated intensity ratio $I_{003}/I_{104}$ between the peak $P_{003}$ and the peak $P_{104}$ varies reversibly within a range from 0.7 to 1.5 in association with absorption and desorption of lithium by said lithium-containing transition metal oxide, when said lithium-containing transition metal oxide desorbs lithium until its potential versus lithium metal reaches 5 V, the oxygen array in said crystal structure undergoes substantially no change, and in said crystal structure, a lattice constant a representing a length of a axis and a lattice constant c representing a length of c axis satisfy $4.945 < c/a$, and $c < 14.30$ Å.

11. The active material for a non-aqueous electrolyte secondary battery in accordance with claim 10, wherein in the process of desorbing lithium until the potential of said lithium-containing transition metal oxide reaches 5 V versus lithium metal, substantially no irreversible capacity involving $Li_2O$ production is generated.

12. The active material for a non-aqueous electrolyte secondary battery in accordance with claim 10, wherein the potential of said lithium-containing transition metal oxide versus lithium metal varies continuously within a range from 4.5 V to 4.6 V.

13. The active material for a non-aqueous electrolyte secondary battery in accordance with claim 10, wherein the X-ray diffraction image of said crystal structure has a peak $P_{110}$ attributed to the (110) plane, and the profile of the peak $P_{110}$ becomes broader as said atomic ratio $M_{Li}/M_T$ is increased.

14. A non-aqueous electrolyte secondary battery comprising a positive electrode including the active material in accordance with claim 1, a negative electrode, a separator interposed between said positive electrode and said negative electrode, and a non-aqueous electrolyte.

* * * * *

UNITED STATES PATENT AND TRADEMARK OFFICE
CERTIFICATE OF CORRECTION

PATENT NO.        : 8,137,847 B2
APPLICATION NO.   : 12/058430
DATED             : March 20, 2012
INVENTOR(S)       : Tsutomu Ohzuku et al.

It is certified that error appears in the above-identified patent and that said Letters Patent is hereby corrected as shown below:

IN THE SPECIFICATIONS:

In Column 7, Line 21, change "$LiMnO_3$." to --$NiMnO_3$--.

Signed and Sealed this
Third Day of July, 2012

David J. Kappos
*Director of the United States Patent and Trademark Office*